(12) United States Patent
Koike et al.

(10) Patent No.: US 11,179,777 B2
(45) Date of Patent: Nov. 23, 2021

(54) DEVICE FOR FABRICATING THREE-DIMENSIONAL FABRICATION OBJECT AND METHOD OF MANUFACTURING THREE-DIMENSIONAL FABRICATION OBJECT

(71) Applicant: Ricoh Company, Ltd., Tokyo (JP)

(72) Inventors: Yuta Koike, Kanagawa (JP); Shin Mizutani, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 102 days.

(21) Appl. No.: 15/966,538

(22) Filed: Apr. 30, 2018

(65) Prior Publication Data
US 2018/0326491 A1    Nov. 15, 2018

(30) Foreign Application Priority Data

May 11, 2017 (JP) .............................. JP2017-094972
May 24, 2017 (JP) .............................. JP2017-103119

(51) Int. Cl.
*B22F 3/18* (2006.01)
*B29C 64/165* (2017.01)
(Continued)

(52) U.S. Cl.
CPC .................. *B22F 3/18* (2013.01); *B22F 3/24* (2013.01); *B22F 10/20* (2021.01); *B28B 1/001* (2013.01);
(Continued)

(58) Field of Classification Search
CPC .. B22F 3/18; B22F 3/1055; B22F 3/24; B22F 2999/00; B22F 3/004; B22F 3/008; B22F 1/0062; B22F 2003/247
See application file for complete search history.

(56) References Cited

U.S. PATENT DOCUMENTS 5,252,264 A * 10/1993 Forderhase ............. B22F 3/004
264/497
2011/0190446 A1* 8/2011 Matsui .................. B29C 64/165
525/56

(Continued)

FOREIGN PATENT DOCUMENTS

JP    2007-307742    11/2007
JP    2014-065179    4/2014
(Continued)

OTHER PUBLICATIONS

English translation of JP-2015150804-A translated by google patents, lines added through Microsoft Word. Accessed May 19, 2020. (Year: 2020).*

(Continued)

*Primary Examiner* — Francisco W Tschen
*Assistant Examiner* — Elisa H Vera
(74) *Attorney, Agent, or Firm* — Xsensus LLP

(57) ABSTRACT

A device for fabricating a three-dimensional fabrication object includes a fabrication part, a flattening member to place powder in the fabrication part to form an excessively thick powder layer and remove the powder on the top surface side of the excessively thick powder layer multiple times to obtain a powder layer while moving in a direction orthogonal to a lamination direction of the powder layer, and a fabrication unit to bind the powder in the powder layer to form a laminar fabrication object, (wherein the laminar fabrication object is formed repeatedly to fabricate the three-dimensional fabrication object), wherein the amount of a layer thickness of the powder removed for the last time is less than that for any other time.

11 Claims, 28 Drawing Sheets

(51) Int. Cl.
    *B29C 64/218* (2017.01)
    *B33Y 10/00* (2015.01)
    *B33Y 30/00* (2015.01)
    *B28B 1/00* (2006.01)
    *B29C 64/153* (2017.01)
    *B22F 10/20* (2021.01)
    *B22F 3/24* (2006.01)
    *B22F 3/00* (2021.01)
    *B22F 1/00* (2006.01)

(52) U.S. Cl.
    CPC .......... *B29C 64/165* (2017.08); *B29C 64/218* (2017.08); *B33Y 10/00* (2014.12); *B33Y 30/00* (2014.12); *B22F 1/0062* (2013.01); *B22F 3/004* (2013.01); *B22F 2003/247* (2013.01); *B22F 2999/00* (2013.01); *B29C 64/153* (2017.08)

(56) References Cited

U.S. PATENT DOCUMENTS

2015/0343533 A1   12/2015   Park et al.
2016/0067929 A1   3/2016   Park
2016/0368214 A1   12/2016   Sasaki et al.
2017/0120521 A1   5/2017   Sakura et al.
2018/0229428 A1*   8/2018   Takano ................. B29C 64/218

FOREIGN PATENT DOCUMENTS

JP    2015-150804    8/2015
JP    2015150804 A *    8/2015
JP    2015-227021    12/2015
JP    2016-055625    4/2016
JP    2017-087469    5/2017

OTHER PUBLICATIONS

Extended European Search Report dated Sep. 10, 2018 in Patent Application No. 18170383.6, 8 pages.

* cited by examiner

DEVICE FOR FABRICATING THREE-DIMENSIONAL FABRICATION OBJECT AND METHOD OF MANUFACTURING THREE-DIMENSIONAL FABRICATION OBJECT

CROSS-REFERENCE TO RELATED APPLICATIONS

This patent application is based on and claims priority pursuant to 35 U.S.C. § 119 to Japanese Patent Application Nos. 2017-094972 and 2017-103119, filed on May 11, 2017 and May 24, 2017, respectively, in the Japan Patent Office, the entire disclosures of which are hereby incorporated by reference herein.

BACKGROUND

Technical Field

The present disclosure relates to a device for fabricating a three-dimensional fabrication object and a method of manufacturing a three-dimensional fabrication object.

Description of the Related Art

A device for fabricating a three-dimensional fabrication object is known which repeats forming a powder layer having a predetermined thickness in a fabrication unit and binding powder of the powder layer in a predetermined form to form a laminar fabrication structure and laminates the laminar fabrication structure to fabricate a three-dimensional fabrication object.

For example, a device for fabricating a three-dimensional fabrication object has been proposed in which, in the powder layer forming, an excessively thick powder layer thicker than a predetermined thickness is formed and thereafter the powder on the top surface side of the excessively thick powder layer is removed by a removing device to form a powder layer having a predetermined thickness. Such a three-dimensional device includes and moves a flattening roller (removing member) in parallel with the stage surface of a stage of a fabrication part multiple times to form a single powder layer having a predetermined thickness. During the flattening operation for the first time, the flattening roller supplies the powder to the stage and at the same time flattens the supplied powder to form a powder layer having a thickness greater than the predetermined thickness. Thereafter, while the flattening member removes the powder on the top surface side of the powder layer having a thickness greater than the predetermined thickness, the flattening member simultaneously flattens the upper surface of the powder layer remaining on the stage during the flattening operation for the second time to form a powder layer having the predetermined thickness. In addition, it is possible to remove the powder twice or more during the flattening operation.

SUMMARY

According to the present invention, provided is an improved device for fabricating a three-dimensional fabrication object, which includes a fabrication part, a flattening member to place powder in the fabrication part to form an excessively thick powder layer and remove the powder on the top surface side of the excessively thick powder layer multiple times to obtain a powder layer while moving in a direction orthogonal to a lamination direction of the powder layer, and a fabrication unit to bind the powder in the powder layer to form a laminar fabrication object, wherein the amount of a layer thickness of the powder removed for the last time is less than that for any other time.

As another aspect of the present disclosure, an improved device for fabricating a three-dimensional fabrication object is provided which includes a fabrication part, a flattening member to place powder all over the fabrication part to form a pre-powder layer and remove the powder on the top surface side of the pre-powder layer to form a powder layer while being rotationally driven around a rotation axis orthogonal to a direction of movement of the flattening member against the fabrication part, and a fabrication unit to bind the powder in the powder layer to form a laminar fabrication object, wherein the rotation speed or the moving speed of the flattening member is faster during removing the powder on the top surface side of the pre-powder layer than during forming the pre-powder layer.

As another aspect of the present disclosure, an improved method of manufacturing a three-dimensional fabrication object, which includes forming an excessively thick powder layer in a fabrication part, removing powder on a top surface side of the excessively thick powder layer multiple times to obtain a powder layer, binding powder in the powder layer to form a laminar fabrication structure and repeating the forming, the removing, and the binding to fabricate a three-dimensional fabrication object, wherein an amount of the powder in the excessively thick powder layer removed for the last time is smaller than that for any other time.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
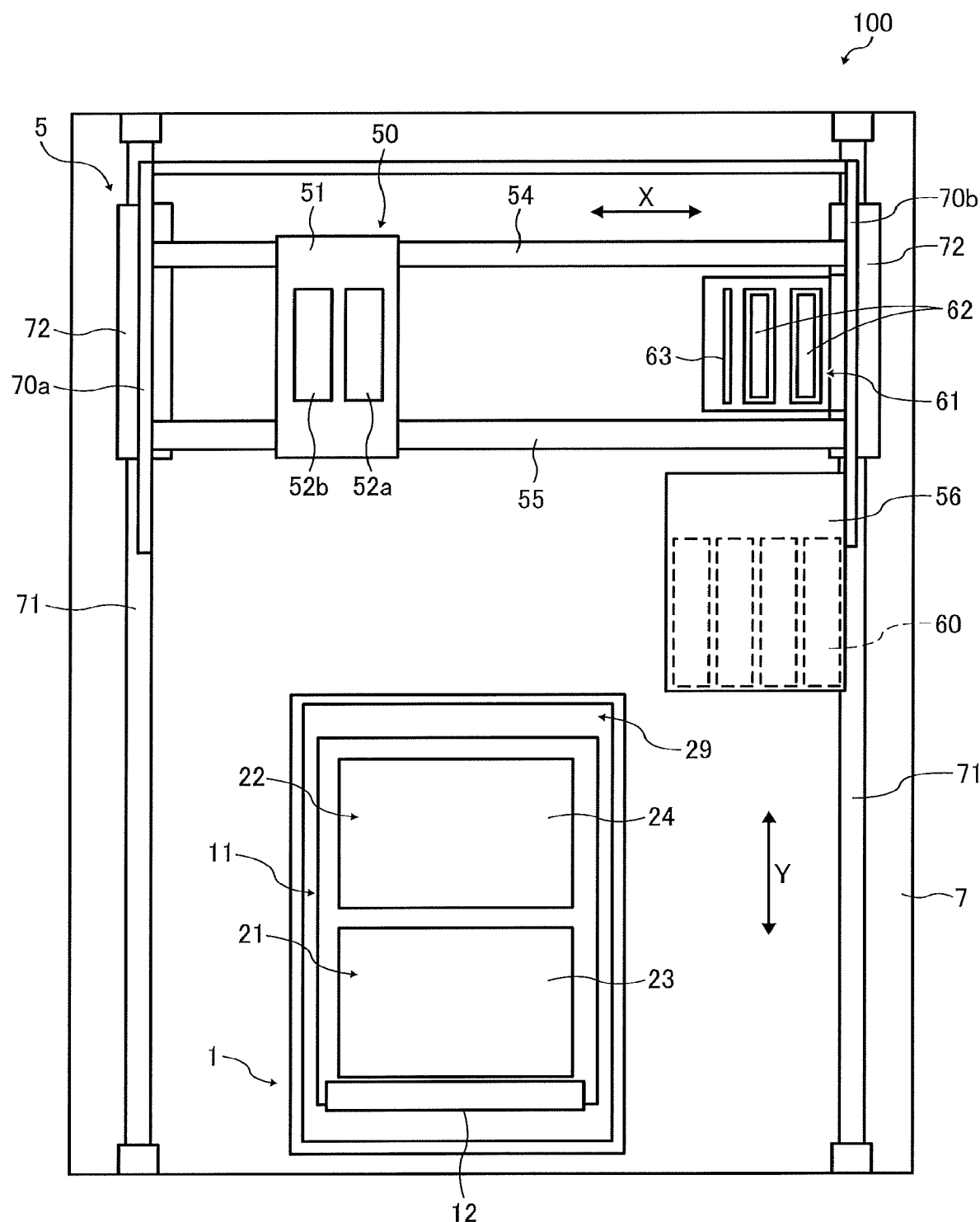
FIG. 1 is a diagram of a schematic planar view illustrating a device for fabricating a three-dimensional fabrication object according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

To improve quality of a three-dimensional fabrication object, it is desirable that powder density of a powder layer is high and the deviation from the desired fabrication from is small when the powder is bound to obtain a desired fabrication form. However, for a typical device for fabricating a three-dimensional fabrication object, powder density of a powder layer is insufficient when binding powder to obtain a desired form during fabrication and the fabrication accuracy of the thus-obtained three-dimensional fabrication object tends to deteriorate.

An embodiment of the device for fabricating a three-dimensional object (three-dimensional fabrication object) relating to the present disclosure is described below.

Figure 2:
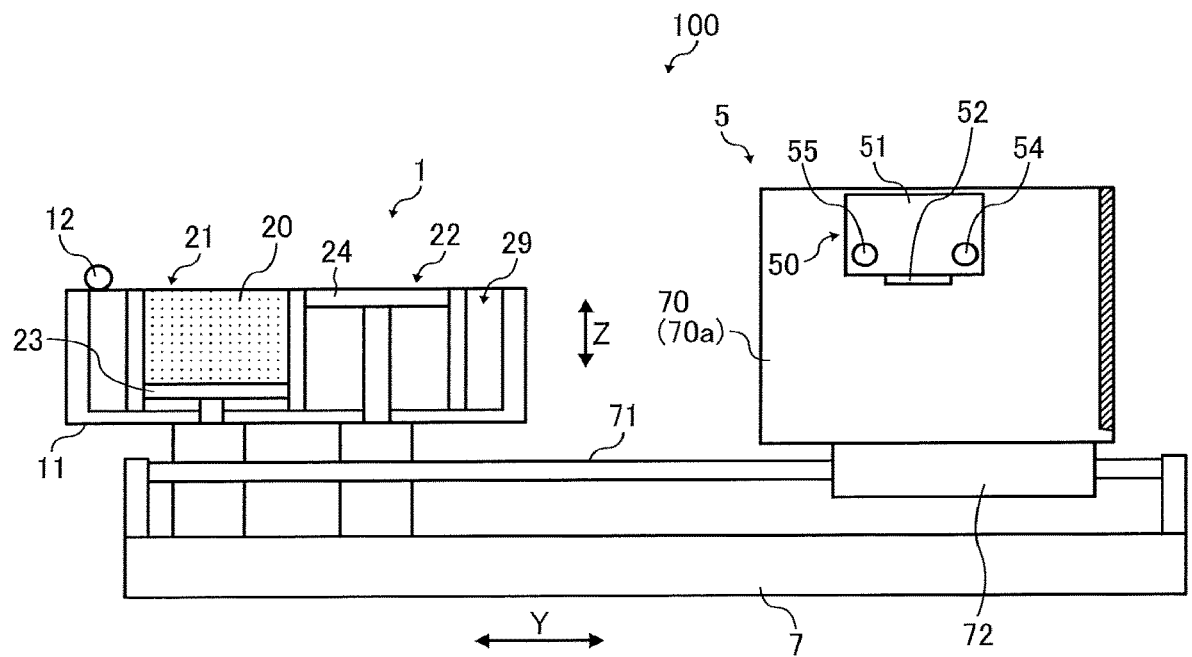
FIG. 2 is a diagram of a schematic side view illustrating a device for fabricating a three-dimensional fabrication object according to an embodiment of the present disclosure.
Figure 3:
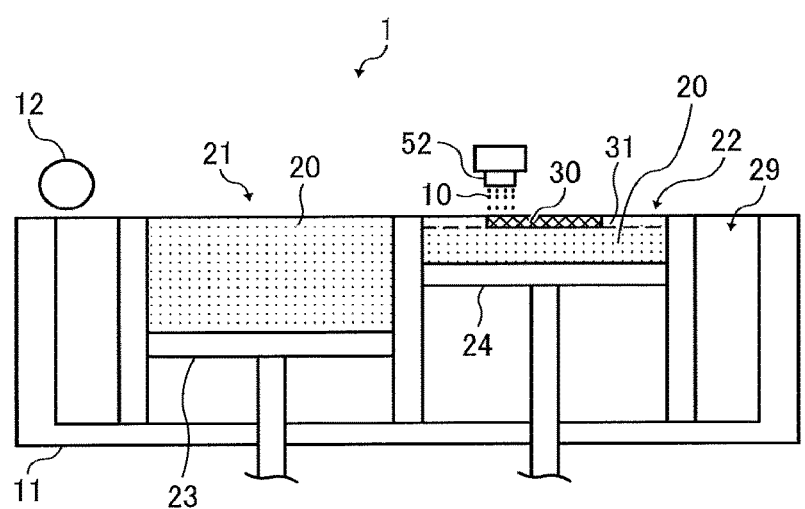
FIG. 3 is a diagram of an enlarged side view illustrating a fabrication stage in a three-dimensional object according to an embodiment of the present disclosure.

FIG. 1 is a diagram illustrating a schematic planar view of a device 100 for fabricating a three-dimensional object of the embodiment, and FIG. 2 is a diagram illustrating a schematic side view of the device 100 illustrated in FIG. 1 from the right. FIG. 3 is a diagram illustrating an enlarged side view of a powder holding unit 1 illustrated in FIG. 2 during fabrication.

Figure 4:
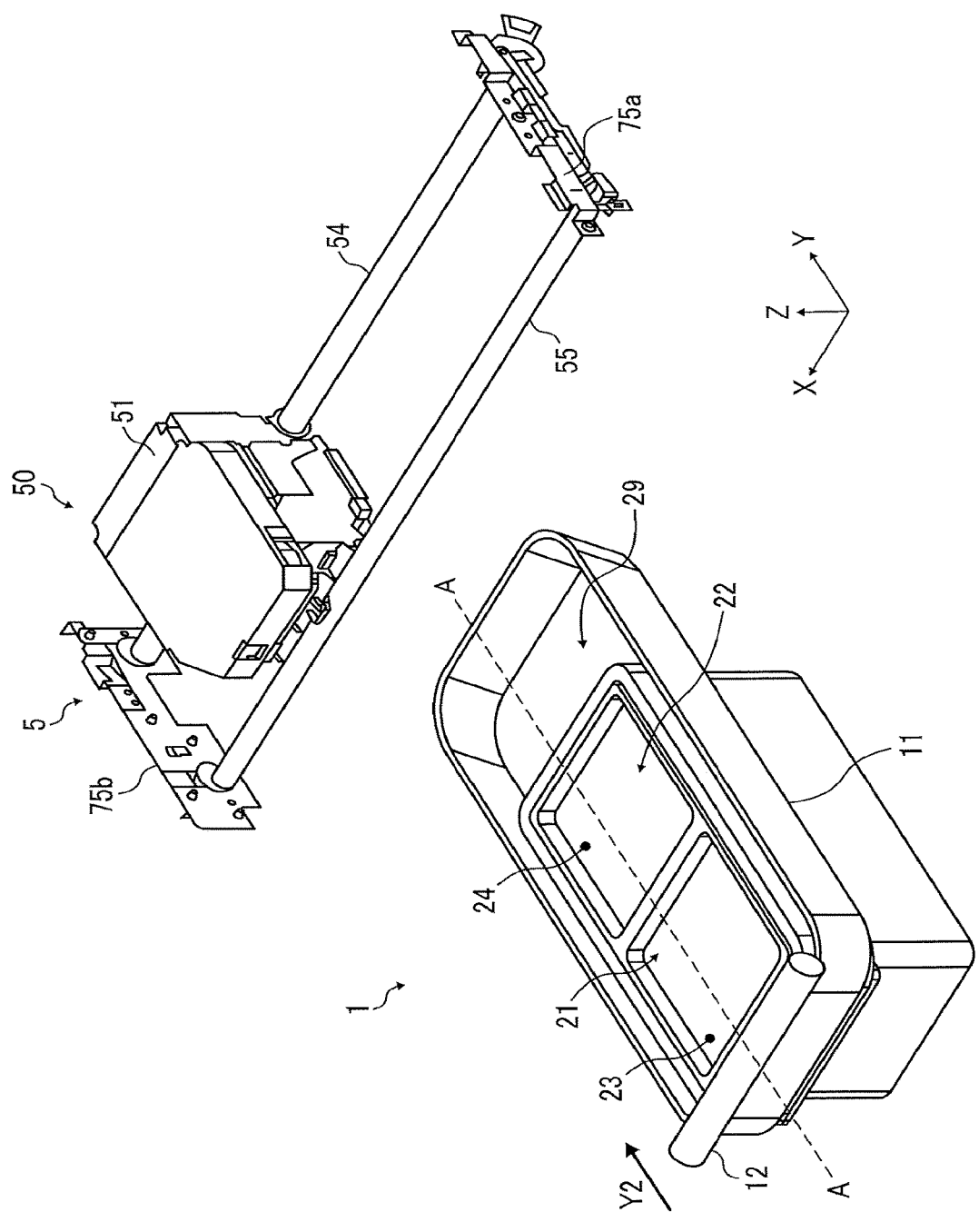
FIG. 4 is a diagram of perspective view illustrating the main part of a device for fabricating a three-dimensional fabrication object according to an embodiment of the present disclosure.

FIG. 4 is a diagram illustrating a perspective view of the main part (the powder holding unit 1 and a fabrication unit 5) of the device 100. The powder holding unit 1 and the fabrication unit 5 can relatively move to each other in the Y direction. A liquid discharging unit 50 of the fabrication unit 5 is configured relatively movable to the powder holding unit 1 in the X direction. FIG. 3 is a schematic cross section on line A-A of FIG. 4.

The device 100 is a fabrication device with powder. The device 100 includes the powder holding unit 1 and the fabrication unit 5. The powder holding unit 1 forms a laminar fabrication structure 30 in which powder 20 is bound. The fabrication unit 5 discharges a liquid fabrication 10 against the powder layer of the powder 20 placed in laminate in the powder holding unit 1.

The powder holding unit 1 includes a powder storage tank 11 and a flattening roller 12 as a rotary member (rotating body) as a flattening member constituting a flattening device (recoater, also a removing member). The flattening member can take, for example, a member having a plate-like form (blade) instead of the rotary member.

The powder storage tank 11 includes a fabrication tank 22 (fabrication part) in which the laminar fabrication structure 30 is laminated to fabricate a three-dimensional fabrication object, a supply tank 21 to store the powder 20 supplied to the fabrication tank 22, and an extra powder collection tank 29 to collect the extra amount of the powder 20 supplied to the fabrication tank 22. The fabrication tank 22 and the supply tank 21 are disposed side by side in the Y direction.

A supply stage 23 constituting the base of the supply tank 21 freely elevates up and down in the vertical direction (height direction). The powder 20 as fabrication material is placed on the supply stage 23.

A supply stage 24 constituting the base of the fabrication tank 22 freely elevates up and down in the vertical direction (height direction). On the fabrication stage 24, a three-dimensional fabrication object is fabricated in which the laminar fabrication structure 30 is laminated.

Figure 5:
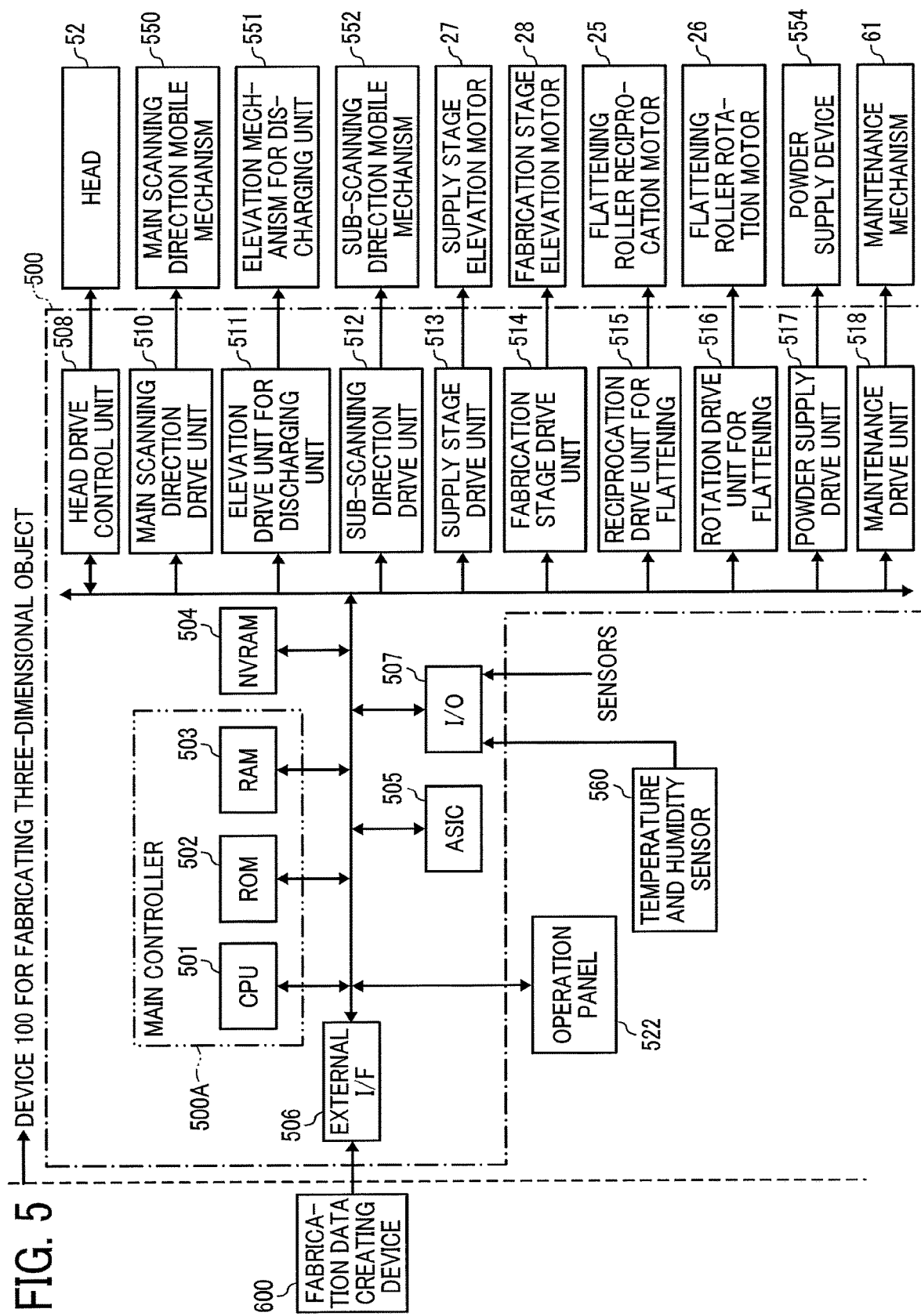
FIG. 5 is a block diagram illustrating the control unit of a device for fabricating a three-dimensional object according to an embodiment of the present disclosure.

FIG. 5 is a block diagram illustrating a control unit 500 of the device 100. The control unit 500 controls driving a supply stage elevation motor 27 to elevate up and down the supply stage 23 in the Z direction (height direction). In addition, the control unit 500 controls driving a fabrication stage elevation motor 28 to elevate up and down the fabrication stage 24 in the Z direction (height direction).

The side of the supply stage 23 is disposed to abut on the inner surface of the supply tank 21. The side of the fabrication stage 24 is disposed to abut on the inner surface of the fabrication tank 22. The upper surfaces of the supply stage 23 and the fabrication stage 24 are held to be horizontal.

A powder supply device 554 is disposed in the supply tank 21. At the time of starting fabrication or when the amount of the powder 20 in the supply tank 21 decreases, the control unit 500 controls driving a powder supply drive unit 517 to supply the powder 20 in the tank constituting the powder supply device 554 to the supply tank 21. As the method of conveying powder for powder supply, for example, a screw conveyor method using a screw and an air transfer method using air are suitable.

The flattening roller 12 has a length along its axis (length along the X direction) longer than the widths of the inside dimension of the fabrication tank 22 and the supply tank 21 and is disposed reciprocally movable relatively to the stage surface in the Y direction along the stage surface (on which the powder 20 is placed) of the fabrication stage 24. The control unit 500 controls driving a flattening roller reciprocation motor 25 to cause the flattening roller 12 to horizontally move along the upper surfaces of the supply stage 23 and the fabrication stage 24. To supply the powder 20 to the fabrication tank 22, the flattening roller 12 is horizontally moved. As a result, the flattening roller 12 partially pushes the powder 20 present on the supply stage 23 of the supply tank 21 to the fabrication tank 22. At the same time, the flattening roller 12 smooths and flattens the surface (upper surface) of the powder 20 supplied to the fabrication tank 22 to form a powder layer 31 having a predetermined thickness.

In addition, a flattening roller rotation motor 26 drives and rotates the flattening roller 12. The flattening roller 12 reciprocally moves in the horizontal direction to pass over the supply tank 21 and the fabrication tank 22 while being rotated by the flattening roller rotation motor 26. Consequently, the flattening roller 12 pushes the upper part of the powder 20 present on the supply tank 21 to the fabrication tank 22 and also flattens the powder 20 while passing over the fabrication tank 22 to form the powder layer 31 having a predetermined thickness.

The fabrication unit 5 includes the liquid discharging unit 50 to discharge or apply the liquid fabrication 10 to the powder layer 31 to bind the powder 20 on the fabrication stage 24 to form the laminar fabrication structure 30 as a laminar structure in which the powder 20 is bound.

The liquid discharging unit 50 includes a carriage 51 and two liquid discharging heads, i.e., a first head 52a and a second head 52b (collectively referred to as head 52) carried by the carriage 51. The number of the heads is not limited to two and can be one or three or more.

A first guiding member 54 and a second guiding member 55 hold the carriage 51 movable in the X direction indicated by the arrow (hereinafter referred to as X direction as well as Y direction and Z direction) as the main scanning direction. A first supporting member 75a and a second supporting member 75b as the supporting members support the first guiding member 54 and the second guiding member 55 at both ends in the X direction in such a manner that both of the first guiding member 54 and the second guiding member 55 are held movable up and down against side plates 70 (a first side plate 70a and a second side plate 70b). An X direction scanning motor constituting a main scanning direction mobile mechanism 550 reciprocates this carriage 51 in the X direction as the main scanning direction via a pully and a belt.

Each of a first head 52a and a second head 52b (collectively referred to as head 52) includes two nozzle lines, each having multiples nozzles through which the liquid fabrication 10 is discharged. The two nozzle lines of the first head 52a separately discharge cyan liquid fabrication and magenta liquid fabrication. The two nozzle lines of the second head 52b separately discharge yellow liquid fabrication and black liquid fabrication. The configuration of the head 52 and the color of the liquid fabrication discharged by the head 52 are not limited thereto.

As illustrated in FIG. 1, multiple tanks 60 accommodating each liquid fabrication of the cyan liquid fabrication, magenta liquid fabrication, yellow liquid fabrication, and black liquid fabrication are mounted onto a tank mounting portion 56 to supply the liquid fabrication of each color to the heads 52 via a supply tube, etc.

On one side (on the right hand side in FIG. 1) of the mobile range of the carriage 51 in the X direction, a maintenance mechanism 61 is disposed to maintain and restore the head 52 of the liquid discharging unit 50. The maintenance mechanism 61 is mainly constituted of a cap 62 and a wiper 63. In the maintenance mechanism 61, the cap 62 is caused to adhere to the nozzle surface (on which the nozzle is formed) of the head 52 in order to suction the liquid fabrication from the nozzle. This is to eject the powder 20 and highly-thickened liquid fabrication 10 clogged in the nozzle. Thereafter, the maintenance mechanism 61 wipes off the nozzle surface with a wiper 63 to form a meniscus of the nozzle. In addition, except when the liquid fabrication 10 is discharged, the maintenance mechanism 61 covers the nozzle surface of the head 52 with the cap 62 to prevent contamination of the powder 20 into the nozzle or drying of the liquid fabrication 10.

The fabrication unit 5 includes a slider part 72 held movable by the guiding member 71 disposed on a base member 7 and the whole of the fabrication unit 5 can reciprocate in the Y direction (sub-scanning direction) perpendicular to the X direction. A sub-scanning direction mobile mechanism 552 reciprocates the whole of the fabrication unit 5 in the Y direction.

The liquid discharging unit 50 is disposed movable up and down together with the first guiding member 54 and the second guiding member 55 in the Z direction by an elevation mechanism 551 for discharging unit.

Next, the control unit 500 of the device 100 is described with reference to FIG. 5.

The control unit 500 includes a main control unit 500A including a central processing unit (CPU) 501, a read only memory (ROM) 502, and a random access memory (RAM) 503. The CPU 501 controls the entire of the device 100. The ROM 502 stores programs including a program for the CPU 501 to execute the three-dimensional fabrication and other fixed data. The RAM 503 temporarily saves fabrication data.

The control unit 500 includes a non-volatile random access memory (NVRAM) 504 to hold data while the power to the device 100 is blocked off. In addition, the control unit 500 includes an application specific integrated circuit (ASIC) 505 for image processing of various signal processing for image data and processing input and output signals to control the entire of the device 100.

The control unit 500 includes an external interface (I/F) 506 to send and receive data and signals to be used on receiving fabrication data from an external fabrication data creating device 600. The fabrication data creating device 600 creates fabrication data of the final (i.e., target) three-dimensional fabrication object sliced into each laminar structure and is configured with an information processing device such as a home computer. The control unit 500 includes an input-output (I/O) 507 to take in the detected signals of various sensors. Detected signals of a temperature and humidity sensor 560 to detect the temperature and the humidity as the environment condition of the device and detected signals from other sensors are input into the I/O 507.

The control unit 500 includes a head drive control unit 508 to drive and control the head 52 of the liquid discharging unit 50.

In addition, the control unit 500 includes a main scanning direction drive unit 510 and a sub-scanning direction drive unit 512. The main scanning direction drive unit 510 drives a motor constituting the main scanning direction mobile mechanism 550 to move the carriage 51 of the liquid discharging unit 50 in the X direction (main scanning direction).

The sub-scanning direction drive unit 512 drives a motor constituting the sub-scanning direction mobile mechanism 552 to move the fabrication unit 5 in the Y direction (sub-scanning direction).

The control unit 500 further includes an elevation drive unit 511 for discharging unit to drive a motor constituting the elevation mechanism 551 for discharging unit to move (elevate up and down) the carriage 51 of the liquid discharging unit 50 in the Z direction. It is also possible to have a configuration to elevate up and down the entire of the fabrication unit 5 in the Z direction.

The control unit 500 includes a supply stage drive unit 513 to drive the supply stage elevation motor 27 to elevate up and down the supply stage 23 and a fabrication stage drive unit 514 to drive the fabrication stage elevation motor 28 to elevate up and down the fabrication stage 24. In addition, the control unit 500 includes a reciprocation drive unit 515 for flattening to drive a flattening roller reciprocation motor 25 to move the flattening roller 12 and a rotation drive unit 516 for flattening to drive the flattening roller rotation motor 26 to rotationally drive the flattening roller 12.

The control unit 500 includes a powder supply drive unit 517 to drive a powder supply device 554 to supply the powder 20 to the supply tank 21 and a maintenance drive unit 518 to drive a maintenance mechanism 61 of the liquid discharging unit 50.

The control unit 500 is connected with an operation panel 522 through which information for the device is input by a user and displayed for a user.

The powder 20 is supplied to the fabrication tank 22, for example, in such a manner that the supply stage 23 is elevated 200 µm, the fabrication stage 24 is lowered 100 µm, and the flattening roller 12 is moved in the Y2 direction indicated by the arrow in FIG. 4. Consequently, the flattening roller 12 pushes the powder 20 in an amount corresponding to the elevation of the supply stage 23 in the Y2 direction so that a new powder layer (which is a pre-powder layer 31a) having a thickness of 100 µm is laminated in the fabrication tank 22. Of the powder layer pushed and conveyed by the flattening roller 12, the extra powder 20 that is not allowed to enter into the fabrication tank 22 is collected by an extra powder collection tank 29.

As the powder 20, stainless powder coated with a resin material is used. As the stainless powder, gas atomized powder (PSS316L—20 µm grade, manufactured by SANYO SPECIAL STEEL Co., Ltd.) is used. In addition, the resin material for coating is acetoacetyl group-modified polyvinyl alcohol (Gohsenx™ Z-100, manufactured by The Nippon Synthetic Chemical Industry Co., Ltd.).

The resin material is not limited thereto. Specific examples include, but are not limited to, polyvinyl alcohol (PVA-205C, PVA-220C, manufactured by KURARAY CO., LTD.), polyacrylic acids (JURYMER® AC-10, manufactured by TOAGOSEI CO., LTD.), sodium polyacrylate (JURYMER® AC-103P, manufactured by TOAGOSEI CO., LTD.), acetoacetyl group-modified polyvinyl alcohol (Gohsenx Z-300, Gohsenx Z-100, Gohsenx Z-200, Gohsenx Z-205, Gohsenx Z-210, and Gohsenx Z-220, manufactured by The Nippon Synthetic Chemical Industry Co., Ltd.), copolymers of carboxy group-modified polyvinyl alcohol (Gohsenx T-330, Gohsenx T-350, and Gohsenx T-330T, manufactured by The Nippon Synthetic Chemical Industry Co., Ltd.), copolymers of butanediol and vinyl alcohol (Nichigo G-Polymer OKS-8041, manufactured by The Nippon Synthetic Chemical Industry Co., Ltd.), carboxymethyl cellulose (CELLOGEN 5A, manufactured by DAIICHI KOGYO Co., Ltd.), starch (Histard PSS-5, manufactured by Sanwa Starch Co., Ltd.), and gelatin (beMatrix®, manufactured by Nitta Gelatin Inc.).

Next, an example of formation of the powder layer by the device 100 is described with reference to FIG. 6.

FIGS. 6A to 6F are diagrams illustrating an example of the formation of the powder layer 31 having a predetermined thickness in this embodiment.

Figure 6A:
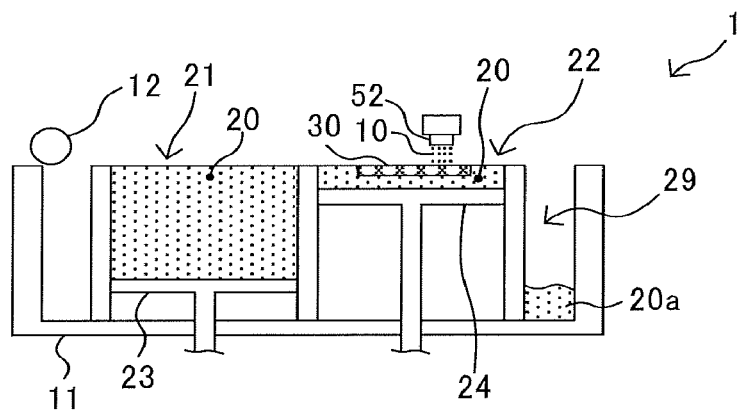
FIGS. 6A to 6F are diagrams illustrating an example of forming a powder layer in a device for fabricating a three-dimensional object according to an embodiment of the present disclosure.

First, as illustrated in FIG. 6A, a single or multiple layers of the laminar fabrication structure 30 is assumed to be formed on the fabrication stage 24 of the fabrication tank 22.

Figure 6B:
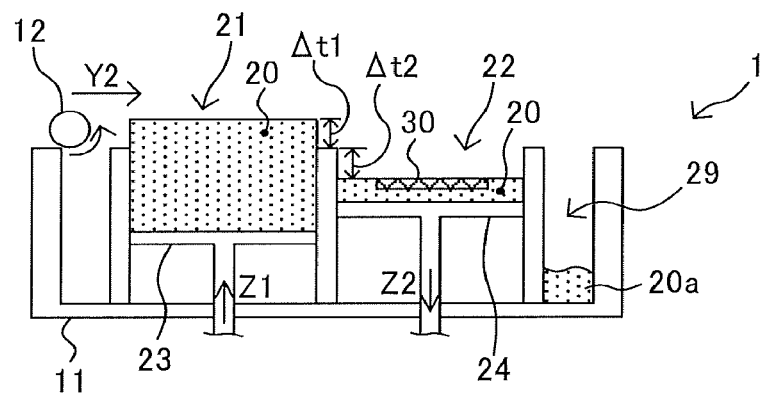

To form the powder layer 31 having a predetermined thickness to form the next laminar fabrication structure 30 on the uppermost laminar fabrication structure 30, as illustrated in FIG. 6B, the supply stage 23 of the supply tank 21 is elevated in an amount corresponding to the amount of movement z1 in the Z1 direction (upward). At the same time, the fabrication stage 24 of the fabrication tank 22 is lowered in an amount corresponding to the amount of movement z2 in the Z2 direction (downward). The amounts of movement z1 and z2 are set to be greater than the target thickness $\Delta t$ (i.e., thickness when the laminar fabrication structure 30 is formed upon supply of the liquid fabrication 10) of the powder layer 31 having a predetermined thickness. This target thickness $\Delta t$ is preferably about several tens μm to several hundreds μm.

For the elevation of the supply stage 23 in an amount of z1, the height of the uppermost surface of the powder 20 on the supply stage 23 is higher by $\Delta t1$ (nearly equal to z1) than the upper part of the side wall forming the supply tank 21. In addition, for the lowering of the fabrication stage 24 in an amount of z2, the height of the uppermost surface of the powder 20 on the fabrication stage 24 is higher by $\Delta t2$ (nearly equal to z2) than the upper part of the side wall forming the fabrication tank 22.

The relation between the amount of movement z1 of the supply stage 23 and the amount of movement z2 of the fabrication stage 24 is $z1 \geq z2$. The upper surface of the supply stage 23 and the upper surface of the fabrication stage 24 have the same area. Therefore, it is possible to supply the powder 20 from the supply tank 21 to the fabrication tank 22 in an amount sufficient to place the powder 20 on the entire of the gap appearing above the uppermost surface of the powder 20 in the fabrication tank 22 by lowering the fabrication stage 24. Of the powder 20 conveyed from the supply tank 21 to the fabrication tank 22, the extra powder 20 not allowed to be supplied to the fabrication tank 22 drops into the extra powder collection tank 29 as the extra powder 20a.

If such extra powder 20a is caused to exist, the extra powder 20a is constantly present on the downstream in the direction of the movement of the flattening roller 12 while the flattening roller 12 conveys the powder 20 from the supply tank 21 to the downstream end of the fabrication tank 22 in the Y2 direction from the supply tank 21 toward the fabrication tank 22. Due to the extra powder 20a being present on the downstream in the direction of movement of the flattening roller 12, the mass of the extra powder 20a presses the powder 20 to form the powder layer 31 having a predetermined thickness, which is true till the downstream end in the direction of movement of the flattening roller 12 in the fabrication tank 22. This is advantageous to form uniform powder layer 31 having a predetermined thickness with a high powder density.

Figure 6C:
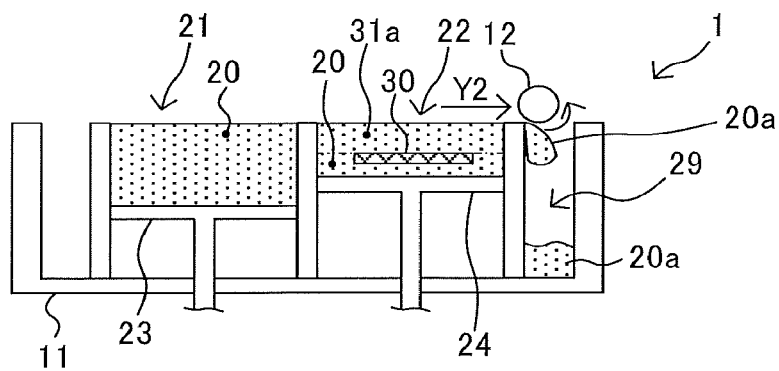
Figure 6D:
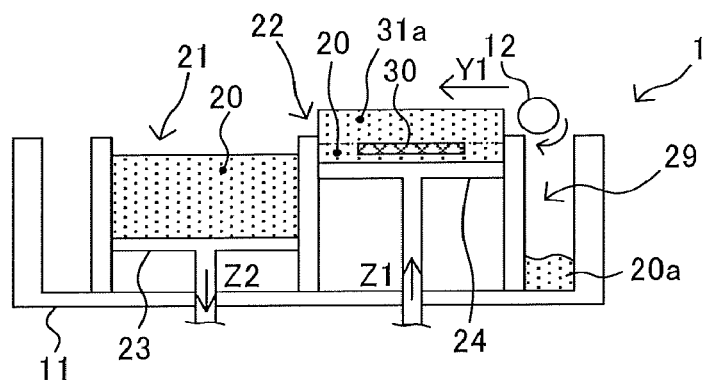

Next, as illustrated in FIGS. 6B and 6C, the flattening roller 12 is moved in the Y2 direction (outbound flattening direction) from the supply tank 21 to the fabrication tank 22. At the same time, the flattening roller 12 is rotationally driven in the direction indicated by the arrow (counterclockwise in FIG. 6) in FIGS. 6B and 6C. Due to this rotational drive, the lowermost part of the periphery of the flattening roller 12 moves in the same direction as the Y2 direction. When the flattening roller 12 moves in the Y2 direction while rotating counterclockwise in FIG. 6, the powder 20 present above the upper surface level of the supply tank 21 can be smoothly conveyed to the fabrication tank 22 in the Y2 direction. Moreover, when the flattening roller 12 is passing over the fabrication tank 22 while rotationally further moving in the Y2 direction, the surface of the powder 20 supplied to the fabrication tank 22 is smoothed and flattened. Due to this, the pre-powder layer 31a having a thickness thicker than the target thickness $\Delta t$ of the finally formed powder layer 31 having a predetermined thickness is formed on the uppermost laminar fabrication structure 30, Sequentially, as illustrated in FIG. 6D, the supply stage 23 of the supply tank 21 is lowered by the amount of movement z3 in the Z2 direction and the fabrication stage 24 of the fabrication tank 22 is elevated by the amount of movement z4 in the Z1 direction. Therefore, the powder 20 located on the upper layer portion of the pre-powder layer 31a formed on the fabrication stage 24 of the fabrication tank 22 swells upward from the upper surface level of the fabrication tank 22 due to the flattening outbound described above. The amount of movement z4 of the fabrication stage 24 at this point is set in such a manner that the gap between the upper surface of the previously formed powder layer 31 having a predetermined thickness and the lowermost part of the flattening roller 12 is the target thickness $\Delta t1$ of the powder layer 31 having a predetermined thickness.

Figure 6E:
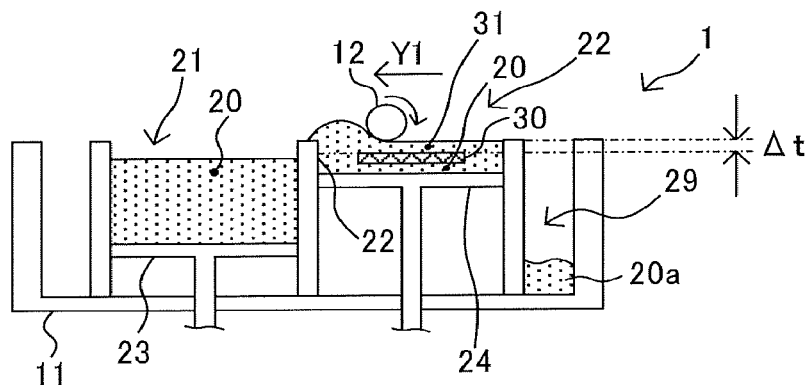

Next, as illustrated in FIG. 6E, the flattening roller 12 is moved in the Y1 direction (inbound flattening direction) from the fabrication tank 22 toward the supply tank 21. At the same time, the flattening roller 12 is rotationally driven in the direction indicated by the arrow (clockwise in FIG. 6) in FIG. 6D. Due to this rotational drive, the lowermost surface of the periphery of the flattening roller 12 moves in the same direction as the Y1 direction. When the flattening roller 12 moves in the Y1 direction while rotating clockwise in FIG. 6, the surface of the powder 20 of the fabrication tank 22 is smoothed and flattened while the powder 20 present above the upper surface level of the fabrication tank 22 is conveyed in the Y1 direction. As a result, the powder layer 31 having a predetermined thickness having a target thickness $\Delta t$ is formed in the fabrication tank 22.

Moreover, when the flattening roller 12 rotates and at the same time moves in the Y1 direction and passes over the fabrication tank 22, unused powder 20 that forms the pre-powder layer 31a but is not used for forming the powder layer 31 having a predetermined thickness is returned to the supply tank 21.

Figure 6F:
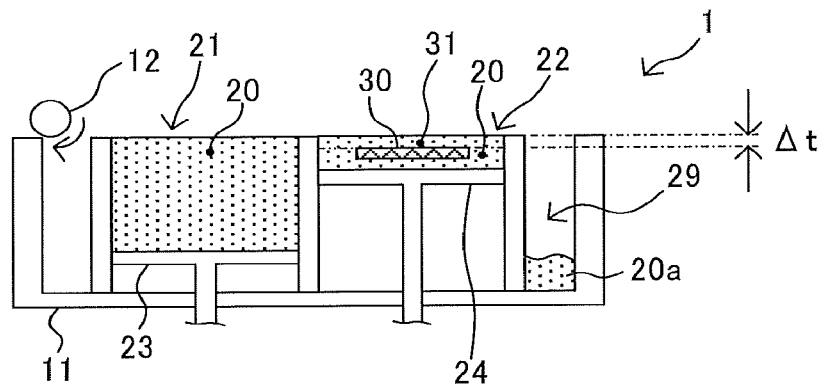

After the powder layer 31 having a predetermined thickness is formed, the flattening roller 12 passes over the supply tank 21 and returns to the initial position (original position) as illustrated in FIG. 6F. Thereafter, back to the operation illustrated in FIG. 6A, the head 52 discharges liquid droplets of the liquid fabrication 10 and the laminar fabrication structure 30 having a predetermined form is formed in the formed powder layer 31 having a predetermined thickness.

Thereafter, the powder 20 is supplied and flattened to form the powder layer 31 having a predetermined thickness and the head 52 discharges the liquid fabrication 10 thereto to form a new laminar fabrication structure 30 on the previously formed laminar fabrication structure 30.

For example, the laminar fabrication structure 30 is formed in such a manner that the powder 20 is mixed with the liquid fabrication 10 discharged from the head 52 thereto to dissolve the adhesive contained in the powder 20 so that the dissolved adhesive is bound with each other to bind the powder 20. The new laminar fabrication structure 30 and the laminar fabrication structure formed therebelow are united to partially form a three-dimensional fabrication object.

The powder layer is formed and the liquid fabrication is discharged a required number of times to complete a three-dimensional fabrication object in which the laminar fabrication structure 30 is laminated.

Figure 7:
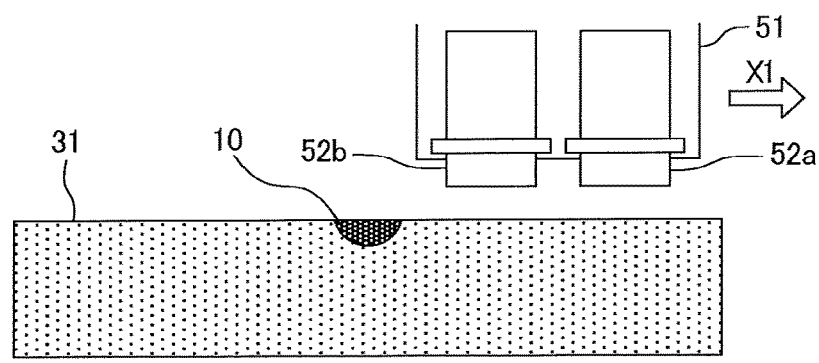
FIG. 7 is a diagram illustrating when a discharged droplet of a liquid fabrication lands on a powder layer.

FIG. 7 is a diagram illustrating when a discharged droplet of the liquid fabrication 10 lands on the powder layer 31 having a predetermined thickness.

FIG. 7 is a diagram illustrating a permeation state of a discharged liquid droplet of the liquid fabrication 10 when the discharged liquid droplet lands on the powder layer 31 having a predetermined thickness based on two-dimensional image data created at a pitch of 300 dpi×300 dpi (corresponding to about 85 µm).

In the operation of forming the powder layer 31 having a predetermined thickness described with reference to FIG. 6, the flattening roller 12 is reciprocated to flatten the powder layer inbound and outbound, i.e., twice, to form a single layer of the powder layer 31 having a predetermined thickness. The powder layer can be flattened three or more times. To form a single layer of the powder layer 31 having a predetermined thickness by flattening the powder layer multiple times, density of the powder 20 constituting the powder layer 31 having a predetermined thickness can be increased step by step, which is advantageous to form a uniform powder layer 31 having a predetermined thickness with high powder density.

In the configuration where the powder layer is flattened multiple times, the powder 20 is supplied to the fabrication tank 22 during the flattening for the first time. The flattening for the second time or later is also the removal of the powder 20 on the top surface side of the pre-powder layer 31a in an amount corresponding to the thickness greater than the target thickness Δt of the powder layer 31 having a predetermined thickness in the pre-powder layer 31a formed in the fabrication tank 22.

In this embodiment, the roller member such as the flattening roller 12 is used as the flattening member. During the flattening, the contact surface (lower front portion in the direction of movement of the periphery of the flattening roller 12) in contact with the powder 20 in front in the direction of the movement of the flattening member is oriented obliquely downward. Therefore, if the flattening member moves, the powder 20 is moved along the direction of movement with the contact surface while generating a force to push it downward. Therefore, due to the flattening member, the powder density can be increased.

The device 100 of the embodiment removes the powder 20 multiple times while forming a single layer of the powder layer 31. Moreover, at least one of the thickness of the portion of the pre-powder layer 31a to be removed and the rotation speed of the flattening roller 12 is set to be different at the removal for the last time and the removal for any other time during the removal multiple times.

A case in which the layer thickness of the powder 20 to be removed and the rotation speed of the flattening roller 12 are constant for the multiple removals to form a single layer of the powder layer 31 having a predetermined thickness is described below as a reference configuration example.

Reference Configuration

FIGS. 8 to 16 are diagrams illustrating forming a powder layer of the reference configuration example and schematic cross sections of the supply tank 21 and the fabrication tank 22 of the powder holding unit 1 from the right in FIG. 1.

The powder supply in the powder layer forming of the reference configuration example is described with reference to FIGS. 8 to 10.

Figure 8:
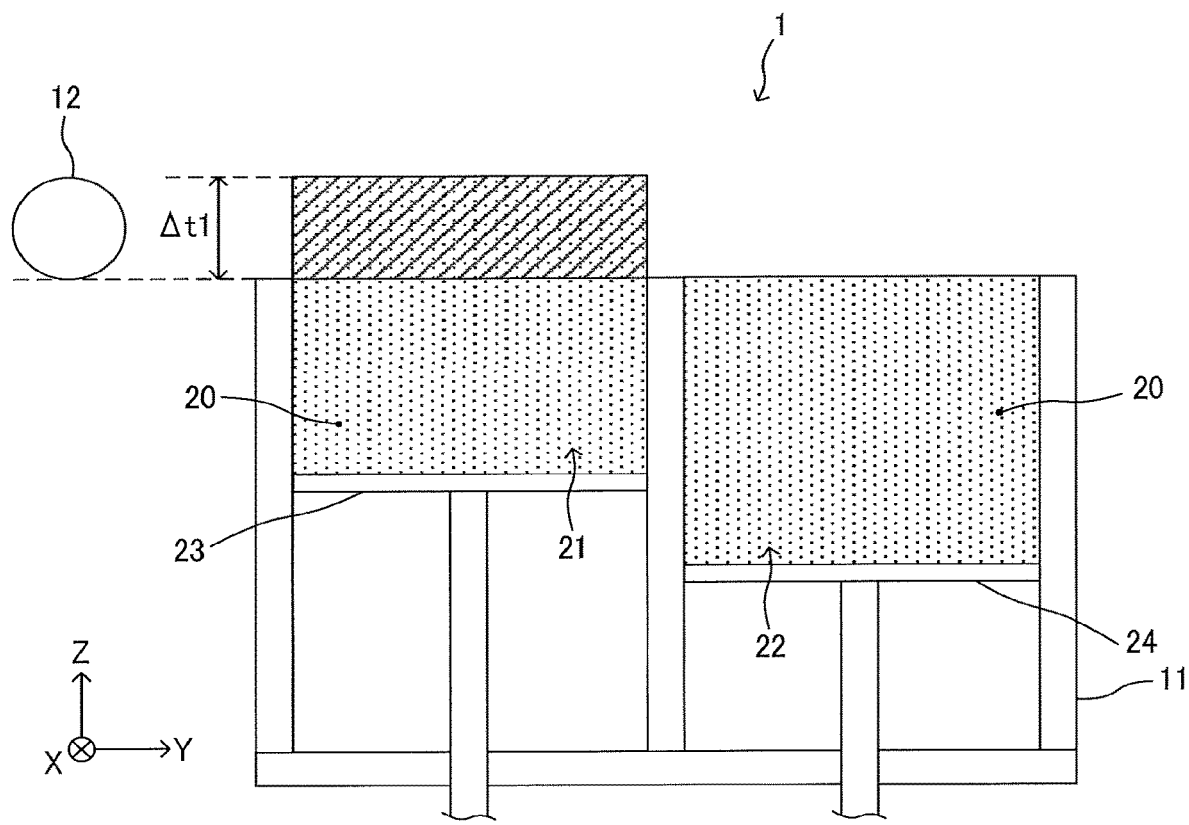
FIG. 8 is a diagram illustrating an operation of elevating a supply stage in powder supply process.

As illustrated in FIG. 8, the supply stage 23 is relatively elevated against the flattening roller 12 by Δt1 (=264 µm) in the Z direction (vertical direction). As illustrated in FIG. 9, the fabrication stage 24 is relatively elevated down against the flattening roller 12 by Δt2 (=240 µm) in the Z direction.

Figure 9:
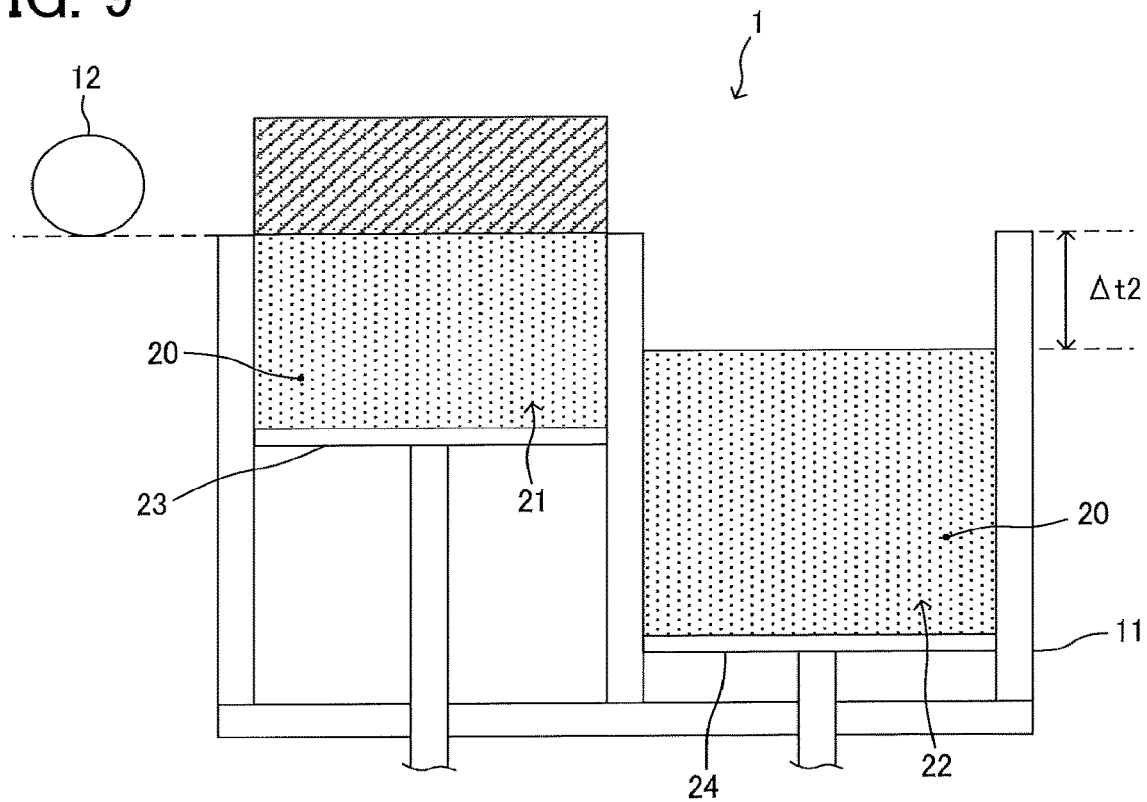
FIG. 9 is a diagram illustrating an operation of lowering a supply stage in powder supply process.
Figure 10:
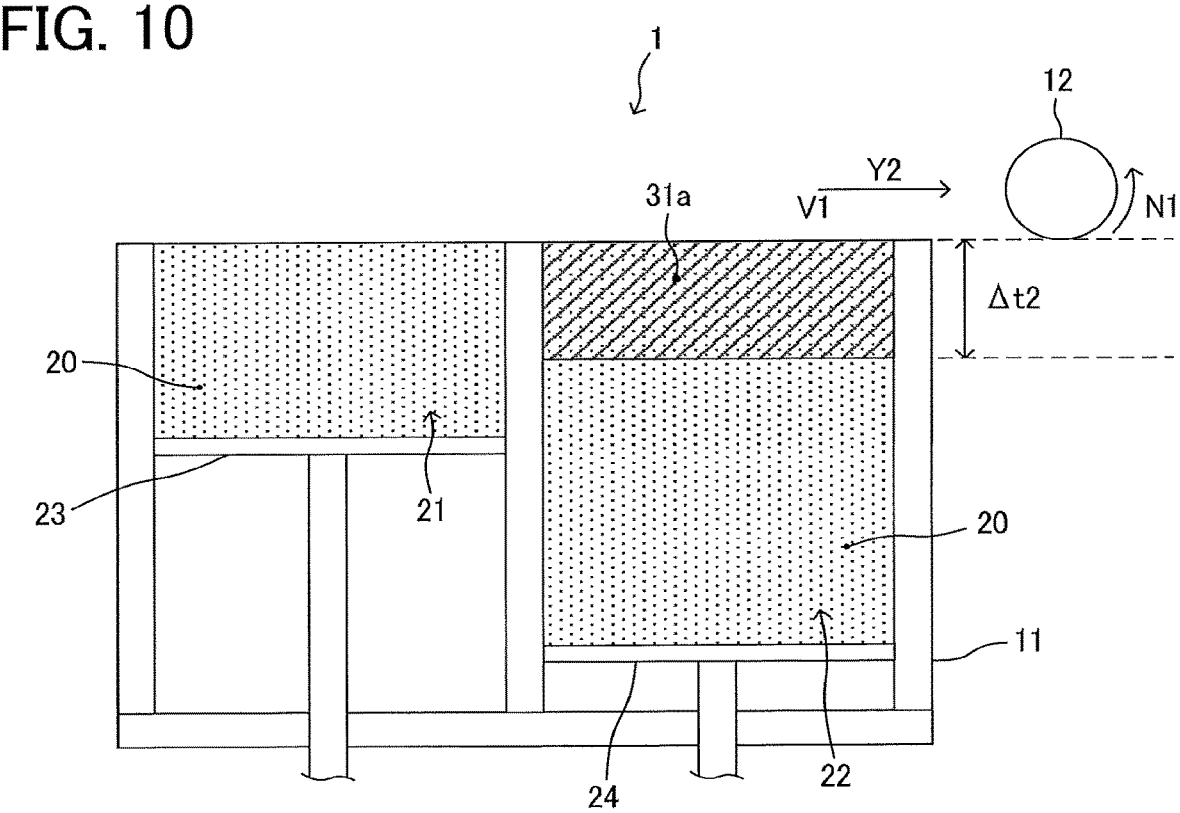
FIG. 10 is a diagram illustrating a flattening operation for the first time.

Next, as illustrated in FIG. 10, the flattening roller 12 is relatively translated against the powder storage tank 11 at a speed of V1 (=50 mm/s) in the Y2 direction. At this point, the flattening roller 12 is rotationally translated at a rotation speed of N1 {=2 (rps)} in the direction of rolling up (counterclockwise in FIG. 10) the powder 20 in the powder holding unit 1. The flattening roller 12 pushes the diagonally hatched portion in FIGS. 8 and 9 of the powder 20 on the supply stage 23 toward the fabrication stage 24.

Accordingly, as illustrated in FIG. 10, the flattening roller 12 supplies the powder 20 to the fabrication tank 22 and flattens it to form the pre-powder layer 31a having a thickness of 240 µm. The process of moving the flattening roller 12 to supply the powder 20 and flatten the powder layer thereof is flattening for the first time.

The powder removal in the powder layer forming of the reference configuration example is described with reference to FIGS. 11 to 16.

Figure 11:
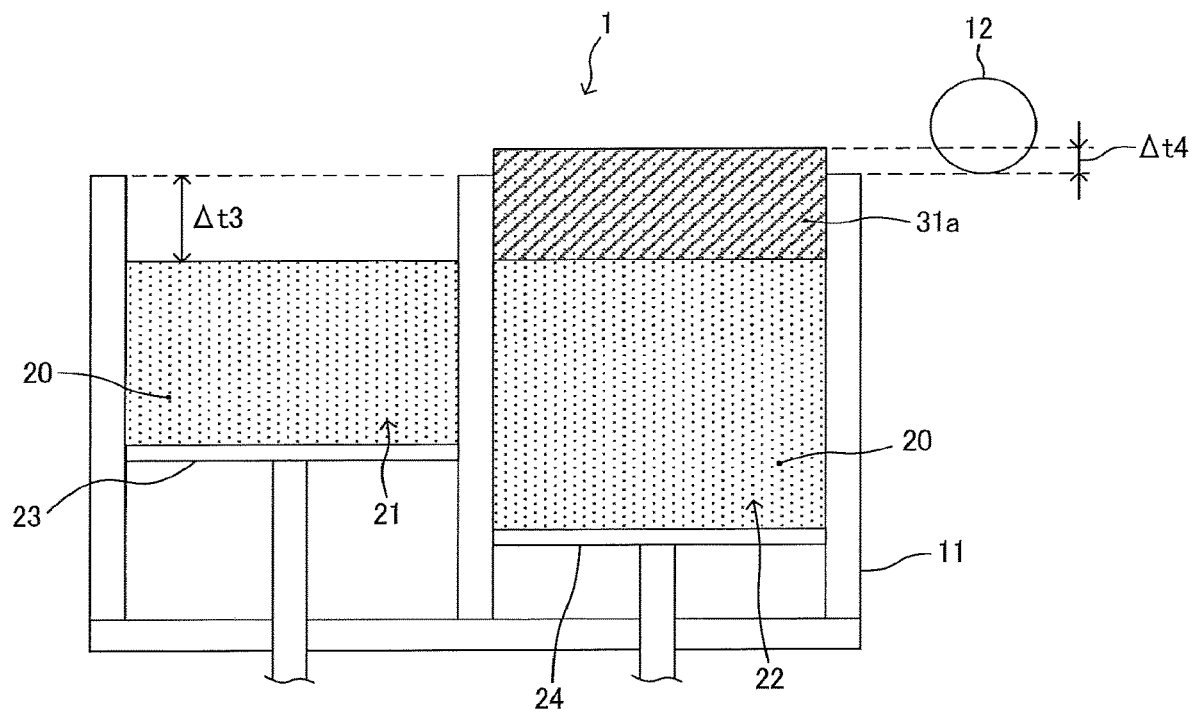
FIG. 11 is a diagram illustrating elevation of a fabrication stage for a flattening operation for the second time.
Figure 12:
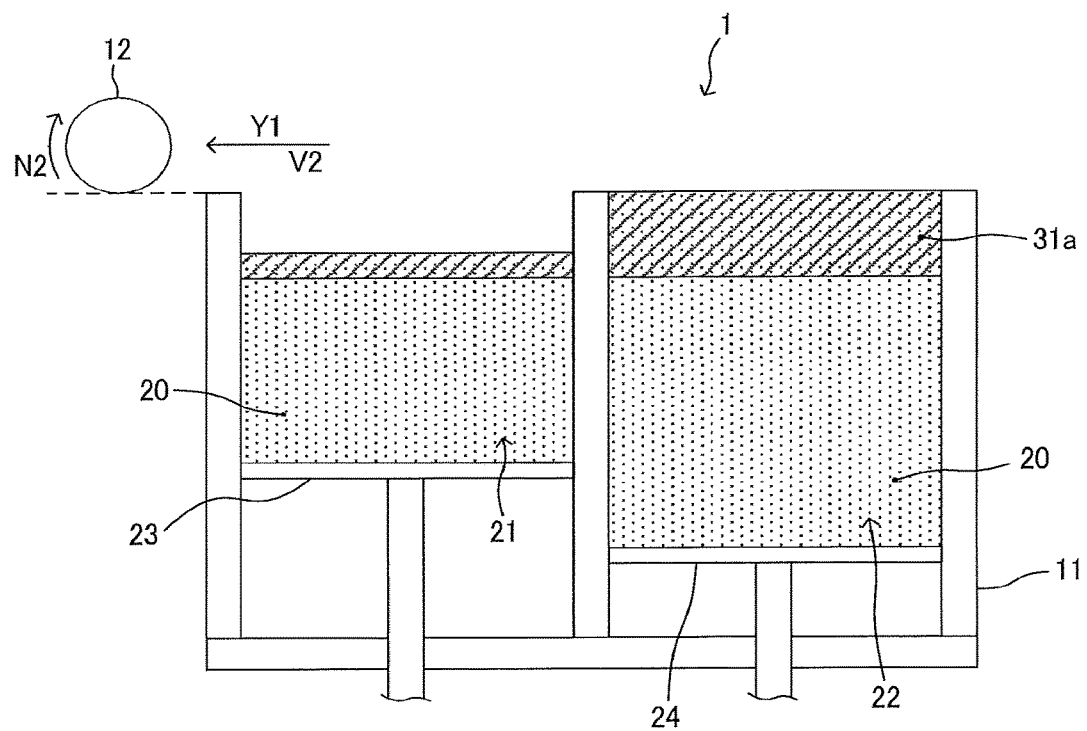
FIG. 12 is a diagram illustrating movement of a flattening roller for a flattening operation for the second time.

FIGS. 11 and 12 are diagrams illustrating the flattening for the second time, which is the removal for the first time.

As illustrated in FIG. 11, the supply stage 23 is relatively elevated down against the flattening roller 12 by Δt3 (=306 µm) in the Z direction for the flattening for the second time. The supply stage 23 is lowered against the flattening roller 12 to prevent the flattening roller 12 from bring into contact the powder 20 in the supply tank 21 while the flattening roller 12 horizontally moves over the supply stage 23 for removal.

Moreover, as illustrated in FIG. 11, the fabrication stage 24 is relatively elevated against the flattening roller 12 by Δt4 (=60 µm) in the Z direction for the flattening for the second time.

Next, as illustrated in FIG. 12, the flattening roller 12 is relatively translated against the powder storage tank 11 at a speed of V2 (=50 mm/s) in the Y1 direction. At this point, the flattening roller 12 is rotationally translated at a rotation speed of N2 {=5 (rps)} in the direction of rolling up (clockwise in FIG. 12) the powder 20 in the fabrication tank 22. For this reason, as illustrated in FIG. 12, the upper layer part having a thickness of Δt4 of the pre-powder layer 31a formed over the fabrication tank 22 is removed and simultaneously the upper surface of the pre-powder layer 31a is flattened.

The powder 20 the flattening roller 12 pushed away and removed from the pre-powder layer 31a on the fabrication stage 24 at the flattening for the second time is partially or entirely returned to the supply tank 21.

Figure 13:
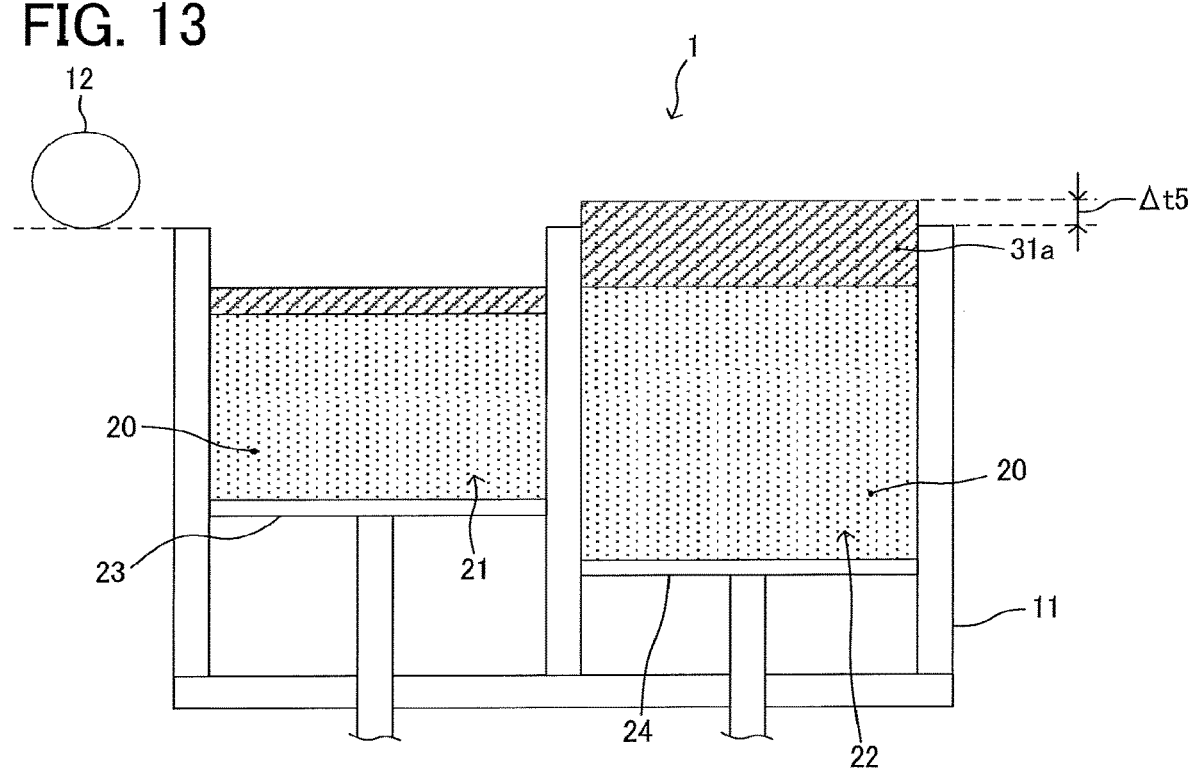
FIG. 13 is a diagram illustrating elevation of a fabrication stage for a flattening operation for the third time.
Figure 14:
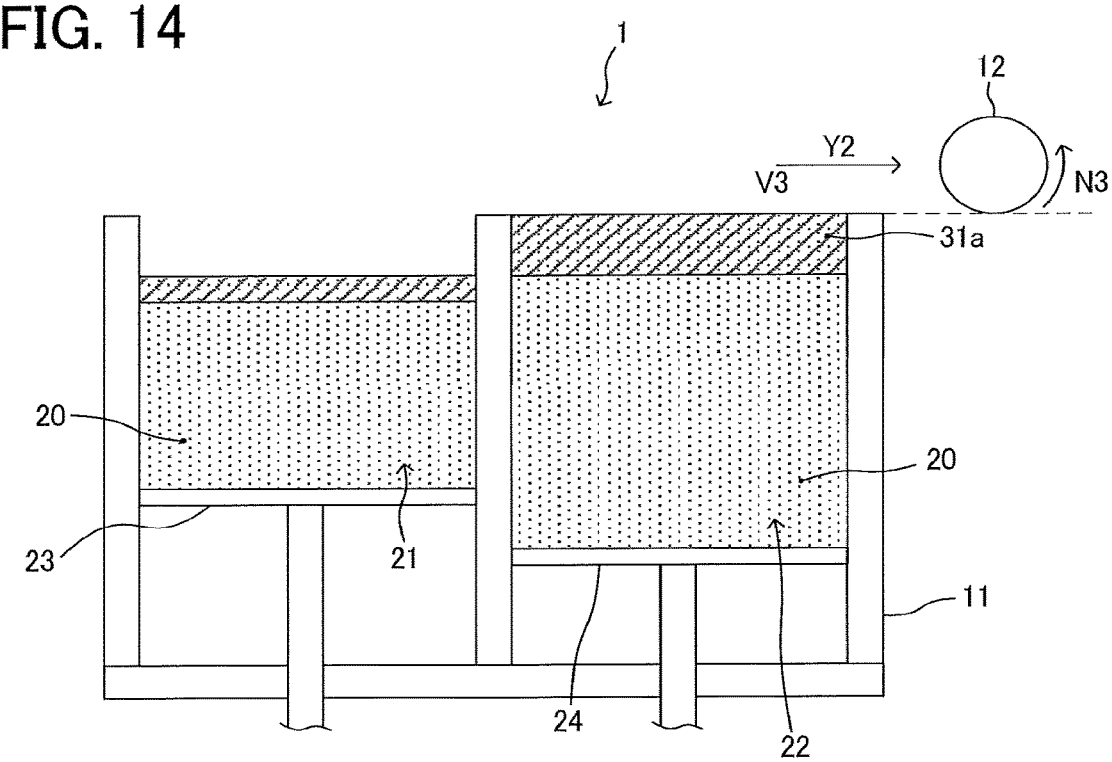
FIG. 14 is a diagram illustrating movement of a flattening roller for a flattening operation for the third time.

FIGS. 13 and 14 are diagrams illustrating the flattening for the third time, which is the removal for the second time.

As illustrated in FIG. 13, the fabrication stage 24 is relatively elevated against the flattening roller 12 by Δt5 (=60 µm) in the Z direction for the flattening for the third time. Next, as illustrated in FIG. 14, the flattening roller 12 is relatively translated against the powder storage tank 11 at a speed of V3 (=50 mm/s) in the Y2 direction. At this point, the flattening roller 12 is rotationally translated at a rotation speed of N3 {=5 (rps)} in the direction of rolling up (counterclockwise in FIG. 14) the powder 20 in the fabrication tank 22. For this reason, as illustrated in FIG. 14, the upper layer part having a thickness of Δt5 of the pre-powder layer 31a formed in the fabrication tank 22 is removed and simultaneously the upper surface of the pre-powder layer 31a is flattened.

The powder 20 the flattening roller 12 pushed away and removed from the pre-powder layer 31a on the fabrication stage 24 at the flattening for the third time is partially or entirely returned to the extra powder collection tank 29.

Figure 15:
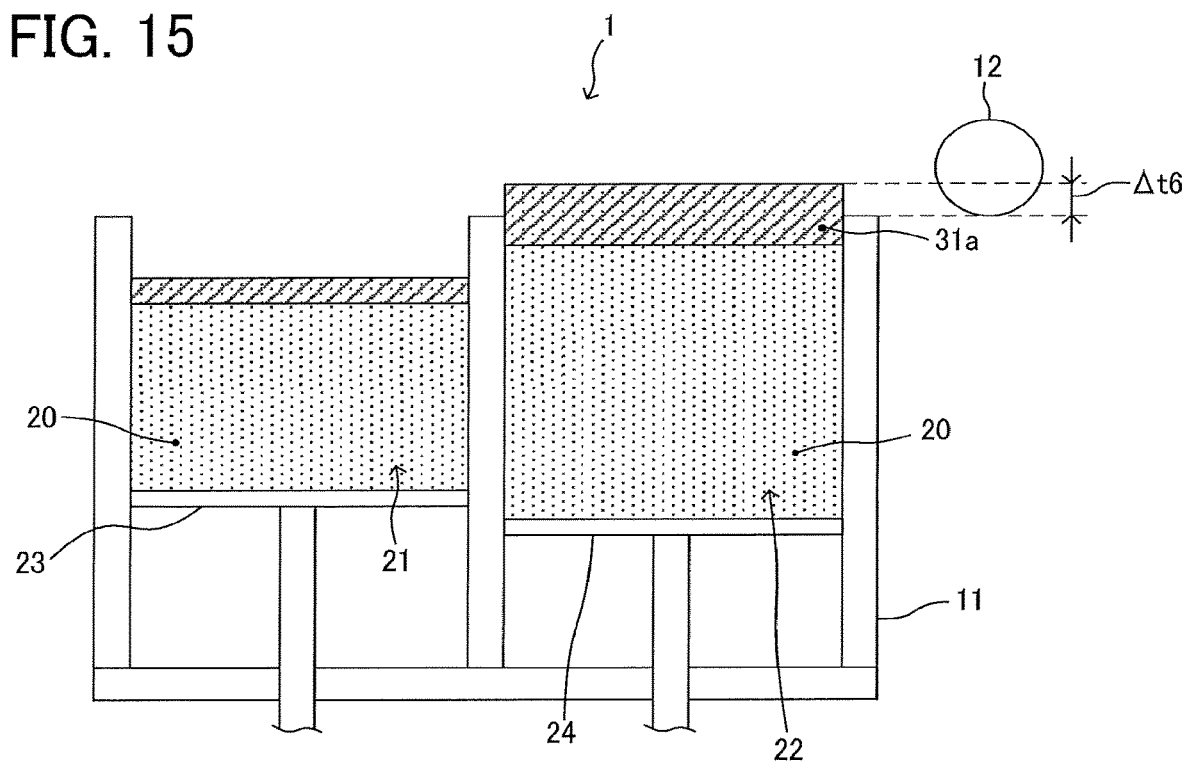
FIG. 15 is a diagram illustrating elevation of a fabrication stage for a flattening operation for the fourth time.
Figure 16:
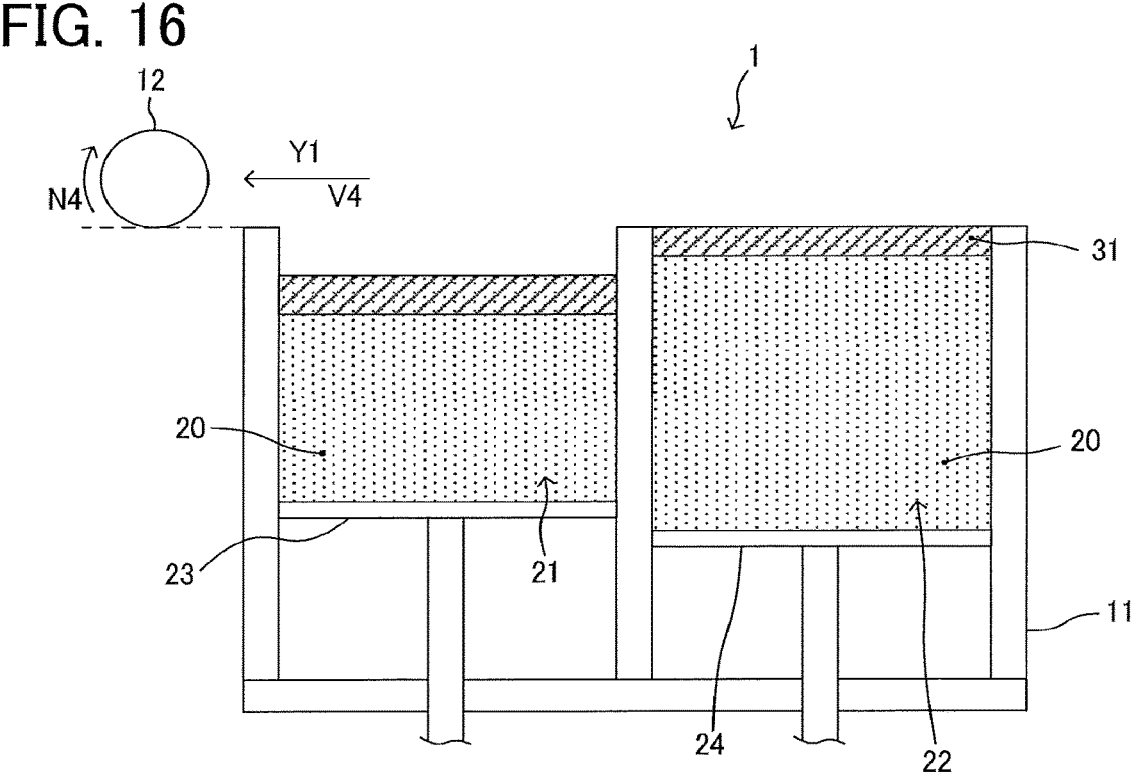
FIG. 16 is a diagram illustrating movement of a flattening roller for a flattening operation for the fourth time.

FIGS. 15 and 16 are diagrams illustrating the flattening for the fourth time, which is the removal for the third time.

As illustrated in FIG. 15, the fabrication stage 24 is relatively elevated against the flattening roller 12 by Δt6 (=60 μm) in the Z direction for the flattening for the fourth time.

Next, as illustrated in FIG. 16, the flattening roller 12 is relatively translated against the powder storage tank 11 at a speed of V4 (=50 mm/s) in the Y1 direction. At this point, the flattening roller 12 is rotationally translated at a rotation speed of N4 {=5 (rps)} in the direction of rolling up (clockwise in FIG. 16) of the powder 20 in the fabrication tank 22. Due to this, the upper layer part having a thickness of Δt6 of the pre-powder layer 31a formed on the fabrication tank 22 is removed and simultaneously the upper surface of the pre-powder layer 31a is flattened to form the pre-powder layer 31 having a predetermined thickness (60 μm).

The powder 20 the flattening roller 12 pushed away and removed from the pre-powder layer 31a on the fabrication stage 24 at the flattening for the fourth time is partially or entirely returned to the supply tank 21.

Next, the evaluation test of the reference configuration example is described.

The evaluation method is as follows:

The following was used as the powder 20. That is, SUS powder (PSS316L, manufactured by SANYO SPECIAL STEEL Co., Ltd.) having an average particle diameter of 8 μm was coated with an organic material (polyvinyl alcohol DF-05). 0.25 percent by mass of an acrylic resin (MP-1451, manufactured by Soken Chemical & Engineering Co., Ltd.) was added to the coated SUS powder to obtain powder mixture. Thereafter, the powder layer 31 having a predetermined thickness of the powder 20 was formed in the fabrication tank 22 as described above with reference to FIGS. 8 to 16 to evaluate the void ratio of the powder 20.

For comparison, the void ratio of the powder layer 31 having a predetermined thickness formed in the fabrication tank 22 for the configuration of flattening twice and removal once was 60.4 percent. In the configuration of removal three times like the referential configuration example, the void ratio of the powder layer 31 having a predetermined thickness formed in the fabrication tank 22 was 58.6 percent. According to this evaluation test for increasing the number of removal from once to three times, the reduction of the void ratio of the powder 20 of the powder layer 31 having a predetermined thickness formed in the fabrication tank 22 was confirmed.

The device 100 discharges liquid droplets of the liquid fabrication 10 to the powder layer 31 having a predetermined thickness and sequentially laminates the laminar fabrication structure 30 in which the powder 20 of the powder layer 31 having a predetermined thickness is bound to form a solid freeform fabrication object (three-dimensional fabrication object). In the reference configuration example described above, to form a single layer of the powder layer 31 having a predetermined thickness to form a single layer of the laminar fabrication structure 30, the powder 20 is supplied to the fabrication tank 22 in an amount more than required followed by removing the powder 20 excessively supplied multiple times (three times).

With the removal of the extra power 20 once, the density of the powder 20 in the fabrication tank 22 is increased only once so that it is not possible to fully obtain the effect of increasing density of the powder 20 in the fabrication tank 22 by the removal.

In the reference configuration example, a powder layer (pre-powder layer 31a) thicker than the desired lamination pitch (the target thickness Δt of the powder layer 31 having a predetermined thickness) is formed by the flattening for the first time. At the flattening for the jth time (2≤j<M) (removal for (j−1)th time), the extra powder 20 surpassing the lamination pitch supplied to the fabrication tank 22 is partially removed until the desired lamination pitch is obtained at the flattening for Mth time (removal for (M−1)th time).

Due to this configuration, the density of the powder layer 31 having a predetermined thickness formed in the fabrication tank 22 can be increased, thereby increasing the density of a fabrication object.

In examples described later, like the reference configuration example, in comparison with the configuration having removal once, density of the powder layer 31 having a predetermined thickness can be increased, thereby increasing the density of a fabrication object because the powder layer 31 having a predetermined thickness is formed by removal multiple times.

Embodiment 1

Next, a first example (hereinafter referred to as Embodiment 1) of the device 100 forming a powder layer is described.

In the powder layer forming of Embodiment 1, the layer thickness of the powder 20 removed for the last time in the removal process multiple times is different from that for any other time.

The powder supply in the powder layer forming of Embodiment 1 is the same as the powder supply in the powder layer forming of the reference configuration example with reference to FIGS. 8 to 10. In addition, like the reference configuration example, moving the flattening roller 12 to flatten the powder layer while supplying the powder 20 to the fabrication tank 22 in the powder supply is the flattening for the first time.

The powder removal in the powder layer forming of Embodiment 1 is described with reference to FIGS. 17 to 22.

Figure 17:
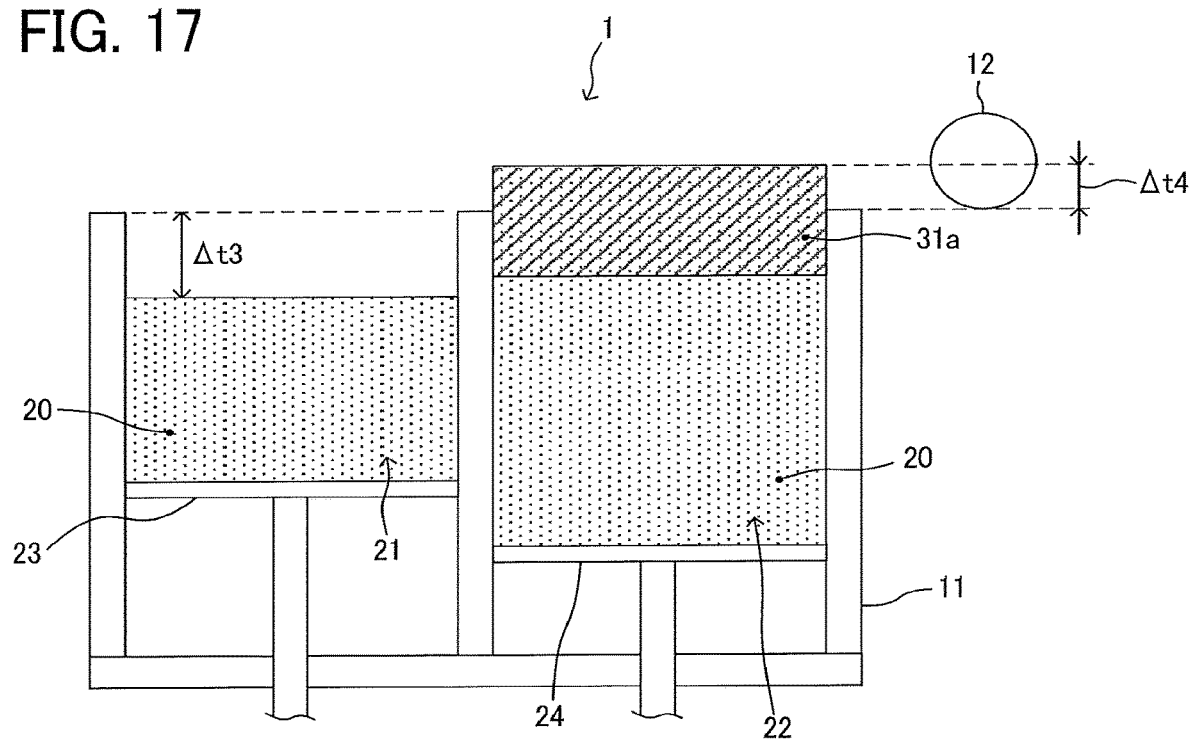
FIG. 17 is a diagram illustrating elevation of a fabrication stage for a flattening operation for the second time of Embodiment 1 described later.
Figure 18:
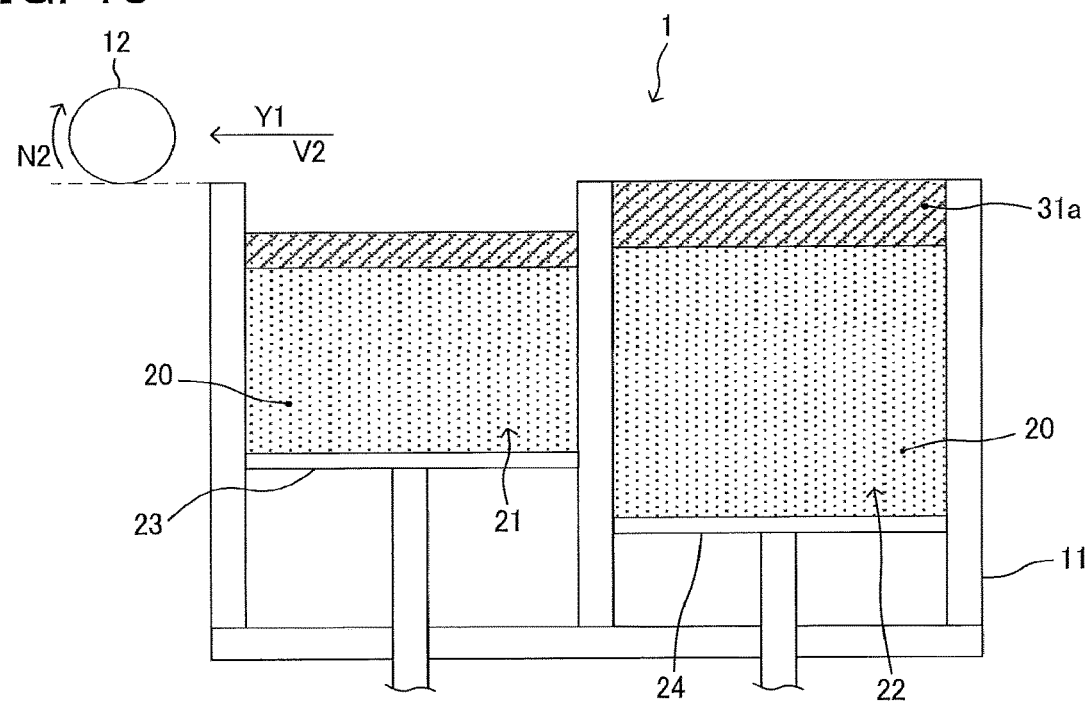
FIG. 18 is a diagram illustrating movement of a flattening roller for a flattening operation for the second time of Embodiment 1 described later.

FIGS. 17 and 18 are diagrams illustrating the flattening for the second time, which is the removal for the first time.

As illustrated in FIG. 17, the supply stage 23 is relatively elevated down against the flattening roller 12 by Δt3 (=306 μm) in the Z direction for the flattening for the second time. Moreover, as illustrated in FIG. 17, the fabrication stage 24 is relatively elevated against the flattening roller 12 by Δt4 (=90 μm) in the Z direction for the flattening for the second time.

Next, as illustrated in FIG. 18, the flattening roller 12 is relatively translated against the powder storage tank 11 at a speed of V2 (=50 mm/s) in the Y1 direction. At this point, the flattening roller 12 is rotationally translated at a rotation speed of N2 {=5 (rps)} in the direction of rolling up (clockwise in FIG. 18) the powder 20 in the fabrication tank 22. For this reason, as illustrated in FIG. 18, the upper layer part having a thickness of Δt4 of the pre-powder layer 31a formed in the fabrication tank 22 is removed and simultaneously the upper surface of the pre-powder layer 31a is flattened.

Figure 19:
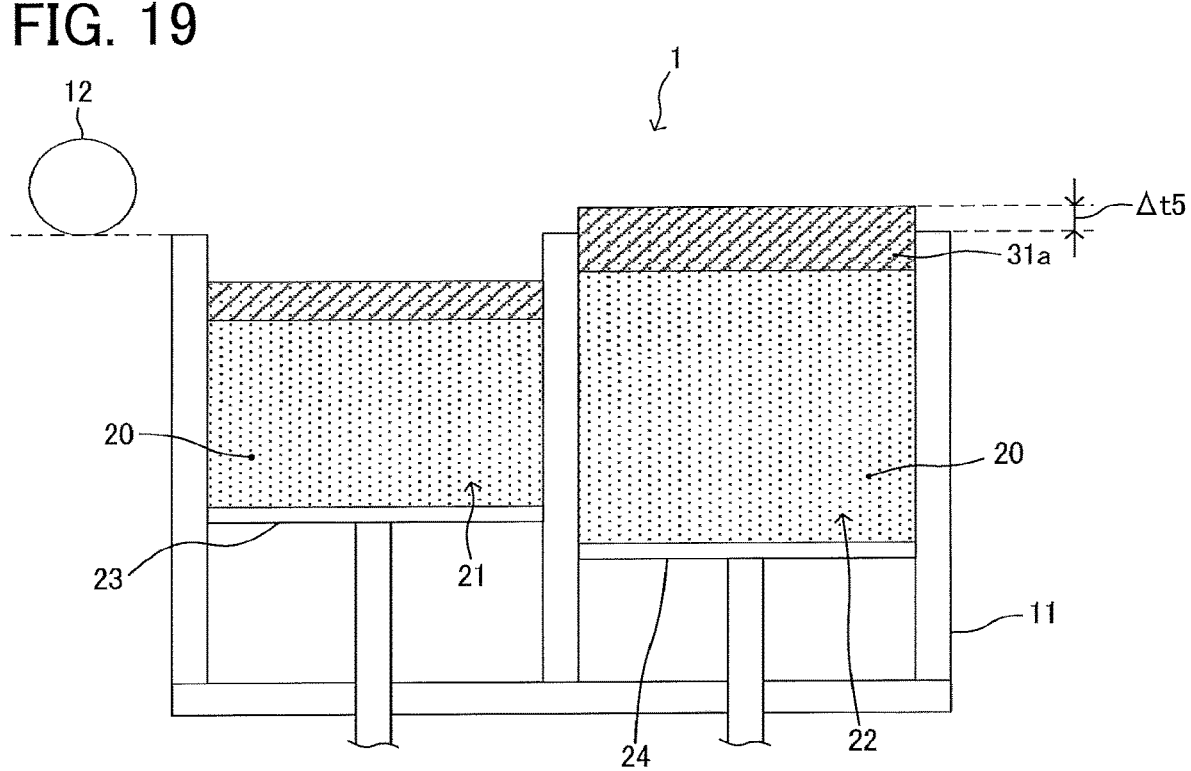
FIG. 19 is a diagram illustrating elevation of a fabrication stage for a flattening operation for the third time of Embodiment 1 described later.
Figure 20:
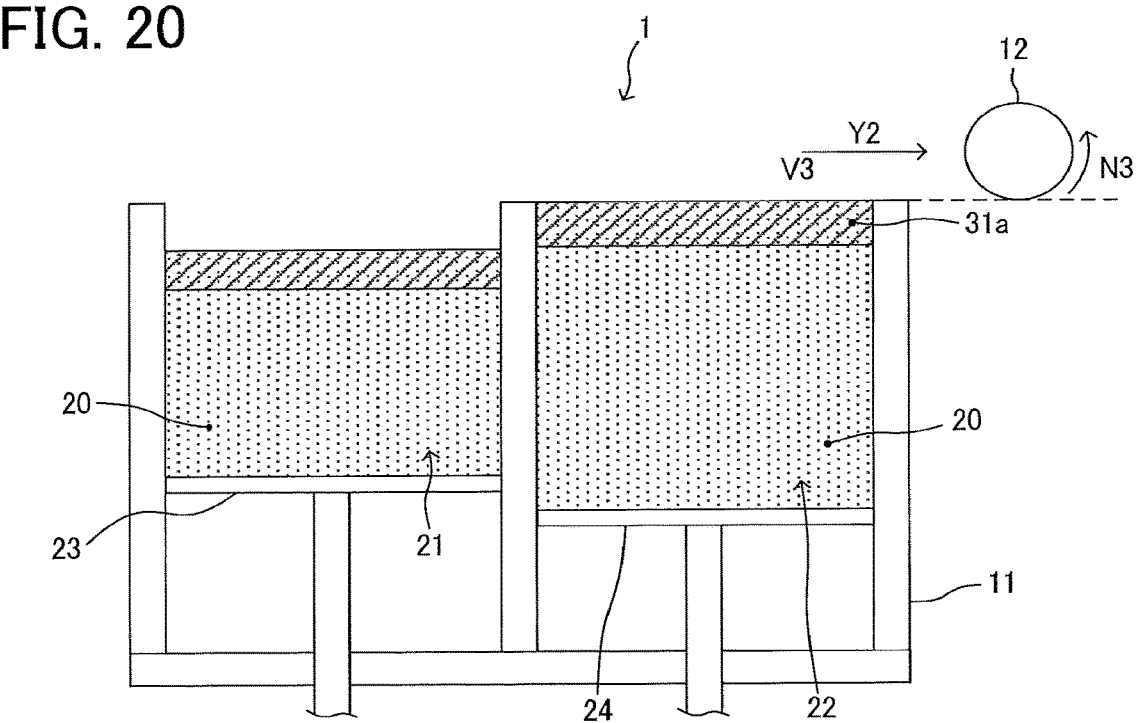
FIG. 20 is a diagram illustrating movement of a flattening roller for a flattening operation for the third time of Embodiment 1 described later.

FIGS. 19 and 20 are diagrams illustrating the flattening for the third time, which is the removal for the second time.

As illustrated in FIG. 19, the fabrication stage 24 is relatively elevated against the flattening roller 12 by Δt5 (=60 μm) in the Z direction for the flattening for the third time.

Next, as illustrated in FIG. 20, the flattening roller 12 is relatively translated against the powder storage tank 11 at a speed of V3 (=50 mm/s) in the Y2 direction. At this point, the flattening roller 12 is rotationally translated at a rotation speed of N3 {=5 (rps)} in the direction of rolling up (counterclockwise in FIG. 20) the powder 20 in the fabrication tank 22. For this reason, as illustrated in FIG. 20, the upper layer part having a thickness of Δt5 of the pre-powder layer 31a formed on the fabrication tank 22 is removed and simultaneously the upper surface of the pre-powder layer 31a is flattened.

Figure 21:
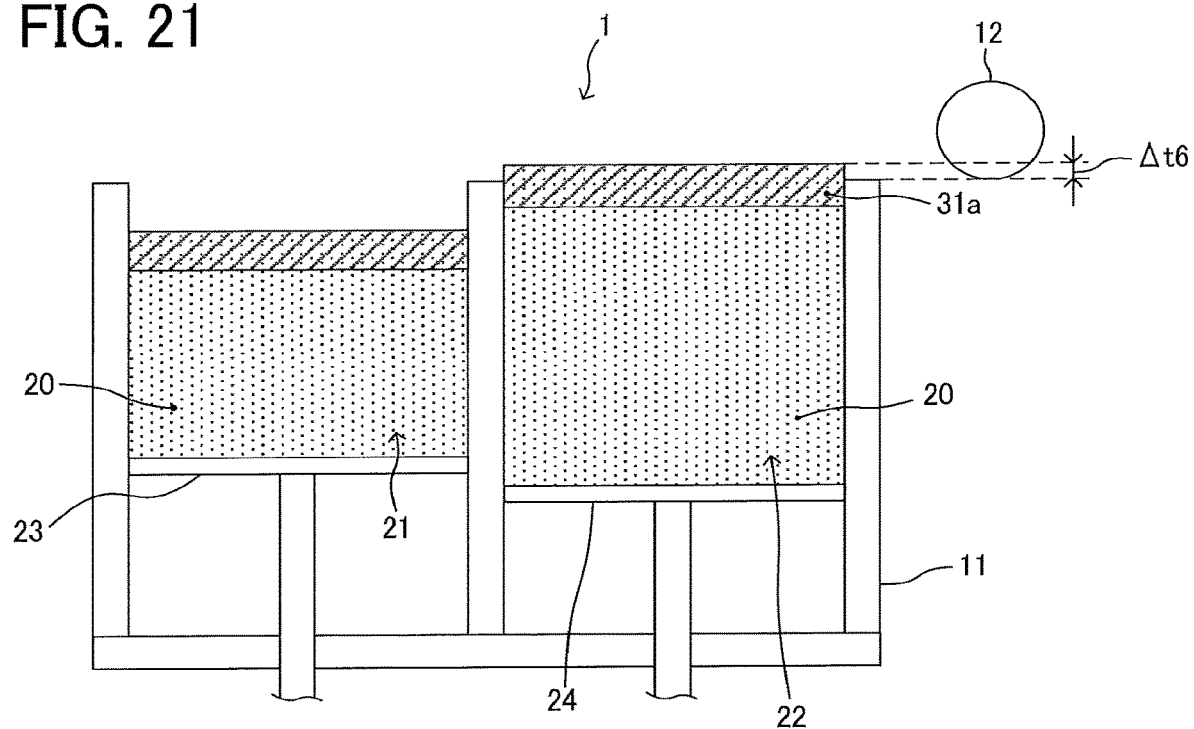
FIG. 21 is a diagram illustrating elevation of a fabrication stage for a flattening operation for the fourth time of Embodiment 1 described later.
Figure 22:
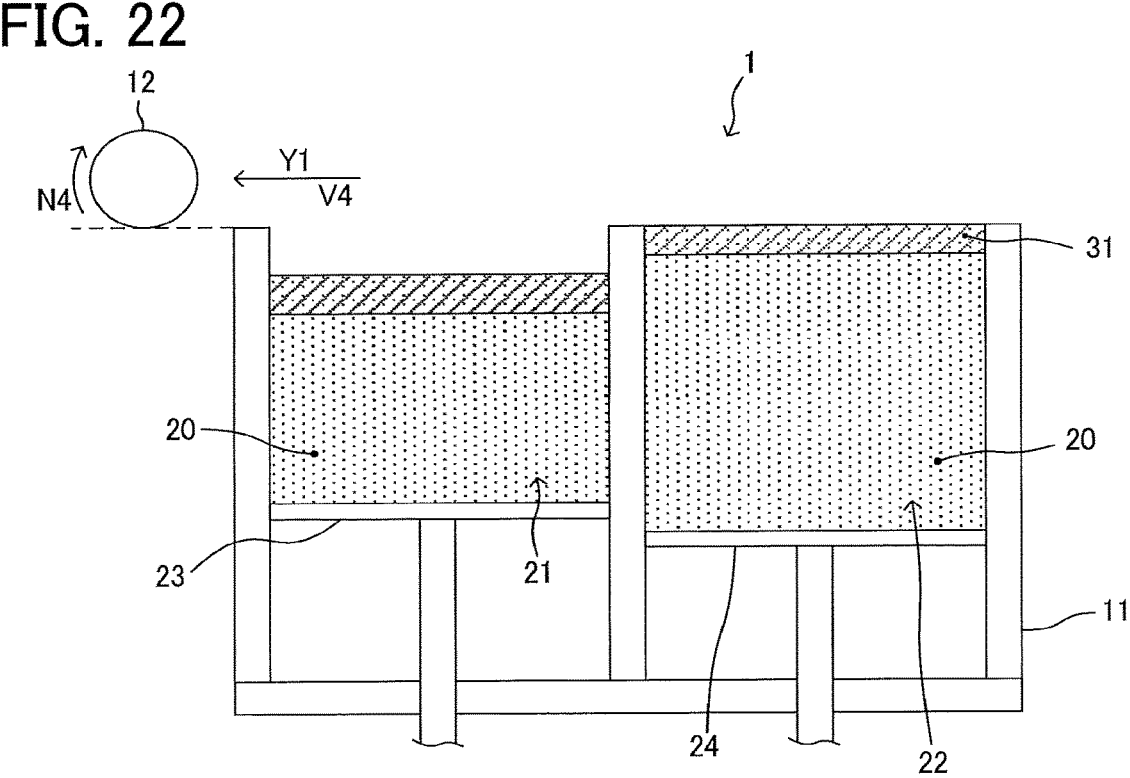
FIG. 22 is a diagram illustrating movement of a flattening roller for a flattening operation for the fourth time of Embodiment 1 described later.

FIGS. 21 and 22 are diagrams illustrating the flattening for the fourth time, which is the removal for the third time.

As illustrated in FIG. 21, the fabrication stage 24 is relatively elevated against the flattening roller 12 by Δt6 (=30 μm) in the Z direction for the flattening for the fourth time.

Next, as illustrated in FIG. 22, the flattening roller 12 is relatively translated against the powder storage tank 11 at a speed of V4 (=50 mm/s) in the Y1 direction. At this point, the flattening roller 12 is rotationally translated at a rotation speed of N4 {=5 (rps)} in the direction of rolling up (clockwise in FIG. 22) the powder 20 in the fabrication tank 22. Due to this, the upper layer part having a thickness of Δt6 of the pre-powder layer 31a formed on the fabrication tank 22 is removed and simultaneously the upper surface of the pre-powder layer 31a is flattened to form the pre-powder layer 31 having a predetermined thickness (60 μm).

In the powder layer forming of Embodiment 1, in order to increase density of powder of the powder layer 31 having a predetermined thickness, the top surface of the pre-powder layer 31a formed in the fabrication tank 22 is scraped (removed) multiple times to form a single layer of the powder layer 31 having a predetermined thickness like the reference configuration example described above.

In Embodiment 1, to form a single layer of the powder layer 31 having a predetermined thickness by scraping multiple times, as the thickness of the pre-powder layer 31a is closer to the target thickness (Δt), the scraping amount (removal amount of powder) of the powder 20 is reduced. That is, the pre-powder layer 31a is scraped less toward the removal for the last time. Specifically, in Embodiment 1, the scraping amount in the forming of the powder layer 31 having a predetermined thickness by scraping the pre-powder layer 31a three times is 90 μm for the first time, 60 μm for the second time, and 30 μm for the third time. That is, the scraping amount for the third time, which is the last time, is the smallest.

When the pre-powder layer 31a is scraped and becomes closer to the target thickness, the flattening roller 12 and the fabrication object (laminar fabrication structure 30) further approaches each other. If the amount of scraped powder is small, the flattening roller 12 conveys the force of pressing the powder 20 downward to the powder 20 situated below remaining as the powder layer 31 having a predetermined thickness via the layer of the powder 20 to be scraped, so that powder density of the powder layer 31 having a predetermined thickness can be increased. Therefore, quality of the solid freeform fabrication object formed by binding the powder 20 of the powder layer 31 having a predetermined thickness can be improved.

If the layer thickness of the powder 20 scraped for the last time is large, the following problem occurs: That is, the force of the flattening roller 12 pressing the powder 20 downward in the last removal but one is not easily conveyed to the powder 20 remaining as the powder layer 31 having a predetermined thickness positioned below and distant from the flattening roller 12 (distant corresponding to the layer thickness scraped during the removing for the last time).

In addition, in the removal of scraping off the powder 20 at the upper layer portion of the pre-powder layer 31a situated sufficiently above the already-formed laminar fabrication structure 30, that is, the initial stage of the scraping multiple times, the layer thickness (scraping pitch) of the powder 20 scraped once can be large.

However, in the removal of the powder 20 in the powder layer situated close to the laminar fabrication structure 30, that is, the final stage of the scraping multiple times, the scraping pitch is decreased to increase the force applied vertically to the powder 20 finally remaining as the powder layer 31 having a predetermined thickness. Therefore, in the removal for the last time, the force of the flattening roller 12 pressing downward increases the force vertically applied to the powder 20 remaining as the powder layer 31 having a predetermined thickness. Accordingly, the powder 20 forming the powder layer 31 having a predetermined thickness can be compressed, thereby increasing powder density.

In addition, in the removal for the last time, the flattening roller 12 directly contacts the upper surface of the powder 20 remaining as the powder layer 31 having a predetermined thickness. Therefore, in the removal for the last time, the force acting on the powder 20 remaining as the powder layer 31 having a predetermined thickness due to the force of the flattening roller 12 pressing downward is not affected by the degree of the scraping. For this reason, powder density of the powder layer 31 having a predetermined thickness can be increased during the removing for the last time but one in Embodiment 1 in which the scraping pitch is decreased for the removal for the last time. Therefore, powder density can be increased more in Embodiment 1 than in the reference configuration example in which the scraping pitch is uniform in all the removal.

In Embodiment 1, in the removal for the third time in which the powder 20 situated close to the powder 20 remaining as the powder layer 31 having a predetermined thickness, the layer thickness of the powder 20 to be removed is decreased as thin as 30 μm. Due to this, the force of the flattening roller 12 pressing the upper surface of the pre-powder layer 31a downward in the removal for the second time, which is previous to the removal for the third time, is easily conveyed to the powder 20 remaining as the powder layer 31 having a predetermined thickness, thereby increasing powder density of the powder layer 31 having a predetermined thickness. In addition, in Embodiment 1, in the removal of the upper surface portion of the pre-powder layer 31a immediately after it is formed (i.e., initial stage in the scraping multiple times), the layer thickness of the powder 20 to be removed is set to be thicker, i.e., 90 μm. Due to such an increase in the amount of scraping in comparison with the removal for the last time, the number of removal required to remove the extra powder 20 surpassing the predetermined thickness can be reduced so that the time taken to form powder layers can be shortened.

Example 2

Next, the second example (Example 2) of the device 100 forming powder layers is described.

In the powder layer forming of Example 2, the rotation speed of the flattening roller 12 is set different for the removal for the last time and the removal for any other time for the removal multiple times.

The powder supply during the powder layer forming of Example 2 is the same as the powder supply during the powder layer forming of the reference configuration example described with reference to FIGS. 8 to 10. In addition, like the reference configuration example, moving the flattening roller 12 for flattening the powder layer while supplying the powder 20 to the fabrication tank 22 during the powder supply is the flattening for the first time.

The powder removal during the powder layer forming of Example 2 is described next. The powder removal of Example 2 is the same as that of the reference configuration example described above except for the rotation speed of the flattening roller 12. The powder removal of Example 2 is described with reference to FIGS. 11 to 16 for use in the description of the powder removal of the reference configuration example.

FIGS. 11 and 12 are diagrams illustrating the flattening for the second time, which is the removal for the first time.

As illustrated in FIG. 11, the supply stage 23 is relatively elevated down against the flattening roller 12 by Δt3 (=306 μm) in the Z direction for the flattening for the second time.

Moreover, as illustrated in FIG. 11, the fabrication stage 24 is relatively elevated against the flattening roller 12 by Δt4 (=60 μm) in the Z direction for the flattening for the second time.

Next, as illustrated in FIG. 12, the flattening roller 12 is relatively translated against the powder storage tank 11 in the Y1 direction at a speed of V2 (=50 mm/s). At this point, the flattening roller 12 is rotationally translated at a rotation speed of N2 {=1 (rps)} in the direction of rolling up (clockwise in FIG. 12) the powder 20 in the fabrication tank 22. For this reason, as illustrated in FIG. 12, the upper layer part having a thickness of Δt4 of the pre-powder layer 31a formed in the fabrication tank 22 is removed and simultaneously the upper surface of the pre-powder layer 31a is flattened.

FIGS. 13 and 14 are diagrams illustrating the flattening for the third time, which is the removal for the second time.

As illustrated in FIG. 13, the fabrication stage 24 is relatively elevated against the flattening roller 12 by Δt5 (=60 μm) in the Z direction for the flattening for the third time.

Next, as illustrated in FIG. 14, the flattening roller 12 is relatively translated against the powder storage tank 11 at a speed of V3 (=50 mm/s) in the Y2 direction. At this point, the flattening roller 12 is rotationally translated at a rotation speed of N3 {=2 (rps)} in the direction of rolling up (counterclockwise in FIG. 14) of the powder 20 in the fabrication tank 22. For this reason, as illustrated in FIG. 14, the upper layer part having a thickness of Δt5 of the pre-powder layer 31a formed on the fabrication tank 22 is removed and simultaneously the upper surface of the pre-powder layer 31a is flattened.

FIGS. 15 and 16 are diagrams illustrating the flattening for the fourth time, which is the removal for the third time.

As illustrated in FIG. 15, the fabrication stage 24 is relatively elevated against the flattening roller 12 by Δt6 (=60 μm) in the Z direction for the flattening for the fourth time.

Next, as illustrated in FIG. 16, the flattening roller 12 is relatively translated against the powder storage tank 11 at a speed of V4 (=50 mm/s) in the Y1 direction. At this point, the flattening roller 12 is rotationally translated at a rotation speed of N4 {=5 (rps)} in the direction of rolling up (clockwise in FIG. 16) of the powder 20 in the fabrication tank 22. For this reason, the upper layer part having a thickness of Δt6 of the pre-powder layer 31a formed on the fabrication tank 22 is removed and simultaneously the upper surface of the powder 20 is flattened to form the pre-powder layer 31 having a predetermined thickness (60 μm).

In the powder layer forming of Example 2, the rotation speed of the flattening roller 12 is increased toward the scraping for the last time, i.e., N2<N3<N4. If the rotation speed of the flattening roller 12 is decreased, static friction force tends to occur between the flattening roller 12 and the powder 20 and between particles of the powder 20.

The powder 20 contacting the periphery of the flattening roller 12 in motion is under a pressure to move toward the direction of flattening due to the friction force occurring between the periphery of the flattening roller 12 and the powder 20. At this point, if static friction force is applied therebetween, the powder 20 tends to be displaced toward the direction of flattening because static friction force is larger than kinetic friction force. In addition, if static force is applied to the particles of the powder 20, the powder 20 situated below contacting the powder 20 to which the static friction force is applied also tends to be displaced toward the direction of flattening due to friction force occurring between the powder 20 and the powder 20 situated therebelow.

Therefore, if static friction force occurs, the force by the flattening roller 12 in the horizontal direction is easily applicable to the powder 20 remaining after the removal so that displacement of particles in the horizontal direction in the layer of the powder 20 remaining after the removal easily occurs. In the last stage of the powder removal multiple times in which the distance between the flattening roller 12 and the laminar object (laminar fabrication structure 30) decreases, if the force in the horizontal direction acts on the powder 20 remaining after the removal, particles of the powder 20 finally remaining as the powder layer 31 having a predetermined thickness tend to be displaced, which may cause non-uniformity in density. Moreover, via the powder 20 finally remaining as the powder layer 31 having a predetermined thickness, the force in the horizontal direction acts on the fabrication object (laminar fabrication object 30) formed below, which may cause positional displacement and result in deformation of a solid freeform fabrication object.

Conversely, in Example 2, the rotation speed of the flattening roller 12 in the final stage of the removal is increased to cause kinetic friction to easily occur between the flattening roller 12 and the powder 20 and between particles of the powder 20 to prevent occurrence of static friction. For this reason, the force by the flattening roller 12 in the horizontal direction does not easily occur to the powder 20 remaining after the removal. That is, in the last stage of the powder removal multiple times, it is possible to prevent action of the force in the horizontal direction to the powder 20 remaining after the removal and displacement of particles of the powder 20 finally remaining as the powder layer 31 having a predetermined thickness so that occurrence of non-uniform density can be prevented. Prevention of occurrence of non-uniform density leads to improvement of powder density of the powder layer 31 having a predetermined thickness.

Moreover, it is possible to prevent action of the force in the horizontal direction to the fabrication object (laminar fabrication structure 30) formed below the powder 20 finally remaining as the powder layer 31 having a predetermined thickness and deformation of a solid freeform fabrication object. Due to reduction of occurrence of non-uniform density of the powder 20 and deformation of a solid freeform fabrication object (three-dimensional fabrication object), quality of the solid freeform fabrication object can be improved.

In the removal (initial stage of the powder scraping multiple times) of removing the upper surface part sufficiently distant from the laminar fabrication structure 30, the powder 20 of the pre-powder layer 31a is shaken in the horizontal direction to improve powder density, thereby increasing density of the powder 20 finally remaining as the powder layer 31 having a predetermined thickness. Therefore, in the initial stage of the powder removal multiple times, the rotation speed of the flattening roller 12 is not necessarily fast.

In Embodiment 1, the layer thickness of the powder 20 removed (scraped) for the last time in the multiple-time powder removal is different from that for any other time. In Example 2, the rotation speed of the flattening roller 12 for the last time in the multiple-time powder removal is different from that for any other time.

In the powder layer forming by the device 100, the condition that the layer thickness of the powder 20 removed for the last time in the multiple-time powder removal is different from that for any other time can be used in combination with the condition that the rotation speed of the flattening roller 12 for the last time in the multiple-time powder removal is different from that for any other time.

In such a configuration, as approaching to the removal for the last time, the layer thickness of the powder 20 to be removed is small and at the same time the rotation speed of the flattening roller 12 is increased. This makes it possible to shorten the time to be taken required for powder layer forming as in Embodiment 1 and at the same time improve powder density of the powder layer 31 having a predetermined thickness. Moreover, like Example 2, it is possible to reduce occurrence of non-uniformity of density and deformation of a solid freeform fabrication object.

In addition, as the rotation speed of the flattening roller 12 increases, the amount of the powder 20 moving together with the surface movement of the periphery thereof decreases, thereby reducing displacement of the layers situated below. However, as the rotation speed increases, the amount of the powder 20 rolled up increases. Conversely, in the condition that the rotation speed of the flattening roller 12 increases while the layer thickness to be scraped decreases in the last stage of multiple-time removal, the amount of the powder 20 rolled up ascribable to the increase in the rotation speed can be reduced.

Example 3

Next, the third example (Example 3) of powder layer forming by the device 100 is described.

In Example 3, the condition of the powder layer forming is changed depending on the depth of the layer of the laminar fabrication structure 30 to be formed. The upper surface of each layer during the powder layer forming is described with reference to FIGS. 8 to 16 for use in the description of the powder layer forming in the reference configuration example and FIGS. 17 to 22 for use in the description of the powder layer forming in Embodiment 1.

First Layer to Twentieth Layer

In the powder supply from the first layer to the twentieth layer of Example 3, the supply stage 23 is relatively elevated against the flattening roller 12 in the Z direction (vertical direction) by 192 µm as Δt1 illustrated in FIG. 8.

In addition, the fabrication stage 24 is relatively lowered against the flattening roller 12 in the Z direction by 120 µm as Δt2 illustrated in FIG. 9.

Next, as illustrated in FIG. 10, the flattening roller 12 is relatively translated against the powder storage tank 11 at a speed of V1 (=50 mm/s) in the Y2 direction. At this point, the flattening roller 12 is rotationally translated at a rotation speed of N1 {=5 (rps)} in the direction of rolling up (counterclockwise in FIG. 10) the powder 20 in the fabrication tank 22.

Accordingly, as illustrated in FIG. 10, the powder 20 is supplied to the fabrication tank 22 and flattened to form the pre-powder layer 31a having a thickness of 120 µm. Moving the flattening roller 12 to flatten the powder 20 while supplying the powder 20 to the fabrication tank 22 during the powder supply is the flattening for the first time.

Next, the powder removal in the powder layer forming from the first layer to the twentieth layer of Example 3 is described with reference to FIGS. 11 and 12.

In the powder removal from the first layer to the twentieth layer of Example 3, the powder 20 is removed only once.

FIGS. 11 and 12 are diagrams illustrating the flattening for the second time, which is also the powder removal.

As illustrated in FIG. 11, the supply stage 23 is relatively elevated down against the flattening roller 12 by Δt3 (=306 µm) in the Z direction for the flattening for the second time.

Moreover, as illustrated in FIG. 11, the fabrication stage 24 is relatively elevated against the flattening roller 12 by Δt4 (=60 µm) in the Z direction for the flattening for the second time.

Next, as illustrated in FIG. 12, the flattening roller 12 is relatively translated against the powder storage tank 11 at a speed of V2 (=50 mm/s) in the Y1 direction. At this point, the flattening roller 12 is rotationally translated at a rotation speed of N2 {=5 (rps)} in the direction of rolling up (clockwise in FIG. 12) the powder 20 in the fabrication tank 22. For this reason, as illustrated in FIG. 12, the upper layer part having a thickness of Δt4 of the pre-powder layer 31a formed in the fabrication tank 22 is removed and simultaneously the upper surface of the powder 20 is flattened to form the pre-powder layer 31 having a predetermined thickness (60 µm).

In the powder removal from the first layer to the twentieth layer of Example 3, the powder 20 is flattened twice and one of the two is the removal.

Twenty First to Fortieth Layer

In the powder supply from the twenty first layer to the fortieth layer of Example 3, the supply stage 23 is relatively elevated against the flattening roller 12 in the Z direction (vertical direction) by 264 µm as Δt1 illustrated in FIG. 8.

In addition, the fabrication stage 24 is relatively lowered against the flattening roller 12 in the Z direction by 180 µm as Δt2 illustrated in FIG. 9.

Next, as illustrated in FIG. 10, the flattening roller 12 is relatively translated against the powder storage tank 11 at a speed of V1 (=50 mm/s) in the Y2 direction. At this point, the flattening roller 12 is rotationally translated at a rotation speed of N1 {=5 (rps)} in the direction of rolling up (counterclockwise in FIG. 10) the powder 20 in the fabrication tank 22.

Accordingly, as illustrated in FIG. 10, the powder 20 is supplied to the fabrication tank 22 and flattened to form the pre-powder layer 31a having a thickness of 180 µm. Moving the flattening roller 12 to flatten the powder 20 while supplying the powder 20 to the fabrication tank 22 in the powder supply is the flattening for the first time.

Next, the powder removal in the powder layer forming from the twenty first layer to the fortieth layer of Example 3 is described with reference to FIGS. 11 to 14.

In the powder removal from the twenty first layer to the fortieth layer of Example 3, the powder 20 is removed twice.

FIGS. 11 and 12 are diagrams illustrating the flattening for the second time, which is the removal for the first time.

As illustrated in FIG. 11, the supply stage 23 is relatively elevated down against the flattening roller 12 by Δt3 (=306 μm) in the Z direction for the flattening for the second time. As illustrated in FIG. 11, the fabrication stage 24 is relatively elevated against the flattening roller 12 by Δt4 (=90 μm) in the Z direction.

Next, as illustrated in FIG. 12, the flattening roller 12 is relatively translated against the powder storage tank 11 at a speed of V2 (=50 mm/s) in the Y1 direction. At this point, the flattening roller 12 is rotationally translated at a rotation speed of N2 {=5 (rps)} in the direction of rolling up (clockwise in FIG. 12) the powder 20 in the fabrication tank 22. For this reason, as illustrated in FIG. 12, the upper layer part having a thickness of Δt4 of the pre-powder layer 31a formed in the fabrication tank 22 is removed and simultaneously the upper surface of the pre-powder layer 31a is flattened.

FIGS. 13 and 14 are diagrams illustrating the flattening for the third time, which is the removal for the second time.

As illustrated in FIG. 13, the fabrication stage 24 is relatively elevated against the flattening roller 12 by Δt5 (=60 μm) in the Z direction for the flattening for the third time.

Next, as illustrated in FIG. 14, the flattening roller 12 is relatively translated against the powder storage tank 11 at a speed of V3 (=50 mm/s) in the Y2 direction. At this point, the flattening roller 12 is rotationally translated at a rotation speed of N3 {=5 (rps)} in the direction of rolling up (counterclockwise in FIG. 14) the powder 20 in the fabrication tank 22. For this reason, as illustrated in FIG. 14, the upper layer part having a thickness of Δt5 of the pre-powder layer 31a formed in the fabrication tank 22 is removed and simultaneously the upper surface of the powder 20 is flattened to form the pre-powder layer 31 having a predetermined thickness (60 μm).

In the powder removal from the twenty first layer to the fortieth layer of Example 3, the powder 20 is flattened three times and two of the three is the removal.

Forty First Layer and Higher Layer

The powder layer forming for the forty first layer or higher layer is the same as the powder layer forming of Embodiment 1 described above.

In the powder supply from the forty first layer or higher layer of Example 3, the supply stage 23 is relatively elevated against the flattening roller 12 in the Z direction (vertical direction) by 264 μm as Δt1 illustrated in FIG. 8. In addition, the fabrication stage 24 is relatively lowered against the flattening roller 12 in the Z direction by 240 μm as Δt2 illustrated in FIG. 9.

Next, as illustrated in FIG. 10, the flattening roller 12 is relatively translated against the powder storage tank 11 at a speed of V1 (=50 mm/s) in the Y2 direction. At this point, the flattening roller 12 is rotationally translated at a rotation speed of N1 {=5 (rps)} in the direction of rolling up (counterclockwise in FIG. 10) the powder 20 in the fabrication tank 22.

Accordingly, as illustrated in FIG. 10, the powder 20 is supplied to the fabrication tank 22 and flattened to form the pre-powder layer 31a having a thickness of 240 μm. Moving the flattening roller 12 to flatten the powder 20 while supplying the powder 20 in the powder supply is the flattening for the first time.

The powder removal in the powder layer forming of the forty first layer and higher layers of Example 3 is described with reference to FIGS. 17 to 22.

In the powder removal of the forty first layer and higher layers of Example 3, the powder 20 is removed three times.

FIGS. 17 and 18 are diagrams illustrating the flattening for the second time, which is the removal for the first time.

As illustrated in FIG. 17, the supply stage 23 is relatively elevated down against the flattening roller 12 by Δt3 (=306 μm) in the Z direction for the flattening for the second time. Moreover, as illustrated in FIG. 17, the fabrication stage 24 is relatively elevated against the flattening roller 12 by Δt4 (=90 μm) in the Z direction for the flattening for the second time.

Next, as illustrated in FIG. 18, the flattening roller 12 is relatively translated against the powder storage tank 11 at a speed of V2 (=50 mm/s) in the Y1 direction. At this point, the flattening roller 12 is rotationally translated at a rotation speed of N2 {=5 (rps)} in the direction of rolling up (clockwise in FIG. 18) the powder 20 in the fabrication tank 22. For this reason, as illustrated in FIG. 18, the upper layer part having a thickness of Δt4 of the pre-powder layer 31a formed in the fabrication tank 22 is removed and simultaneously the upper surface of the pre-powder layer 31a is flattened.

FIGS. 19 and 20 are diagrams illustrating the flattening for the third time, which is the removal for the second time.

As illustrated in FIG. 19, the fabrication stage 24 is relatively elevated against the flattening roller 12 by Δt5 (=60 μm) in the Z direction for the flattening for the third time.

Next, as illustrated in FIG. 20, the flattening roller 12 is relatively translated against the powder storage tank 11 at a speed of V3 (=50 mm/s) in the Y2 direction. At this point, the flattening roller 12 is rotationally translated at a rotation speed of N3 {=5 (rps)} in the direction of rolling up (counterclockwise in FIG. 20) the powder 20 in the fabrication tank 22. For this reason, as illustrated in FIG. 20, the upper layer part having a thickness of Δt5 of the pre-powder layer 31a formed on the fabrication tank 22 is removed and simultaneously the upper surface of the pre-powder layer 31a is flattened.

FIGS. 21 and 22 are diagrams illustrating the flattening for the fourth time, which is the removal for the third time.

As illustrated in FIG. 21, the fabrication stage 24 is relatively elevated against the flattening roller 12 by Δt6 (=30 μm) in the Z direction for the flattening for the fourth time.

Next, as illustrated in FIG. 22, the flattening roller 12 is relatively translated against the powder storage tank 11 at a speed of V4 (=50 mm/s) in the Y1 direction. At this point, the flattening roller 12 is rotationally translated at a rotation speed of N4 {=5 (rps)} in the direction of rolling up (clockwise in FIG. 22) the powder 20 in the fabrication tank 22. For this reason, the upper layer part having a thickness of Δt6 of the pre-powder layer 31a formed on the fabrication tank 22 is removed and simultaneously the upper surface of the powder 20 is flattened to form the pre-powder layer 31 having a predetermined thickness (60 μm).

In the powder removal from the forty first layer and higher layers of Example 3, the powder 20 is flattened four times and three of the four is the removal.

As described above, the number of removal during the powder layer forming for layers below is decreased in Example 3.

The lower layers of the laminar fabrication structure 30 constituting a solid freeform fabrication object enjoy the effect of powder compression by the powder removal for the upper layers so that the number of powder removal can be relatively small for the lower layers.

In Example 3, productivity can be improved by decreasing the number of removal for lower layers.

Next, the elevation amount of the supply stage 23 in the device 100 in the embodiment is described.

In a case in which the flattening roller 12 is used as the device for powder supply and powder removal to flatten the powder layer, the required elevation amount of the supply stage 23 is inferred as follows: That is inferred as: (lamination pitch)×(number of flattening)×(area ratio of fabrication stage 24 to supply stage 23)+100 (μm) at maximum. This is because:

The lowering amount of the fabrication stage 24 during the flattening for the first time is 240 μm in the evaluation test of the reference configuration example described above.

This is represented by (lamination pitch: 60 μm)×(number of flattening: four times)×(area ratio of fabrication stage 24 to supply stage 23: 1). Moreover, while the lowering amount of the fabrication stage 24 is 240 μm, the elevation amount of the supply stage 23 is 264 μm. Therefore, a uniform pre-powder layer 31a can be formed in the fabrication tank 22.

The elevation amount of the supply stage 23 can be represented by (lamination pitch: 60 μm)×(number of flattening: four times)×(area ratio of fabrication stage 24 to supply stage 23: 1)+24 (μm).

Therefore, an estimation of the elevation amount of the supply stage 23 required during fabrication, which is (lamination pitch)×(number of flattening)×(area ratio of fabrication stage 24 to supply stage 23)+100 (μm) at maximum, is sufficient. If the elevation amount of the supply stage 23 during the flattening for the first time is set as described above, the powder 20 is sufficiently supplied in the fabrication tank 22 to form a uniform pre-powder layer 31a therein.

The device 100 of the present embodiment discharges liquid droplets of the liquid fabrication 10 to the powder layer 31 having a predetermined thickness and sequentially laminates the laminar fabrication structure 30 in which the powder 20 of the powder layer 31 having a predetermined thickness is bound to form a solid freeform fabrication object (three-dimensional fabrication object). In addition, the process of setting the thickness of the powder layer in the fabrication tank 22 as the lamination pitch includes powder supply of the powder 20 to the fabrication tank 22 and powder removal of the powder 20 supplied to the fabrication tank 22. Furthermore, during the powder supply, the powder 20 is supplied once. During the powder removal, the powder 20 is removed multiple times.

In the present embodiment, the powder layer is flattened for every removal in the powder removal. It is preferable that the powder layer be flattened for at least the removal for the last time of the multiple-time removal. This makes it possible to form a flat powder surface suitable for application of the liquid fabrication 10.

In the device 100 of the present application, the device 100 flattens the powder layer with the flattening roller 12 every time the powder is supplied and removed in the process of setting the thickness of the powder layer in the fabrication tank 22 as the lamination pitch. Due to this configuration, the powder 20 can be supplied, removed, and flattened by the flattening roller 12 alone, which contributes to simplification of the device 100.

Variation

Next, a variation of the device 100 is described to which at least one of the thickness of the portion of the pre-powder layer 31a to be removed and the rotation speed of the flattening roller 12 is different in the powder removal for the last time and the powder removal for any other time among the powder removal for the multiple times is applied.

Figure 23:
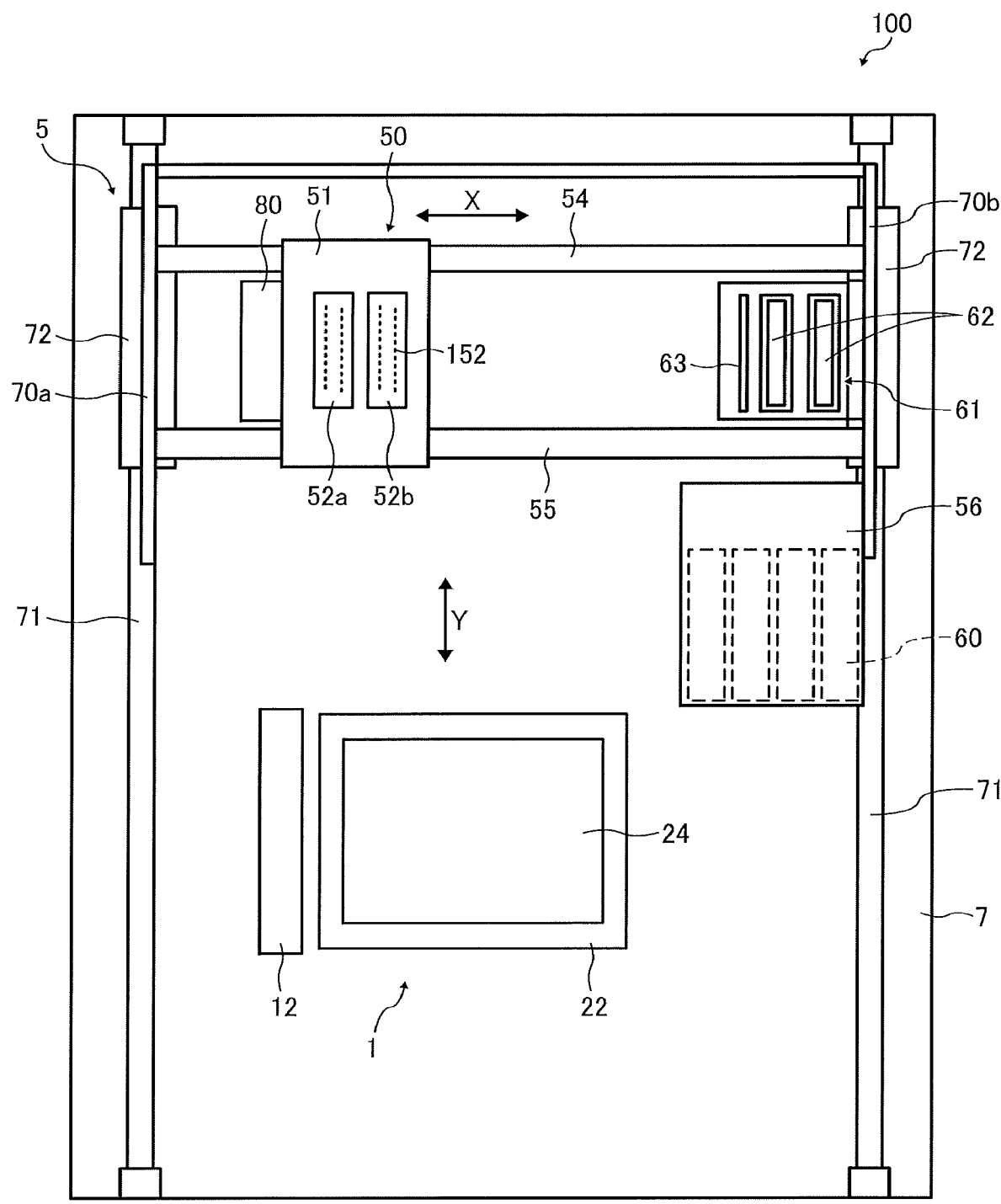
FIG. 23 is a diagram of a schematic planar view illustrating a device for fabricating a three-dimensional fabrication object according to a variation of the present disclosure.
Figure 24:
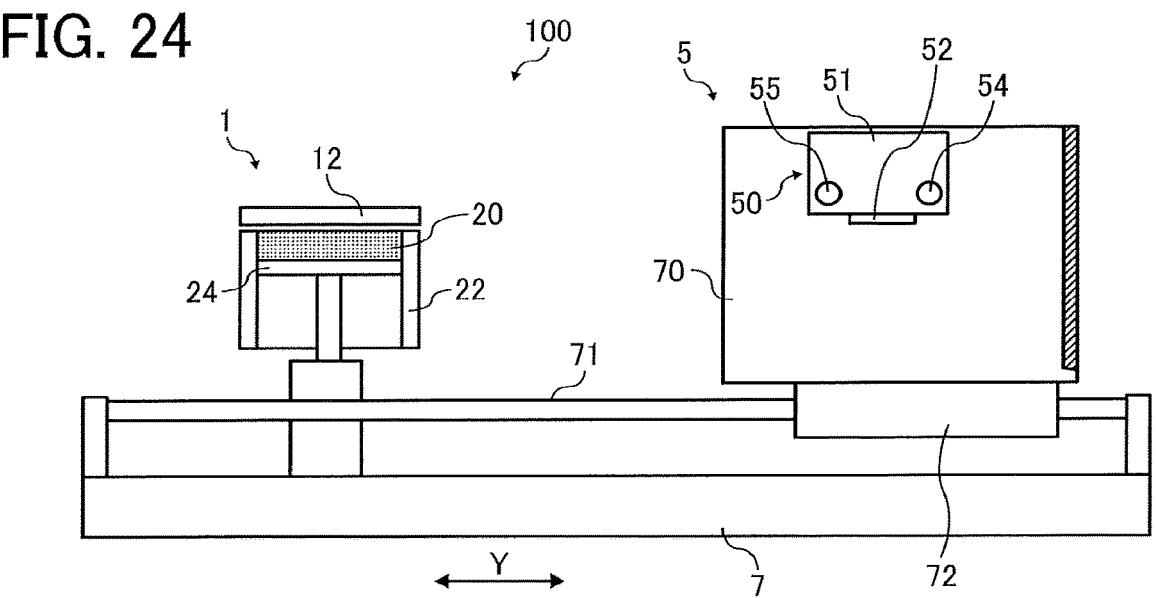
FIG. 24 is a diagram of a schematic side view illustrating a device for fabricating a three-dimensional fabrication object according to the variation of the present disclosure.
Figure 25:
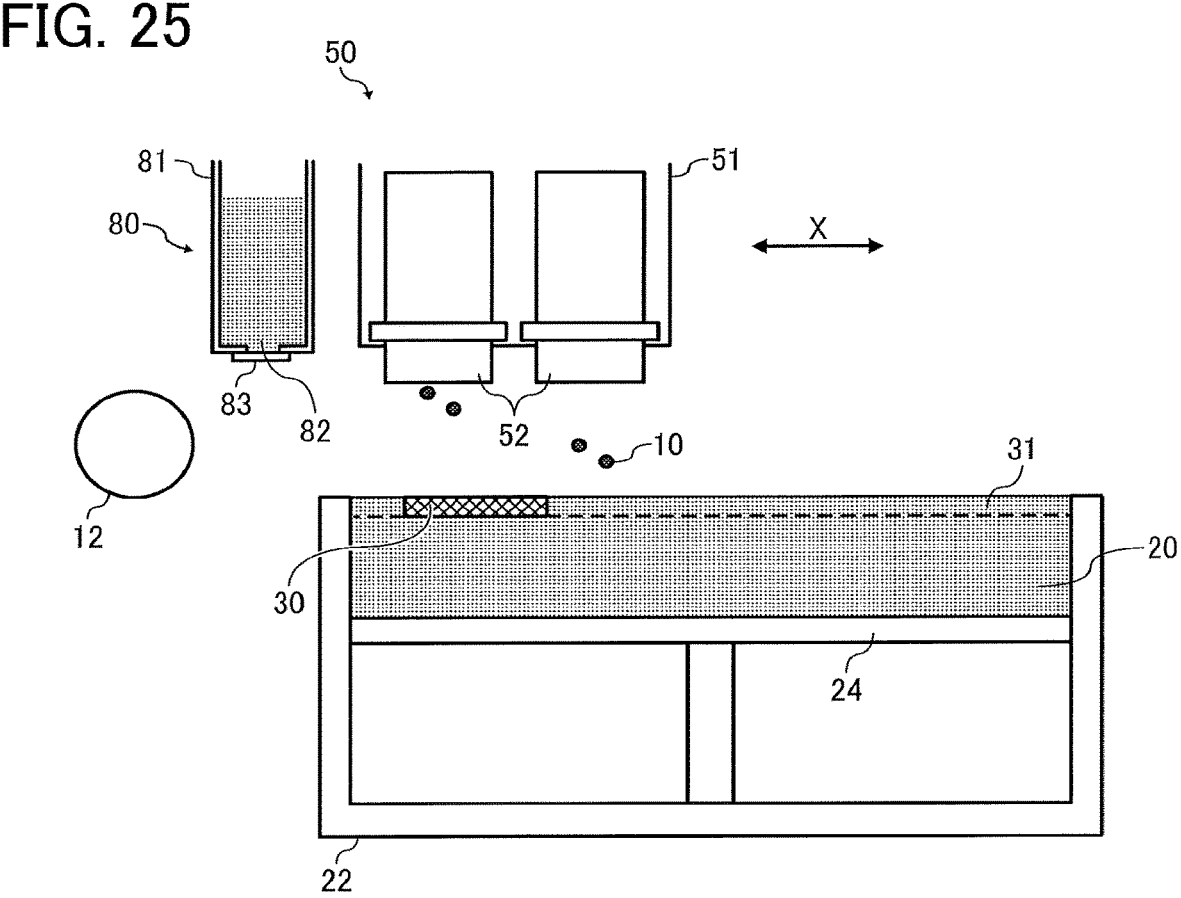
FIG. 25 is a diagram of a schematic front view illustrating a device for fabricating a three-dimensional fabrication object according to the variation of the present disclosure.
Figure 26:
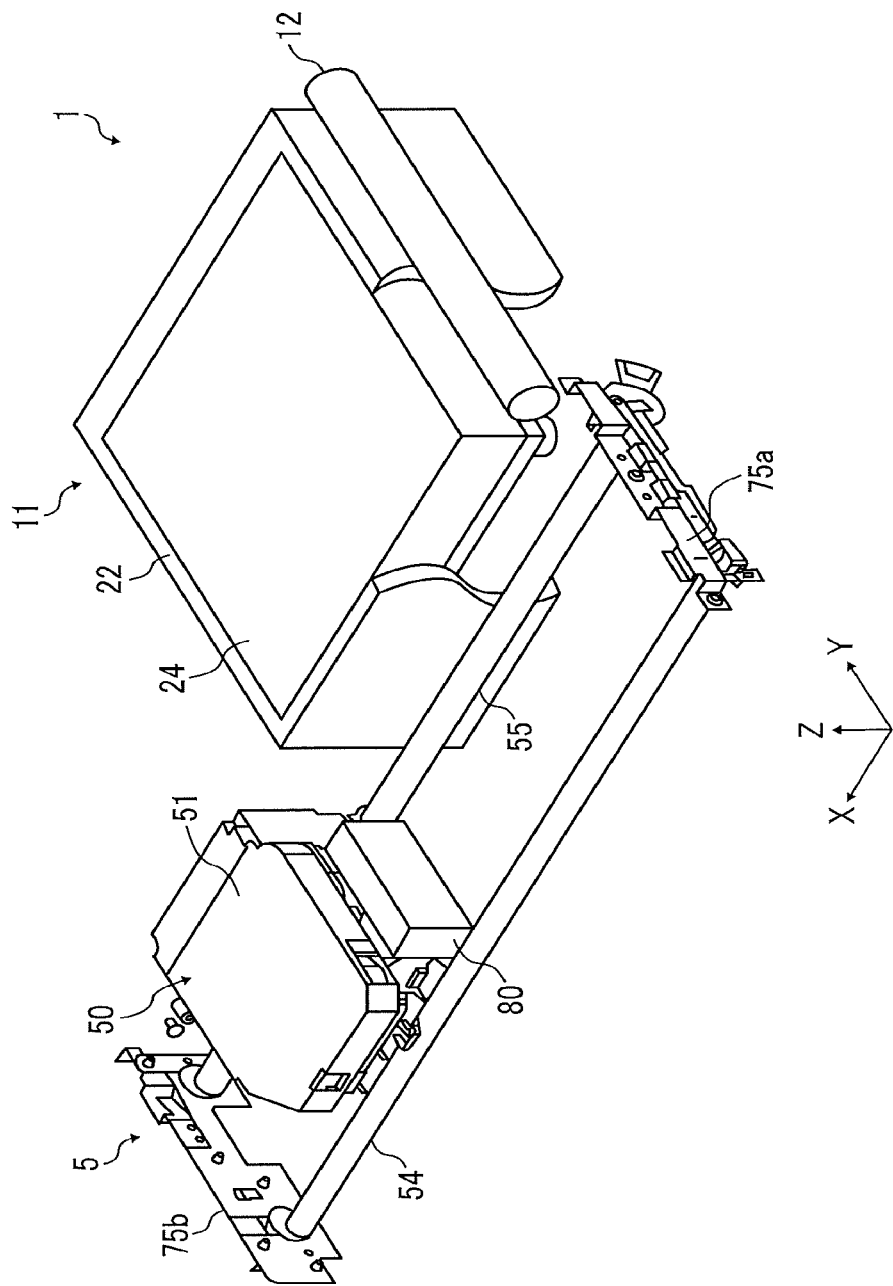
FIG. 26 is a diagram of perspective view illustrating the main part of a device for fabricating a three-dimensional fabrication object according to the variation of the present disclosure.

FIG. 23 is a diagram illustrating a schematic planar view of the device 100 for fabricating a three-dimensional fabrication object of the variation and FIG. 24 is a diagram illustrating a schematic side view of the device 100 of the variation illustrated in FIG. 23 from the right. FIG. 25 is a diagram illustrating a schematic front view of the device 100 of the variation illustrated in FIG. 23 from below and FIG. 26 is a diagram illustrating a perspective view of the main part (the powder holding unit 1 and the fabrication unit 5) of the device 100 of the variation. The device illustrated in FIG. 25 is in the middle of fabricating a solid freeform fabrication object.

The device 100 of the variation is a fabrication device using powder including the powder holding unit 1 and the fabrication unit 5. This is different from the embodiments described above in that the powder holding unit 1 of the variation includes no supply tank 21 but the carriage 51 of the liquid discharging unit 50 includes a powder supply unit 80. In addition, the variation is different in that the direction of movement of the flattening roller 12 against the supply tank 21 is X axis direction while the direction of the flattening roller 12 is Y axis direction in the embodiments.

The device 100 of the variation includes a control unit 500 having a configuration similar to the control unit 500 illustrated in FIG. 5. It includes a supply drive unit to control drive of the powder supply unit 80 instead of the supply stage drive unit 513 illustrated in FIG. 5.

The powder layer 31 having a predetermined thickness in which the powder 20 is laminated is formed in the powder holding unit 1 and the laminar fabrication structure 30 is formed in which the powder 20 is bound having a predetermined form. The fabrication unit 5 discharges the liquid fabrication 10 to the powder layer 31 having a predetermined thickness placed in a laminar manner in the fabrication tank 22 to fabricate a solid freeform fabrication object.

The powder holding unit 1 includes the fabrication tank 22, the flattening roller 12 as a rotary body serving as a flattening member (recoater), etc. The flattening member can take, for example, a member having a plate-like form (blade) instead of the rotary body.

In the fabrication tank 22, the fabrication layer 30 is laminated to fabricate a solid freeform fabrication object. The base of the fabrication tank 22 freely elevates and lowers in the Z direction (height direction) as the fabrication stage 24. On the fabrication stage 24, a solid freeform fabrication object is fabricated in which the laminar fabrication structure 30 is laminated.

The flattening roller 12 smooths and flattens the powder 20 supplied to the fabrication tank 22 to form a powder layer.

This flattening roller 12 is disposed relatively and reciprocally movable against the stage surface (on which the powder 20 is placed) of the fabrication stage 24 in the X direction along the stage surface. In addition, the flattening roller 12 moves while rotating on the fabrication tank 22.

The fabrication unit 5 includes a liquid discharging unit 50 to discharge the liquid fabrication 10 to the powder layer on the fabrication stage 24.

The liquid discharging unit 50 includes the carriage 51 and two liquid discharging heads, i.e., the first head 52a and the second head 52b (collectively referred to as the head 52) carried by the carriage 51. The number of the heads is not limited to two and can be one or three or more.

The first guiding member 54 and the second guiding member 55 hold the carriage 51 movable in the X direction. A first supporting member 75a and a second supporting member 75b as the supporting members support the first guiding member 54 and the second guiding member 55 at both ends in the X direction in such a manner that both of the first guiding member 54 and the second guiding member 55 are held movable up and down against side plates 70 (a first side plate 70a and a second side plate 70b). An X direction scanning motor constituting a main scanning direction mobile mechanism 550 reciprocates this carriage 51 via a pully and a belt in the X direction as the main scanning direction.

The two heads 52 includes two nozzle lines 152, each having multiples nozzles through which the liquid fabrication 10 is discharged (illustrated in a transparent state in FIG. 23). The two nozzle lines 152 of the first head 52a separately discharge cyan liquid fabrication and magenta liquid fabrication. The two nozzle lines 152 of the second head 52b separately discharge yellow liquid fabrication and black liquid fabrication. The configuration of the head 52 and the color of the liquid fabrication discharged by the head 52 are not limited thereto.

As illustrated in FIG. 23, multiple tanks 60 accommodating each liquid fabrication of the cyan liquid fabrication, magenta liquid fabrication, yellow liquid fabrication, and black liquid fabrication are mounted onto a tank mounting portion 56 to supply the liquid fabrication of each color to the heads 52 via a supply tube, etc.

In addition, the carriage 51 includes the powder supply unit 80 as the powder supply device to supply the powder 20 onto the powder layer of the fabrication tank 22. The powder supply unit 80 includes a powder accommodating unit 81 to accommodate the powder 20, a supply opening part 82 through which the powder 20 is supplied, and a shuttering member 83 to open and close the supply opening part 82.

On one side (on the right hand side in FIG. 23) of the mobile range of the carriage 51 in the X direction, a maintenance mechanism 61 is disposed to maintain and restore the head 52 of the liquid discharging unit 50. The maintenance mechanism 61 of the variation includes the same configuration as the maintenance mechanism 61 of the embodiments described above.

The fabrication unit 5 includes the slider part 72 held movable by the guiding member 71 disposed on the base member 7. The sub-scanning direction mobile mechanism 552 can reciprocally move the entire of the fabrication unit 5 in the Y direction orthogonal to the X direction (main scanning direction).

The liquid discharging unit 50 is disposed movable up and down together with the first guiding member 54 and the second guiding member 55 in the Z direction by an elevation mechanism 551 for discharging unit.

As described above, the device 100 of the variation includes no supply tank 21. Therefore, the control unit 500 of the variation does not include the supply stage drive unit 513 illustrated in FIG. 5 but a supply drive part. This supply drive part opens the shutter member 83 of the powder supply unit 80 to supply the powder 20 therethrough.

Next, an example of the fabrication operation of the device 100 of the variation is described with reference to FIG. 27.

FIGS. 27A to 27D are diagrams illustrating the example of the fabrication operation of the variation.

Figure 27A:
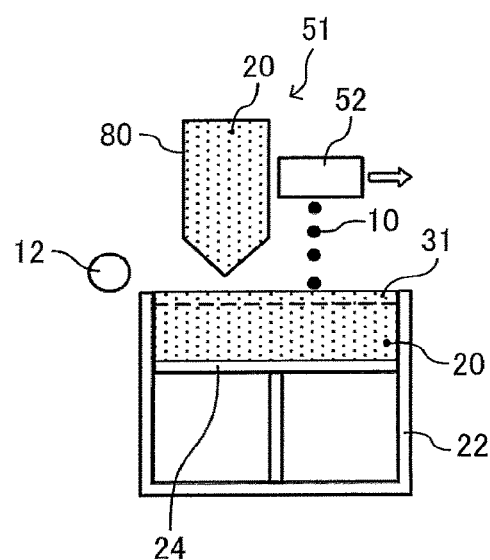
FIGS. 27A to 27D are diagrams illustrating an example of fabrication in a device for fabricating a three-dimensional fabrication object according to the variation of the present disclosure.
Figure 27B:
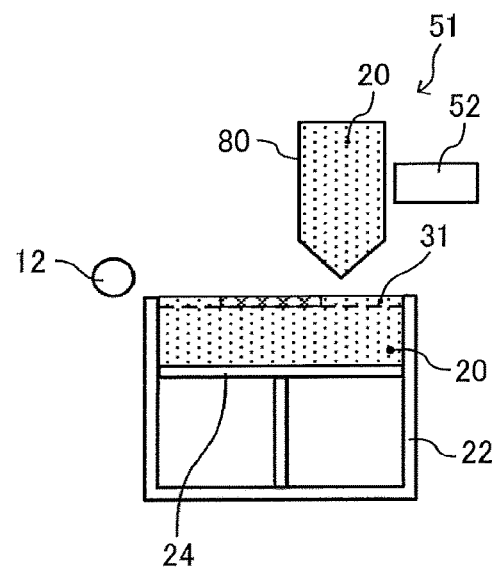

As illustrated in FIG. 27, the device 100 moves the head 52 and causes it to discharge the liquid fabrication 10 to the powder layer 31 having a predetermined thickness placed all over the fabrication stage 24 of the fabrication tank 22 in a laminar manner and form the first laminar fabrication structure 30 having a predetermined form as illustrated in FIG. 27B.

Figure 27C:
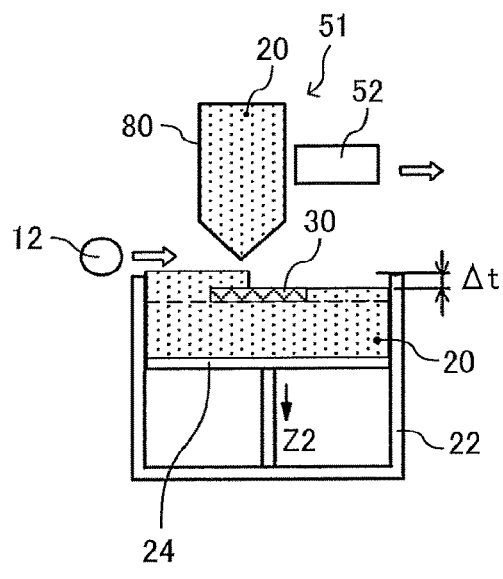

As illustrated in FIG. 27C, the fabrication stage 24 is moved down in the Z2 direction in a predetermined amount. At this point, the lowering distance of the fabrication stage 24 is determined in such a manner that the distance between the upper surface of the powder layer 31 having a predetermined thickness where the laminar fabrication structure 30 is formed in the fabrication tank 22 and the bottom part (bottom tangent portion) of the flattening roller 12 is $\Delta t$. This distance $\Delta t$ corresponds to the thickness of the powder layer 31 having a predetermined thickness to be formed next. This distance $\Delta t$ is preferably about several tens μm to several hundreds μm.

Figure 27D:
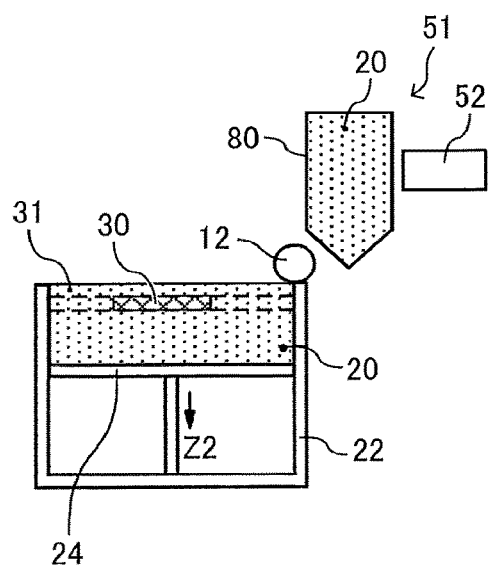
Figure 28A:
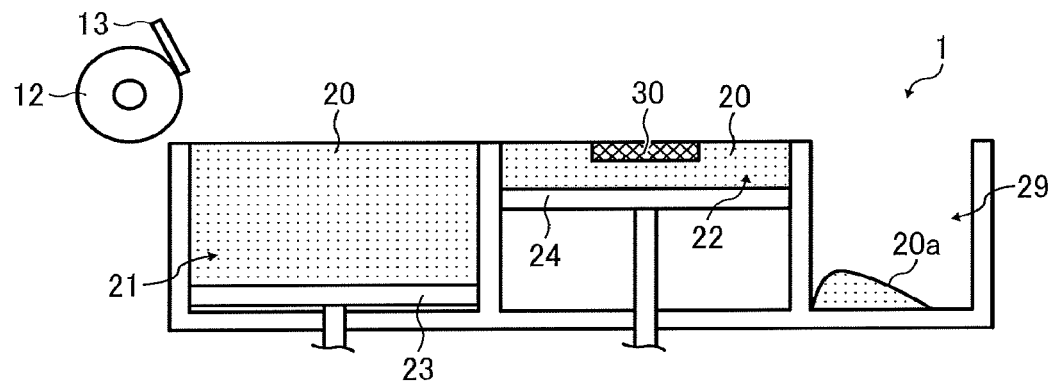
FIGS. 28A to 28E are diagrams illustrating formation of pre-powder layer.
Figure 28B:
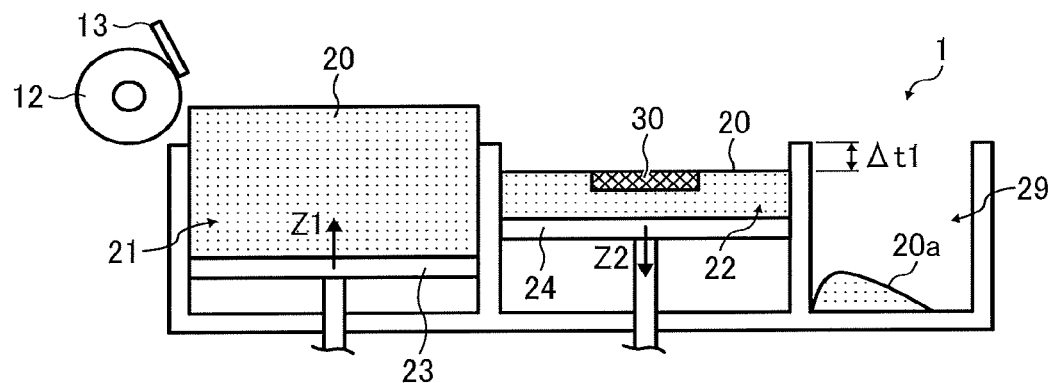
Figure 28C:
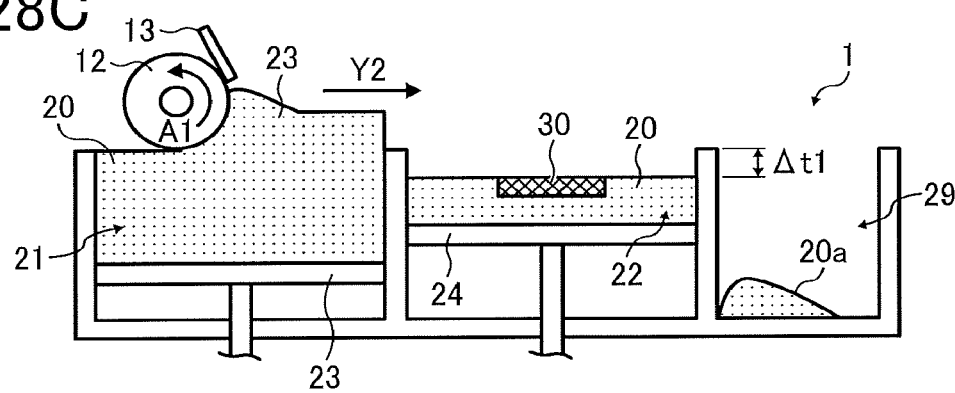
Figure 28D:
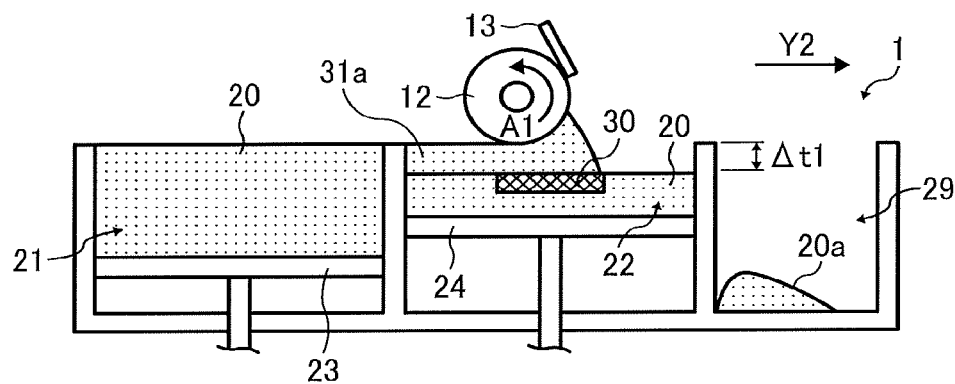
Figure 28E:
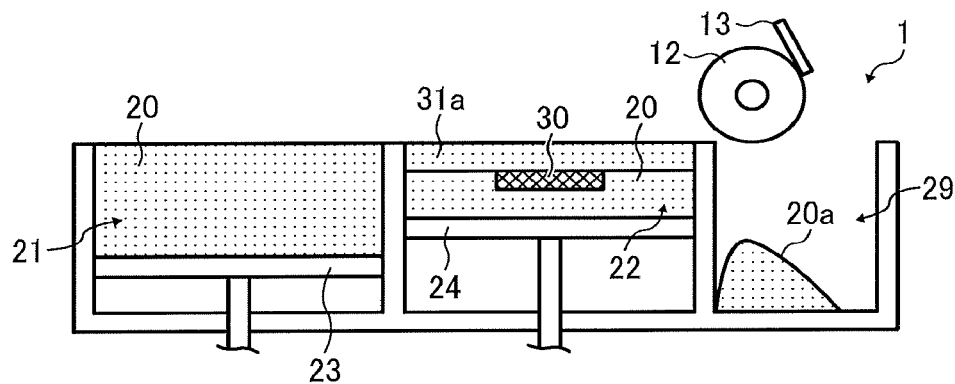
Figure 29A:
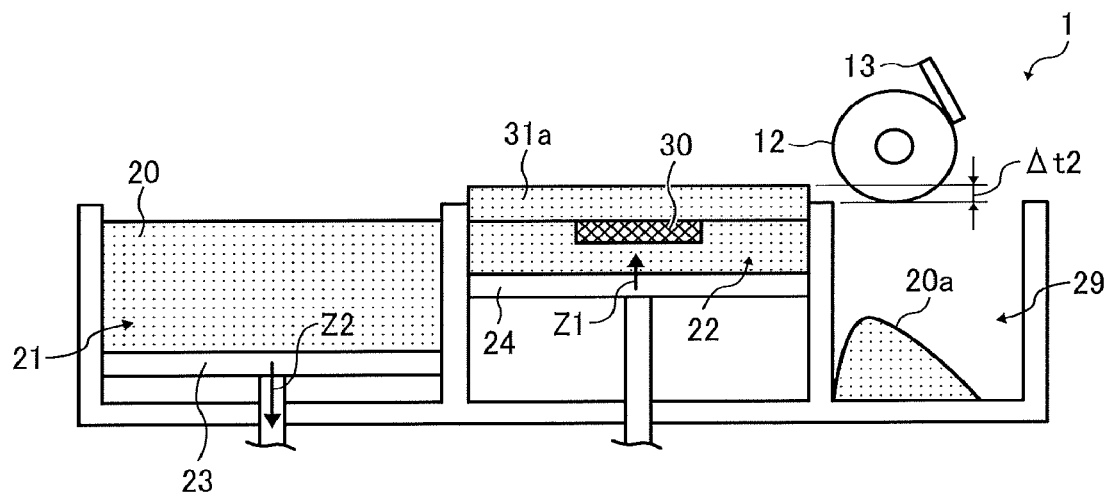
FIGS. 29A to 29D is a diagram illustrating removal of powder.
Figure 29B:
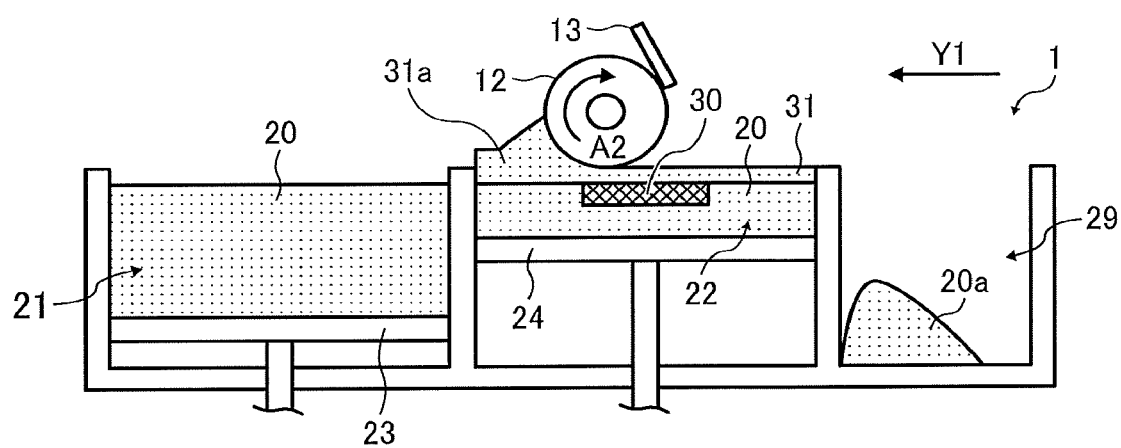
Figure 29C:
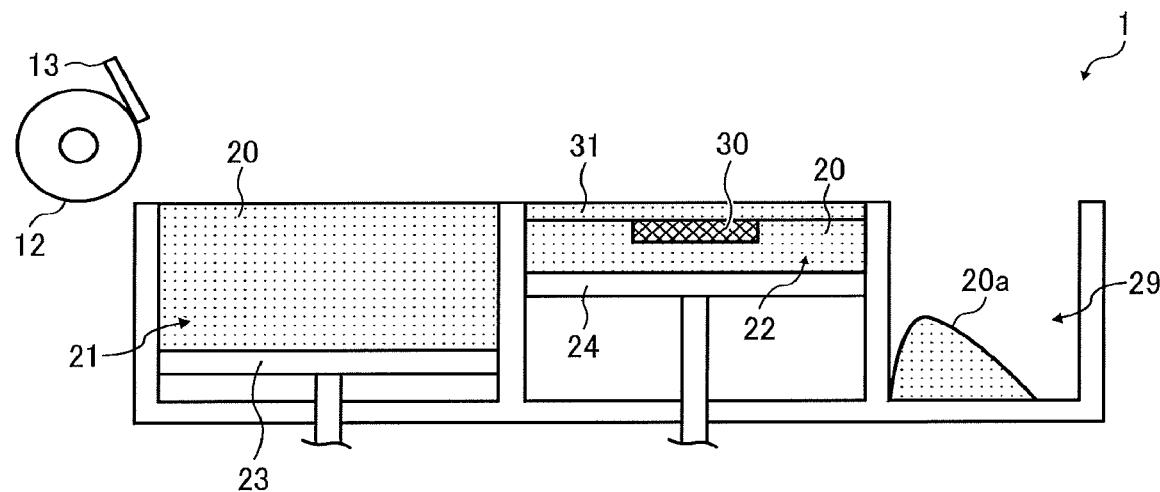
Figure 29D:
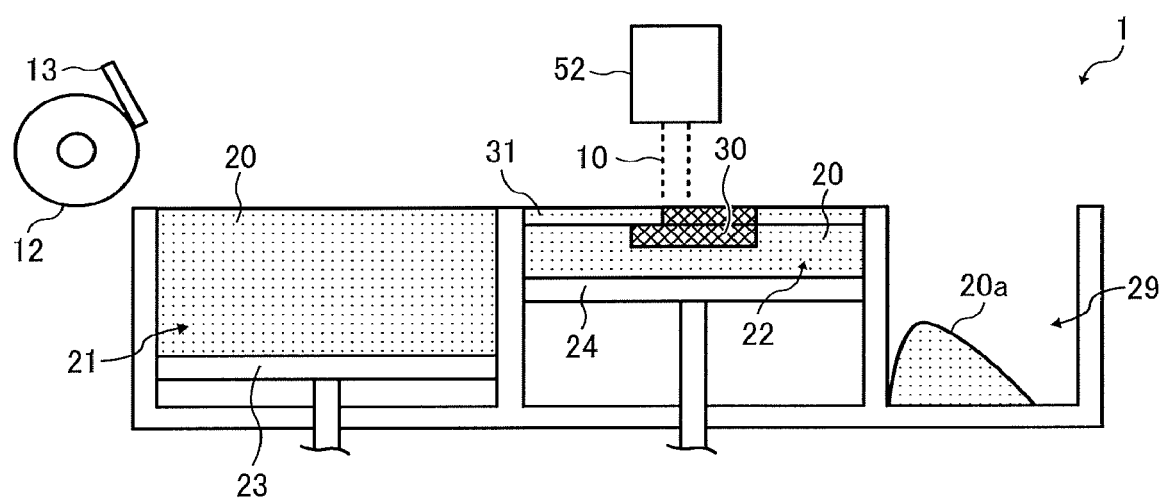

Next, as illustrated in FIG. 27C, the powder supply unit 80 supplies the powder 20 onto the powder layer 31 having a predetermined thickness where the laminar fabrication structure 30 is formed and the flattening roller 12 flattens the supplied powder 20. Due to this, as illustrated in FIG. 27D, the next powder layer 31 having a predetermined thickness is formed.

When the configuration of the present disclosure is applied to the device 100 of the variation, the control is as follows: When the powder 20 is supplied from the powder supply unit 80 and the flattening roller 12 flattens the supplied powder 20, the lowering distance of the fabrication stage 24 is determined to form a pre-powder layer 31a thicker than $\Delta t$ instead of the powder layer 31 having a predetermined thickness having a target thickness of $\Delta t$. After the pre-powder layer 31a is formed, the fabrication stage 24 is elevated and the upper layer portion of the pre-powder layer 31a is scraped by the flattening roller 12 multiple times. This is repeated multiple times to form the powder layer 31 having a predetermined thickness having a target thickness of $\Delta t$. Like Embodiment 1 to Example 3 described above, at least one of the thickness of the portion of the powder 20 to be removed and the rotation speed of the flattening roller 12 is different in the powder removal for the last time and the removal for any other time among the powder removal multiple times. This makes it possible to increase powder density of the powder layer 31 having a predetermined thickness and improve quality of a solid freeform fabrication object formed by partially binding the powder 20 constituting the powder layer 31 having a predetermined thickness followed by stacking.

The device 100 described above fabricates three-dimensional objects utilizing a binder jet method. The fabrication method to which the configuration of the present disclosure can be applied is not limited to the binder jet. Laser sintering (LS), electron beam sintering (EBM) can be employed. In the embodiment described above, the binding device binds powder using liquid discharged from the liquid discharging head. Also, it is possible to use a laser irradiator to sinter and bind powder, etc. The present disclosure can be applied to a solid freeform fabrication method of binding powder in a powder layer.

For binder jetting, in general, an inkjet head discharges binder ink to plaster as the powder 20 to agglomerate the plaster powder to form the laminar fabrication structure 30. It is also possible to discharge a binder resin through an inkjet head using sand as the powder 20 to fabricate a three-dimensional fabrication object that can be used as a casting mold. In addition, in the binder jet method, metal, ceramic, glass, etc. can be used as the powder 20. Moreover, in the binder jet method, using the powder 20 coated with a material soluble in a liquid for binding, it is also possible to discharge the liquid through an inkjet head and bind powder via the coating material to form the laminar fabrication structure 30.

The above-described is just an example and other aspects of the present disclosure are, for example, as follows.

Aspect A

A device for fabricating a three-dimensional fabrication object such as the device 100 for fabricating a three-dimensional fabrication object includes a fabrication part such as the fabrication tank 22, a flattening member such as the flattening roller 12 configured to place powder such as the powder 20 in the fabrication part to form an excessively thick powder layer such as the pre-powder layer 31a and thereafter remove the powder on the top surface side of the excessively thick powder layer multiple times, for example three times, to obtain a powder layer having a predetermined thickness (e.g., Δt) such as the powder layer 31 while moving in a direction (e.g., horizontal direction) orthogonal to the lamination direction (e.g., vertical direction) of the powder layer, and a fabrication unit such as the fabrication unit 5 to bind the powder to form a laminar fabrication object such as the laminar fabrication object 30, wherein the laminar fabrication object is formed repeatedly to fabricate the three-dimensional fabrication object, wherein the amount of the layer thickness of the powder removed for the last time (e.g., third time) is less than that for any other time (e.g., first time).

Due to this, as described in Embodiment 1, the amount of scraping for the last time is small so that the thickness of the powder present between the flattening member to remove the powder and the powder to remain as the powder layer having a predetermined thickness can be thinner for the removal for the last time but one. Due to this, the force of the flattening member pressing the powder layer at the time of removal for the last time but one is easily conveyed to the powder remaining as the powder layer having a predetermined thickness, which contributes to increasing powder density of the powder layer having a predetermined thickness. In addition, in the removal for the last time, the removing member directly contacts the surface of the powder remaining as the powder layer having a predetermined thickness. For this reason, for the removal for the last time, the force acting on the powder remaining as the powder layer having a predetermined thickness due to the force of the flattening member pressing the powder layer is considered to be irrelevant of the amount of the scraping for the last time.

Therefore, in Aspect A, when powder is bound to form a predetermined form by the fabrication operation, powder density of the powder layer can be increased more in comparison with a typical fabrication operation.

Aspect B

Aspect B differs from Aspect A in that as the number of removal increases, the amount of scraping is gradually decreased.

Due to this, as described in Embodiment 1, the layer thickness of powder is thick in the initial stage of multiple-time powder removal, which enables the time to be taken for powder layer forming shorter.

Aspect C

Aspect C differs from Aspect A or Aspect B in that the flattening member such as the flattening roller 12 is a rotary body and the rotation speed {N4=5 (rpm), etc.} of the flattening member during the removal for the last time, for example, the third time is greater than the rotation speed {N2=1 (rpm), etc.} during the powder removal for any other time such as the first time.

As described in the embodiments, this shortens the time to be taken required for powder layer forming, increases powder density of the powder layer having a predetermined thickness, and moreover prevents occurrence of non-uniform density of the powder layer having a predetermined thickness and deformation of a solid freeform fabrication object.

Aspect D

A device for fabricating a three-dimensional fabrication object such as the device 100 for fabricating a three-dimensional object includes a fabrication part such as the fabrication tank 22, a flattening member such as the flattening roller 12 configured to place powder such as the powder 20 in the fabrication part to form an excessively thick powder layer such as the pre-powder layer 31a and thereafter remove the powder on the top surface side of the pre-powder layer 31a multiple times, for example three times, to obtain a powder layer having a predetermined thickness (e.g., Δt) such as the powder layer 31 while moving in a direction (e.g., horizontal direction) orthogonal to the lamination direction (e.g., vertical direction) of the powder layer, and a fabrication unit such as the fabrication unit 5 configured to bind the powder to form a laminar fabrication object such as the laminar fabrication object 30, wherein the laminar fabrication object is formed repeatedly to fabricate the three-dimensional fabrication object, wherein the rotation speed {N4=5 (rps)} of the flattening member for the powder removal for the last time, for example, the third time, of the multiple times is greater than the rotation speed {N2=1 (rps)} for any other time, the first time.

As described in Example 2, this enables to prevent action of the force of the removing member in the direction of movement against the powder remaining as the powder layer having a predetermined thickness during the powder removal for the last time and occurrence of partial displacement of the powder remaining as the powder layer having a predetermined thickness. This enables to prevent occurrence of non-uniformity in powder density of the powder layer having a predetermined thickness ascribable to the displacement and a decrease in powder density ascribable to non-uniform density. Therefore, when the powder is bound to form a predetermined form during the fabrication, powder density of the powder layer can be increased more in comparison with a typical fabrication operation.

Aspect E

Aspect E differs from Aspect C or Aspect D in that as the number of powder removal increases, the rotation speed of the flattening member such as the flattening roller 12 gradually increases.

As described in Example 2, this enables to increase powder density by shaking the powder layer in the direction of movement of the flattening member such as horizontal direction due to the decrease in the rotation speed of the removing member in the initial stage of the multiple-time powder scraping. Therefore, the density of the powder remaining as the powder layer having a predetermined thickness can be increased. In addition, increasing the rotation speed of the flattening member toward the multiple-time powder removal for the last time prevents occurrence of non-uniformity in density in the powder layer having a predetermined thickness and enables to increase powder density of the powder layer having a predetermined thickness.

Aspect F

In Aspect F, the flattening member such as the flattening roller 12 is cylindrical in any one of Aspect A to Aspect E.

As described in the embodiment, in this configuration, the contact surface (front lower part in the direction of movement of the periphery of the cylindrical form) of the flattening member in contact with the powder at the front in the direction of movement of the flattening member is oriented obliquely downward. Therefore, if the flattening member moves, the powder is moved along the direction of movement by the contact surface while generating a force to push it downward. Therefore, due to the usage of such a flattening member, the powder density can be increased.

Aspect G

A method of manufacturing a three-dimensional fabrication object includes forming an excessively thick powder layer such as the pre-powder layer 31a in a fabrication part such as the fabrication tank 22, removing powder such as the powder 20 on the top surface side of the excessively thick powder layer multiple times (for example, three times) to obtain a powder layer having a predetermined thickness (e.g., Δt) such as the powder layer 31 by a flattening member configured to move in a direction (for example, horizontal direction) orthogonal to the lamination direction (for example, vertical direction) of the powder layer; and binding the powder in the powder layer to form a laminar fabrication structure such as the laminar fabrication structure 30 in the fabrication part, repeating the forming, the removing, and the binding to fabricate a three-dimensional fabrication object, wherein the amount of the excessively thick powder layer scraped for the last time (e.g., third time) of the multiple times is smaller than that for any other time (e.g., first time).

According to this, as described in Embodiment 1, powder density of the powder layer can be high when the powder is bound to have a predetermined form during the fabrication.

Aspect H

A non-transitory computer readable storage medium storing one or more instructions that, when executed by one or more processors, cause the one or more processors in a device for fabricating a three-dimensional fabrication object such as the device 100 for fabricating a three-dimensional fabrication object to execute a method of processing setting information, the method of manufacturing a three-dimensional fabrication object includes forming an excessively thick powder layer such as the pre-powder layer 31a in a fabrication part such as the fabrication tank 22, removing powder such as the powder 20 of the top surface of the excessively thick powder layer multiple times (for example, three times) to obtain a powder layer having a predetermined thickness (e.g., Δt) such as the powder layer 31 by a flattening member configured to move in a direction (for example, horizontal direction) orthogonal to the lamination direction (for example, vertical direction) of the powder layer; and binding the powder in the powder layer to form a laminar fabrication structure such as the laminar fabrication structure 30 in the fabrication part, repeating the forming, the removing, and the binding to fabricate a three-dimensional fabrication object; wherein the amount of the excessively thick powder layer scraped for the last time (e.g., third time) of the multiple times is smaller than that for any other time (e.g., first time).

According to this, as described in Embodiment 1, powder density of the powder layer can be high when the powder is bound in the fabrication to have a predetermined form.

The device 100 of this embodiment relatively moves the flattening roller 12 as the flattening member against the fabrication tank 22 to convey the powder 20 and at the same time flatten the powder 20, thereby forming a powder layer 31 in the fabrication tank 22. During this powder layer forming, a pre-powder layer is formed and the powder 20 is removed to form the powder layer 31. During the pre-powder layer forming, the flattening roller 12 pushes the powder 20 into the fabrication tank 22 to place the powder 20 all over the fabrication tank 22 to form the pre-powder layer 31a. In addition, during the powder removing, the flattening roller 12 partially removes the powder 20 on the top surface side of the pre-powder layer 31a to form the powder layer 31.

This powder layer forming and structure forming in which the powder 20 of the powder layer 31 is bound to have a predetermined form to form the laminar structure 30 are repeated to form a three-dimensional fabrication object in which the laminar fabrication structure 30 is stacked.

In addition, in the forming of the powder layer 31 illustrated in FIG. 28 and FIG. 29, to move the flattening roller 12 that has passed over the fabrication tank 22 to the initial position (position illustrated in FIG. 28A), the fabrication stage 24 is elevated to partially return the powder 20 of the pre-powder layer 31a to the supply tank 21. This enables to prevent degradation of quality of the solid freeform fabrication object (three-dimensional fabrication object) and simultaneously improve efficiency of use of the powder 20.

As the device for fabricating a three-dimensional object to fabricate three-dimensional objects, for example, a device for fabricating a solid freeform fabrication object employing additive manufacturing is known. An example of the device for fabricating the solid freeform fabrication object is known as follows: The device forms a thin layer of flattened powder on a fabrication stage and discharges a liquid fabrication through a head to the formed powder layer to form a thin fabrication layer (laminar fabrication structure 30) in which the powder is bound. Thereafter, the next powder layer is formed on the fabrication layer to form another fabrication layer, which is repeated until a solid freeform fabrication object is fabricated.

However, a typical device for fabricating a solid freeform fabrication object reciprocates a flattening member against a fabrication stage to increase powder density of a powder layer, so that the powder inside the formed powder layer is possibly displaced, which leads to degradation of quality of the solid freeform fabrication object.

The device 100 of this embodiment has a configuration in which at least one of the rotation speed of the flattening roller 12 and the mobile speed thereof is faster during the powder removing than during the pre-powder layer forming. This enables to prevent displacement of the powder 20 inside the powder layer 31 and at the same time increase powder density of the powder layer 31, thereby improving the quality of a solid freeform fabrication object.

Embodiment 2-1

Next, a first example (Embodiment 2-1) of the powder layer forming of the device 100 of this embodiment is described.

In Embodiment 2-1, the rotation speed of the flattening roller 12 during the powder removing is set to be faster than during the pre-powder layer forming. Specifically, using the flattening roller 12 having a diameter of 10 mm, the rotation speed during the pre-powder layer forming is set to be less than 5 (rps) and the rotation speed during the powder removing is set to be 5 (rps) or greater. In Embodiment 2-1, the mobile speed of the flattening roller 12 in the horizontal direction along the stage surface during the pre-powder layer forming and the powder removing is set to be 50 mm/s.

The issue of the configuration is described in which both the rotation speed and the mobile speed of the flattening roller 12 are the same during the pre-powder layer forming and during the powder removing.

A three-dimensional fabrication object was experimentally manufactured under the conditions that the rotation speed was constant at 5 (rps) or greater during the pre-powder layer forming and during the powder removing while the mobile speed of the flattening roller 12 along the stage surface was kept constant. In this experiment, density of the thus-manufactured three-dimensional fabrication object fluctuated depending on the position along the horizontal direction. Specifically, the powder density decreased toward the portion formed at positions on the downstream side in the direction of movement of the flattening roller 12 during the pre-powder layer forming. This is inferred because non-uniformity of powder density of the powder layer 31 occurred depending on the position along the direction of movement of the flattening roller 12.

In addition, another three-dimensional fabrication object was experimentally manufactured under the conditions that the rotation speed was constant at less than 5 (rps) during the pre-powder layer forming and during the powder removing while the mobile speed of the flattening roller 12 along the stage surface was kept constant. In this experiment, occurrence of non-uniformity in density of the thus-manufactured three-dimensional object fluctuating depending on the position along the horizontal direction was reduced. However, the laminar fabrication structure was misaligned in the horizontal direction, thereby degrading the fabrication accuracy of the thus-obtained three-dimensional fabrication object. This is inferred because the flattening roller 12 applies a force to the powder 20 in the horizontal direction at the time the powder layer 31 is formed on the already-formed laminar fabrication structure 30, which produces a force to displace the already-formed laminar fabrication structure 30 in the horizontal direction via the powder 20.

Next, the relation between the rotation speed of the flattening roller 12 and the behavior of the powder 20 is described with reference to FIGS. 30 and 31.

FIG. 30 is a diagram illustrating the relation between rotation speed of the flattening roller 12 and the behavior of the powder 20 during pre-powder layer forming.

Figure 30A:
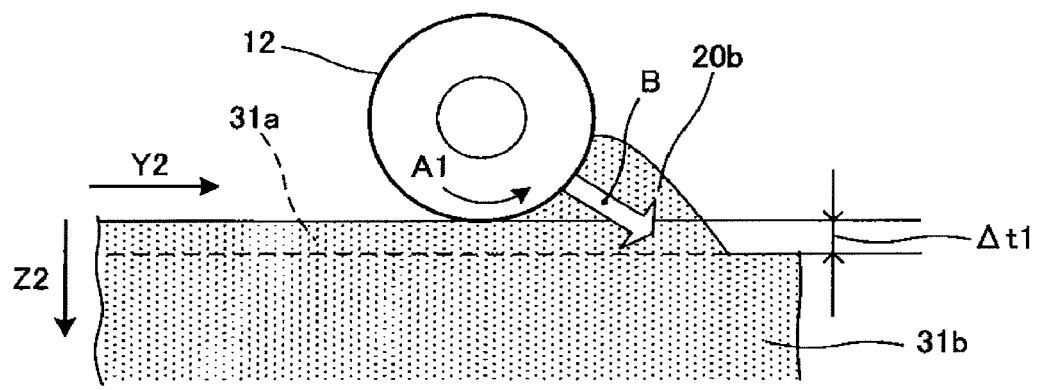
FIGS. 30A and 30B are diagrams illustrating relation between rotation speed of a flattening roller and behavior of powder in formation of pre-powder layer.
Figure 30B:
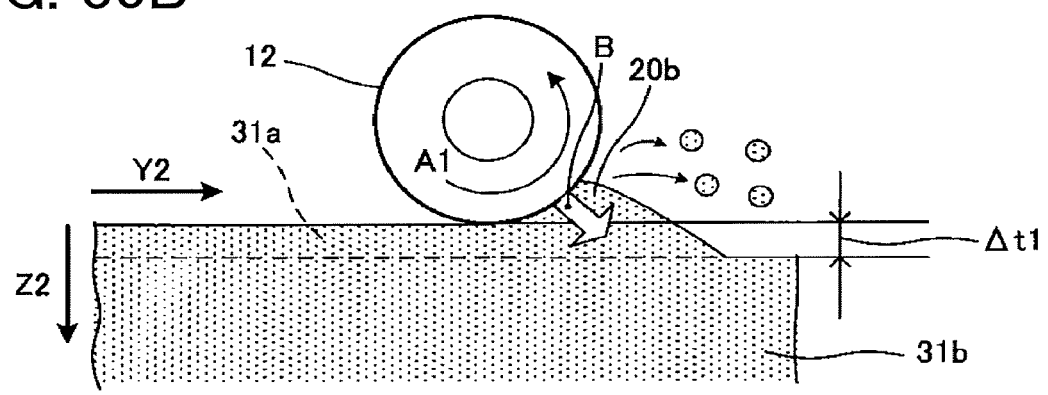

FIG. 30A is a diagram illustrating the case in which the rotation speed of the flattening roller 12 rotating in the direction indicated by an arrow A1 is low (less than 5 rps). FIG. 30B is a diagram illustrating the case in which the rotation speed of the flattening roller 12 rotating in the direction indicated by an arrow A1 is high (5 rps or greater).

The arrow B in FIG. 30 schematically represents the force of the flattening roller 12 acting on the powder 20.

In the pre-powder layer forming, a gap Δt1 is formed between the upper surface of the already-formed pre-powder layer 31b as the powder layer formed by the powder layer forming of the previous pre-powder layer 31 and the bottom of the periphery of the flattening roller 12. On the downstream side (right hand side in FIG. 30) along the direction of movement of the flattening roller 12 against the bottom of the periphery of the flattening roller 12 forming this gap Δt1, the powder 20 is present not forming the pre-powder layer 31a yet on the already-formed powder layer 31b. This powder 20 is defined as a powder 20b situated downstream of the roller.

In the case of the low rotation speed illustrated in FIG. 30A, the powder 20 in contact with the periphery of the flattening roller 12 tends to trace the surface moving of the flattening roller 12 so that static friction force easily occurs between the flattening roller 12 and the powder 20. In addition, static friction force tends to act on other powder 20 in contact with the powder 20 tracing the surface moving of the flattening roller 12, To the contrary, in the case of the high rotation speed illustrated in FIG. 30B, the powder 20 in contact with the periphery of the flattening roller 12 tends not to trace the surface moving of the flattening roller 12 so that not static friction force but kinetic friction force easily occurs between the flattening roller 12 and the powder 20. In addition, if the powder 20 traces the surface moving of the flattening roller 12 in contact with the powder 20, the powder 20 also moves fast. Therefore, the other powder 20 in contact with this powder 20 does not easily trace the movement of the powder 20 moving fast. Therefore, not static friction force but kinetic friction force tends to occur between the powder 20 tracing the surface moving of the flattening roller 12 and the other powder 20.

In general, static friction force is greater than kinetic friction force. Therefore, the force of the flattening roller 12 acting on the powder 20b situated downstream of the roller along the direction of movement of the flattening roller 12 is greater at the low rotation speed at which static friction force tends to occur than the high rotation speed at which kinetic friction force tends to occur.

For this reason, as represented by the arrow B illustrated in FIGS. 30A and 30B, the force of the flattening roller 12 acting on the powder 20 is greater at the low rotation speed. Moreover, the component force of the force represented by the arrow B along the direction of the movement (Y2 direction) of the flattening roller 12 is sufficiently larger at the low rotation speed illustrated in FIG. 30A. However, the component force of the force represented by the arrow B pressing the powder 20 downward is not much different between the low rotation speed illustrated in FIG. 30A and the high rotation speed illustrated in FIG. 30B.

Like this embodiment, when the pre-powder layer 31a is formed and the pre-powder layer 31a on the top surface side is partially removed to form the powder layer 31 having a predetermined thickness, it is suitable to place a uniform amount of the powder 20 all over the fabrication tank 22 along the horizontal direction during the pre-powder layer forming. If there is a site on which the amount of the powder 20 is insufficient, powder density at the site tends to be insufficient for flattening during the powder removing thereafter. As a result, non-uniformity in density of the powder layer 31 described above tends to occur.

In addition, if the friction force occurring between the periphery of the flattening roller 12 and the powder 20 is too small, the force of conveying the powder 20b situated downstream of the roller in contact with the flattening roller 12 toward the direction of movement (Y2 direction in FIG. 30) of the flattening roller 12 during the pre-powder layer forming weakens. For this reason, the ability of conveying the powder 20b situated downstream of the roller in the direction of the movement of the flattening roller 12 in accordance with the moving of the flattening roller 12 deteriorates. As a consequence, the amount of the powder 20 supplied from the supply tank 21 to the fabrication tank 22 decreases, which causes shortage of the powder 20 situated downstream in the direction of movement (downstream in the Y2 direction in FIG. 30) of the flattening roller 12 in the fabrication tank 22 during the pre-powder layer forming. This makes it difficult to uniformly place the powder 20 all over the fabrication tank 22 in the horizontal direction.

In addition, if a friction force occurring between the periphery of the flattening roller 12 and the powder 20 is too weak, the ability of the flattening roller 12 to convey the powder 20b situated downstream of the roller is weak. This increases the amount of the powder 20 passing under the flattening roller 12 moving in the Y2 direction in FIG. 30. Therefore, in the early stage of the pre-powder layer forming, a significant amount of the powder 20 upstream in the Y2 direction of the fabrication tank 22 passes under the flattening roller 12. This causes shortage of the amount of the powder 20 downstream in the Y2 direction of the fabrication tank 22, which makes it difficult to uniformly place the powder 20 all over the fabrication tank 22.

Therefore, as illustrated in FIG. 30B, for the pre-powder layer forming at a high rotation speed at which kinetic friction force tends to occur between the periphery of the flattening roller 12 and the powder 20, it is thought to be difficult to uniformly place the powder 20 all over the fabrication tank 22.

In Embodiment 2-1, as illustrated in FIG. 30A, the pre-powder layer is formed at a low rotation speed at which static friction force tends to occur between the periphery of the flattening roller 12 and the powder 20. Due to this, friction force occurring between the periphery of the flattening roller 12 and the powder 20 can be increased enough to secure the ability to uniformly convey the powder 20 all over the fabrication tank 22. Therefore, it is possible to reduce non-uniformity in powder density of the powder layer 31.

In addition, the powder 20b situated downstream of the roller is used to form the pre-powder layer 31a in accordance with the moving of the flattening roller 12 during the pre-powder layer forming, so that the amount of the powder 20 decreases towards downstream of the flattening roller 12. To secure the state in which the powder 20b situated downstream of the roller is present as far as the downstream end in the direction of movement of the flattening roller 12 in the fabrication tank 22, the amount of the powder 20 of the powder 20b situated downstream of the roller increases upstream in the direction of movement of the flattening roller 12 in the fabrication tank 22. During the pre-powder layer forming, the flattening roller 12 is moving while holding a significant amount of the powder 20 so that, at the high rotation speed of the flattening roller 12 of 5 rps or greater, the powder 20 easily scatters.

In Embodiment 2-1, the rotation speed of the flattening roller 12 during the pre-powder layer forming is the low rotation speed of less than 5 rps. Therefore, it is possible to reduce scattering of the powder 20 during the pre-powder layer forming which easily causes scattering of the powder 20.

Whether the rotation speed of the flattening roller 12 during the pre-powder layer forming is high or low depends on the diameter of the flattening roller 12. In embodiments, the diameter of the flattening roller 12 is 10 mm and the low rotation speed during the pre-powder layer forming is less than 5 rps. In addition, the high rotation speed during the pre-powder layer forming is 5 rps or greater.

FIG. 31 is a diagram illustrating the relation between the rotation speed of the flattening roller 12 and the behavior of the powder 20 during the powder removing.

Figure 31A:
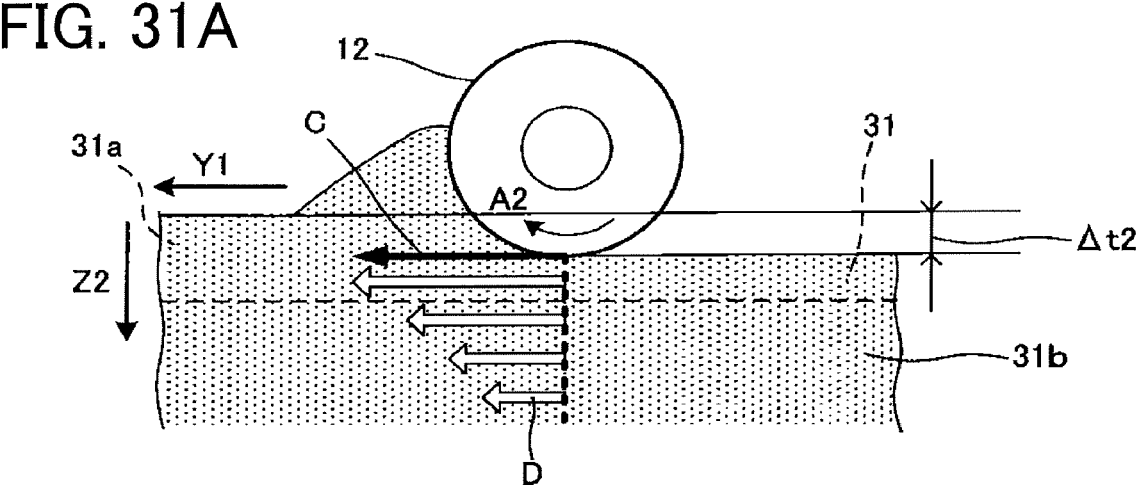
FIGS. 31A to 31C are diagrams illustrating relation between rotation speed of a flattening roller and behavior of powder in formation of pre-powder layer.
Figure 31B:
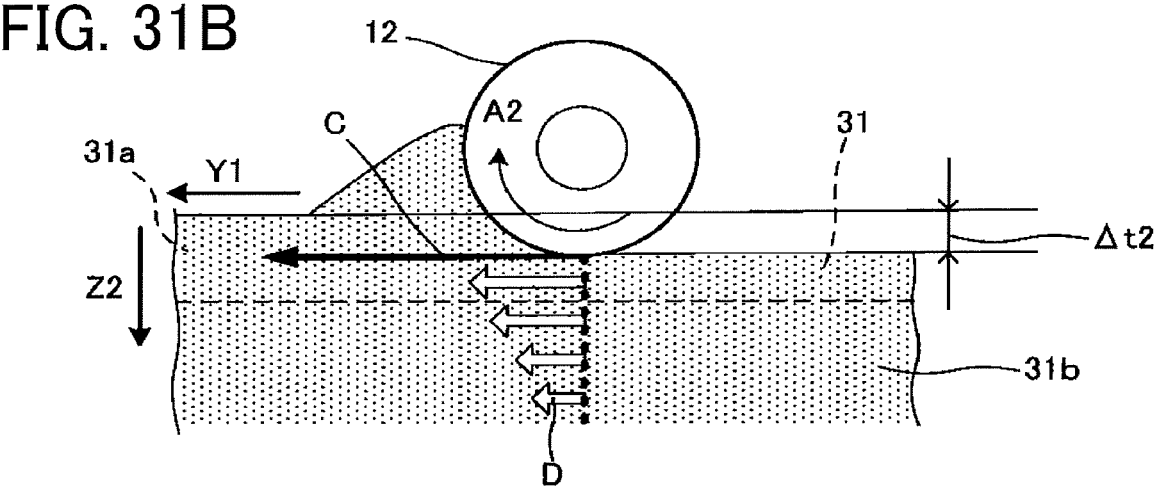
Figure 31C:
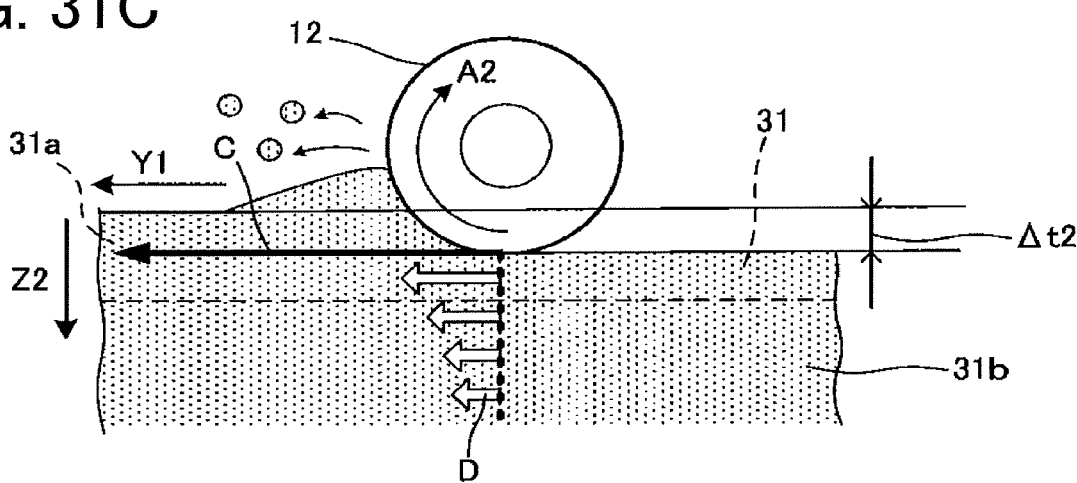

FIG. 31A is a diagram illustrating the case in which the rotation speed of the flattening roller 12 rotating in the direction indicated by an arrow A2 is low (less than 5 rps). FIG. 31B is a diagram illustrating the case in which the rotation speed of the flattening roller 12 rotating in the direction indicated by the arrow A2 is medium (5 to less than 20 rps). FIG. 31C is a diagram illustrating the case in which the rotation speed of the flattening roller 12 rotating in the direction indicated by the arrow A2 is high (20 rps or greater).

During the powder removing, the fabrication stage 24 elevates by Δt2 more than during the pre-powder layer forming. Therefore, as illustrated in FIG. 31, the flattening roller 12 bites into the pre-powder layer 31a formed during the pre-powder layer forming by the height of Δt2.

The arrow C in FIGS. 31A to 31C represents the surface moving speed of the flattening roller 12 and the four outline arrows D inside the powder layer 31 and the already-formed powder layer 31b represents the distribution of the force acting on inside the powder layer 31 and the already-formed powder layer 31b in the horizontal direction.

As illustrated in FIG. 31A, at the low rotation speed of the flattening roller 12, static friction force tends to occur between the flattening roller 12 and the powder 20 in contact therewith. Due to the action of the static friction force, which is greater than kinetic friction force, a large force of the flattening roller 12 is applied to the powder 20 in the direction of moving (horizontal direction), so that the powder 20 traces the surface of the flattening roller 12 and is displaced in the horizontal direction. Due to this displacement of the powder 20, a force is applied to the powder 20 situated therebelow in the horizontal direction due to the static friction force occurring between the powder 20 displaced and the powder 20 situated therebelow so that the powder 20 situated therebelow is displaced in the horizontal direction tracing the powder 20 situated above. This chain of displacement of the powder 20 is finally conveyed to the powder 20 in contact with the already-formed powder layer 31b situated below the powder layer 31, which causes dragging and swelling of the laminar fabrication structure 30 formed inside the already-formed powder layer 31b.

Dragging here means a phenomenon in which the laminar fabrication structure 30 inside the already-formed powder layer 31b is dragged in the direction of movement (flatting direction) of the flattening roller 12 and finally displaced. In addition, swelling here means a phenomenon in which the laminar fabrication structure 30 inside the already-formed powder layer 31b is stretched in the flattening direction so that the dimension of the laminar fabrication structure 30 is enlarged. Such dragging and swelling of the laminar fabrication structure 30 degrades the fabrication accuracy of a three-dimensional fabrication object.

In addition, the flattening roller 12 pushes and moves the powder 20 in the range of Δt2 of the top surface side of the pre-powder layer 31a to be removed in the powder removing in the Y1 direction. At this time, when the flattening roller 12 rotates at the low rotation speed, the powder 20 situated in the range of Δt2 does not easily move and a friction force is applied between this powder 20 and the powder 20 to remain after the powder removing. Therefore, the force to displace the powder 20 to remain after the powder removing in the horizontal direction is easily conveyed. This force may also cause dragging and swelling of the laminar fabrication structure 30 formed in the already-formed powder layer 31b.

As illustrated in FIG. 31B, at the medium rotation speed of the flattening roller 12, the powder 20 in contact with the periphery of the flattening roller 12 does not easily trace the surface movement of the flattening roller 12. Therefore, not static friction force but kinetic friction force tends to occur between the flattening roller 12 and the other powder 20. In addition, even if there is the powder 20 in contact with the surface of the flattening roller 12 and tracing the surface movement thereof, not static friction force but kinetic friction force tends to occur between this powder 20 tracing the surface movement and the other powder 20 in contact with this powder 20.

In a state in which kinetic friction force, which is smaller than static friction force, acts on, the force of the flattening roller 12 acting on the powder 20 in the direction of movement (horizontal direction) decreases, so that sliding occurs between the periphery of the flattening roller 12 in motion and the powder 20 in contact therewith. Therefore, the chain of the displacement of the powder 20, which easily occurs at the low rotation speed as described above, does not easily occur. Therefore, it is possible to reduce the force to displace the powder 20 of the already-formed powder layer 31b, thereby reducing the dragging and the swelling of the laminar fabrication structure 30 in the already-formed powder layer 31b.

Moreover, at the medium rotation speed of the flattening roller 12, the powder 20 situated in the range of Δt2 described above is easily displaced. Accordingly, a friction force does not easily act on between the powder 20 and the powder 20 to remain after the powder removing. Therefore, the force to displace the powder 20 to remain after the powder removing in the horizontal direction is not easily conveyed. Therefore, it is possible to reduce the dragging and the swelling of the laminar fabrication structure 30 in the already-formed powder layer 31b ascribable to the movement of the powder 20 pushed by the flattening roller 12.

Therefore, in Embodiment 2-1, the powder 20 is removed not at the low rotation speed at which a static friction force tends to act on between the periphery of the flattening roller 12 and the powder 20 but at the medium or high rotation speed at which kinetic friction force tends to act on between the periphery of the flattening roller 12 and the powder 20. This makes it possible to prevent the force of the flattening roller 12 in the direction of the movement thereof from acting on the powder 20 of the already-formed powder layer 31b and the force to displace the laminar fabrication structure 30 in the horizontal direction from acting thereon. Also, degradation of the fabrication accuracy of a three-dimensional fabrication object can be reduced.

In addition, as indicated by the arrow D in FIGS. 31A and 31B, as the rotation speed increases, the force acting on the powder 20 by the flattening roller 12 in the horizontal direction decreases. Also, the force acting on the powder 20 present below from the powder 20 present above in the horizontal direction decreases.

However, the force of the flattening roller 12 pressing the powder 20 downward (Z2 direction) does not easily fluctuate for the change in the rotation speed and the force of the powder 20 present above pressing down the powder 20 present below does not easily fluctuate, either. Therefore, it is possible to maintain increasing powder density of the powder layer 31 by the force of the flattening roller 12 pressing down the powder 20 (Z2 direction) for the change in the rotation speed.

However, as illustrated in FIG. 31C, at the high rotation speed (20 rps or greater) of the flattening roller 12, which is further faster than the medium rotation speed, disturbance represented by E in FIG. 31C appears on the surface of the powder layer 31 after powder removing, thereby failing to form a flattened surface in some occasions. This is inferred because the scraped powder 20 interfered the powder layer 31 to remain after the powder removing.

Whether the rotation speed of the flattening roller 12 during the powder removing is low, medium, or high depends on the diameter of the flattening roller 12. In this embodiment, the diameter of the flattening roller 12 is 10 mm and the low rotation speed during the powder removing is less than 5 rps. In addition, the high rotation speed during the powder removing is 20 rps or greater. In addition, the medium rotation speed during the powder removing is 5 to less than 20 rps, which is the speed range between the low rotation speed and the high rotation speed.

The rotation speed described above is when the diameter of the flattening roller 12 is 10 mm. The rotation speed changes as the diameter of the flattening roller 12 changes. Specifically, at the same rotation speed, the surface moving speed of the periphery of the flattening roller 12 increases as the diameter of the flattening roller 12 increases. Therefore, to obtain the effect described above for the pre-powder layer forming an the powder removing, the rotation speed shifts to the lower range.

In addition, at the same rotation speed, the relative speed of the moving speed of the periphery of the flattening roller 12 against the periphery of the flattening roller 12 increases as the moving speed of the flattening roller 12 increases in the horizontal direction. Therefore, to obtain the effect described above for the pre-powder layer forming and the powder removing, the rotation speed shifts to the lower range.

In the configuration forming the pre-powder layer 31 by the pre-powder layer forming and the powder removing, the force of the flattening roller 12 acting on the powder 20 in the horizontal direction is thought to increase to prevent non-uniform powder density of the pre-powder layer 31. This is inferred because increasing the force in the horizontal direction secures the ability to convey the powder 20 in the direction along the surface of the fabrication stage 24, which makes it possible to uniformly place the powder 20 all over the fabrication tank 22.

Moreover, at the time of the powder removing, decreasing the force of the flattening roller 12 acting on the powder 20 in the horizontal direction is thought to be able to prevent degradation of the fabrication accuracy of a three-dimensional fabrication object. This is inferred because decreasing the force in the horizontal direction reduces the force in the direction of movement of the flattening roller 12 acting on the powder 20 of the already-formed powder layer 31b and the force to displace the laminar fabrication structure 30 in the horizontal direction.

In Embodiment 2-1, the rotation speed of the flattening roller 12 during the pre-powder layer forming is low. Therefore, the ability of the flattening roller 12 to convey the powder 20 can be secured so that the powder 20 can be uniformly placed all over the fabrication tank 22. Therefore, non-uniform density of a three-dimensional object can be prevented. Moreover, at the medium rotation speed of the flattening roller 12 during the powder removing, it is possible to reduce the force of the flattening roller 12 acting on the powder 20 in the horizontal direction and degradation of the fabrication accuracy of a three-dimensional object. In addition, the powder density of the powder layer 31 can be increased because the force of the flattening roller 12 pressing the powder 20 downward can be maintained at the medium rotation speed of the flattening roller 12 during the powder removing.

Figure 32:
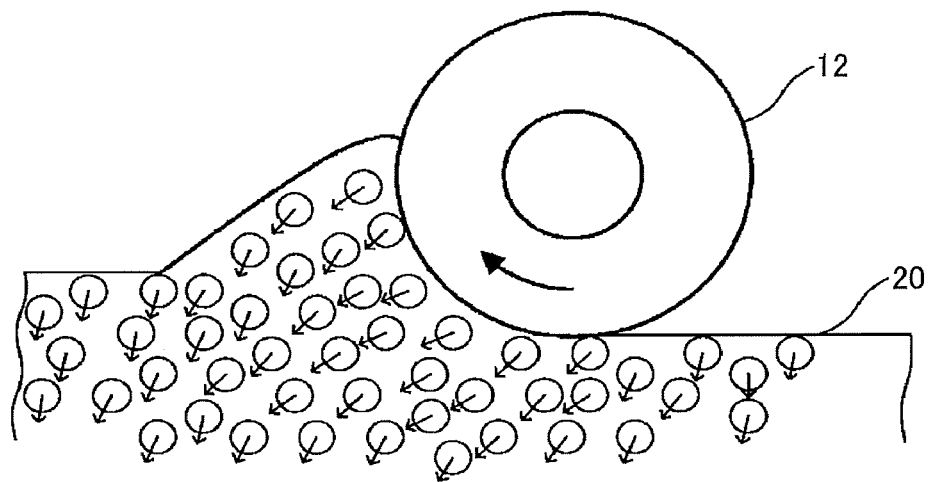
FIG. 32 is a schematic diagram illustrating forces applied to individual particles of powder during flattening operation.

FIG. 32 is a schematic diagram illustrating the force acting on individual particles of the powder 20 during the flattening (pre-powder layer forming or powder removing) of the powder 20 using the flattening roller 12. As illustrated in FIG. 32, the force acting on the individual particles of the powder 20 differs depending on the position against the flattening roller 12 and moreover the rotation speed of the flattening roller 12.

The difference of the force acting on the collective powder 20 depending on the rotation speed of the flattening roller 12 was simulated for comparison.

FIG. 33 is a diagram illustrating the results of the simulation in which the force acting on the powder 20 is separately calculated for different rotation speeds of the flattening roller 12.

In this simulation, the condition that the powder 20 is placed all over on the already-formed powder layer 31b in accordance with the pre-powder layer forming and the condition that the powder 20 is removed on the top layer of the pre-powder layer 31a in accordance with the powder removing are separately employed for calculation. The moving speed of the flattening roller 12 in the horizontal direction is 200 mm/s, and the direction of the movement of the flattening roller 12 is from right to left in FIG. 33 for either of the pre-powder layer forming and powder removing.

Figure 33A:
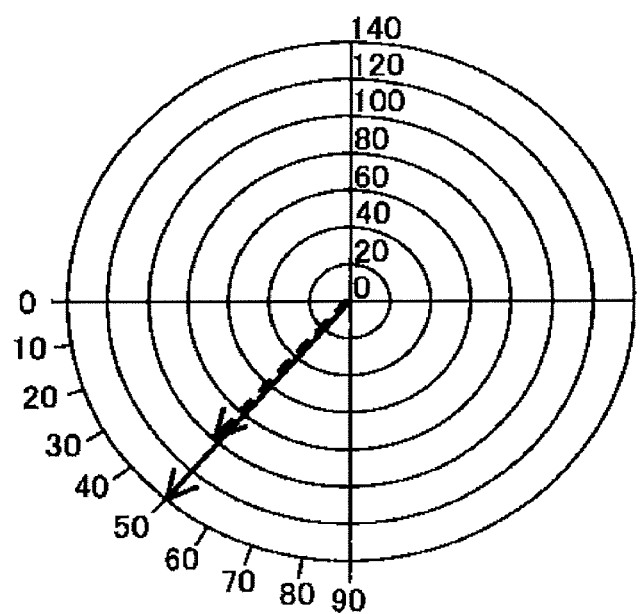
FIGS. 33A to 33C are diagrams illustrating the simulation results calculated for individual forces applied to powder for rotation speeds of a flattening roller.
Figure 33B:
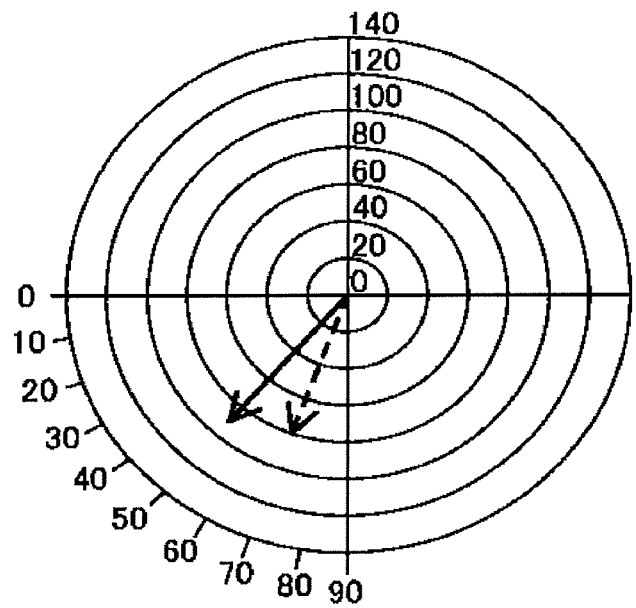
Figure 33C:
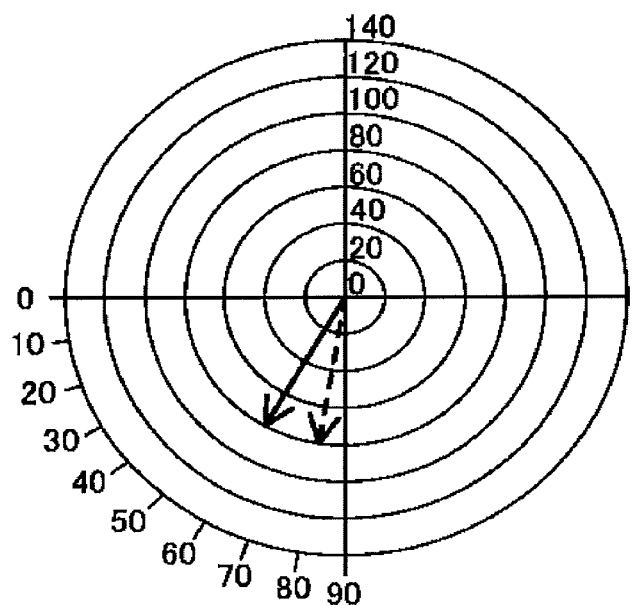

In FIG. 33A, the rotation speed is 0 rps. In FIG. 33B, the rotation speed is 5 rps. In FIG. 33C, the rotation speed is 50 rps.

The sum of the forces acting on the individual particles of the powder 20 from start to end of the pre-powder layer forming and the powder removing is separately calculated. Thereafter, the sum of the particles of the powder 20 is calculated to obtain the total of the force. The lengths of the arrows in FIG. 33 represent the sizes of this total of the force and the direction of the arrows indicate the direction of the forces. The direction of the arrow is that 0° is horizontal and 90° is vertical downward. The size of the total of the forces illustrated in FIG. 33 is a non-dimensional value.

The arrow in solid line in FIG. 33 represents the total of the forces acting on the powder 20 during the pre-powder layer forming and the arrow in dotted line in FIG. 33 represents the total of the forces acting on the pre-powder layer during the powder removing.

As illustrated in FIG. 33, the size of the total of the forces and the angle of the direction of action of the forces change depending on the difference between the pre-powder layer forming and the powder removing or the difference of the flattening roller 12.

During the pre-powder layer forming, as the rotation speed increases from 0 rps to 50 rps, the angle of the direction of the action of the force slightly increases from 50° to 60° as indicated by the solid line arrow. Conversely, during the powder removing, the angle significantly increases from 50° to 80° as illustrated in the dotted line arrow.

During the pre-powder layer forming illustrated by the solid line arrow, the size of the total of the forces significantly decreases from 140 to 80 as indicated by the solid line arrow as the rotation speed increases from 0 rps to 50 rps. Conversely, during the powder removing, the size decreases from 100 to 80 as indicated by the dotted line arrow, which is not significant in comparison.

Moreover, during the powder removing, as the rotation speed increases from 0 rps to 50 rps, the component force in the horizontal direction of the total of the forces decreases and the component force vertically downward does not almost change. Inferring from this, for the increase in the rotation speed during the powder removing, the ability of increasing powder density of the powder layer 31 can be maintained by the force of the flattening roller 12 pressing downward while reducing the force acting on the already-formed powder layer 31b in the horizontal direction.

In the simulation described with reference to FIG. 33, the calculation is made under the condition that the rotation speed of the flattening roller 12 is 0 rps. However, in a real device, if the rotation speed is set to 0 rps during the pre-powder layer forming suitable for low rotation speed, the laminar fabrication structure 30 is displaced in the horizontal direction, thereby degrading the fabrication accuracy of a three-dimensional object. For the device 100 of this embodiment, the rotation speed of the flattening roller 12 during the pre-powder layer forming is set to 2 rps or greater. A suitable value of the rotation speed of the flattening roller 12 changes depending on the flowability of the powder 20. For the powder 20 having a high flowability, degradation of the fabrication accuracy of a three-dimensional fabrication object ascribable to the displacement of the laminar fabrication structure 30 in the horizontal direction can be reduced at a lower rotation speed.

In Embodiment 2-1, the powder 20 can be uniformly placed all over the total area in the direction of movement of the flattening roller 12 in the fabrication tank 22 during the pre-powder layer forming so that the powder layer 31 can have uniform and high powder density. Moreover, during the powder removing, it is possible to reduce the force of the flattening roller 12 acting on the powder 20 to remain as the powder layer 31 in the direction of movement of the flattening roller 12 and also prevent the displacement of the laminar fabrication structure 30 formed on the already-formed powder layer 31b as the powder layer present below the powder layer 31 to be formed. This leads to reduction of the degradation of the fabrication accuracy of a three-dimensional fabrication object.

Embodiment 2-2

Next, a second example (Embodiment 2-2) of the powder layer forming of the device 100 of this embodiment is described.

In Embodiment 2-2, the moving speed of the flattening roller 12 in the horizontal direction along the stage surface during the powder removing is set to be faster than during the pre-powder layer forming. Specifically, using the flattening roller 12 having a diameter of 10 mm, the moving speed during the pre-powder layer forming is set to be less than 50 (mm/s) and the moving speed during the powder removing is set to be 50 (mm/s) or greater. In Embodiment 2-2, the rotation speed of the flattening roller 12 during the pre-powder layer forming and the powder removing is set to be 5 rps.

In Embodiment 2-2, the configuration is the same as that in Embodiment 2-1 except that the rotation speed and the moving speed of the flattening roller 12 are different.

Next, the relation between the moving speed of the flattening roller 12 in the horizontal direction and the behavior of the powder 20 is described with reference to FIGS. 34 and 35.

FIG. 34 is a diagram illustrating the relation between the moving speed of the flattening roller 12 and the behavior of the powder 20 during the pre-powder layer forming.

Figure 34A:
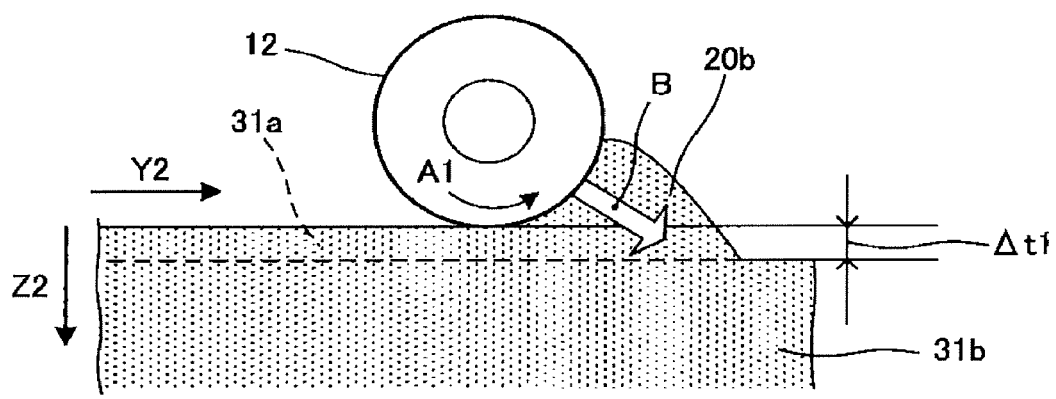
FIGS. 34A and 34B are diagrams illustrating relation between moving speed of a flattening roller and behavior of powder in formation of pre-powder layer.
Figure 34B:
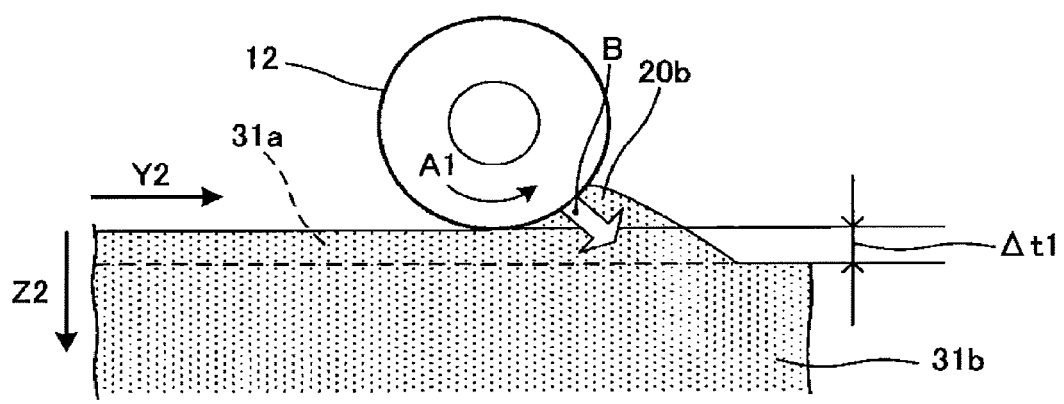

FIG. 34A is a diagram illustrating the case in which the moving speed of the flattening roller 12 moving in the horizontal direction indicated by the arrow Y2 is low (less than 50 mm/s). FIG. 34B is a diagram illustrating the case in which the moving speed of the flattening roller 12 moving in the horizontal direction indicated by the arrow Y2 is high (50 mm/s or greater).

The arrow B in FIG. 34 schematically represents the force of the flattening roller 12 acting on the powder 20.

In the case of the low speed moving illustrated in FIG. 34A, the powder 20 in contact with the periphery of the flattening roller 12 tends to trace the moving of the flattening roller 12 so that static friction force easily occurs between the flattening roller 12 and the powder 20. In addition, static friction force tends to be applied to the other powder 20 in contact with the powder 20 tracing the moving of the flattening roller 12, Conversely, in the case of the high speed moving illustrated in FIG. 34B, the powder 20 in contact with the periphery of the flattening roller 12 tends not to trace the moving of the flattening roller 12 so that not static friction force but kinetic friction force easily occurs between the flattening roller 12 and the powder 20. In addition, even if there is the powder 20 in contact with the surface of the flattening roller 12 and tracing the movement thereof, not static friction force but kinetic friction force tends to occur between this powder 20 tracing the movement and the other powder 20.

As illustrated in FIG. 34B, for the pre-powder layer forming at a high speed moving at which kinetic friction force tends to occur between the periphery of the flattening roller 12 and the powder 20, the friction force occurring between the periphery of the flattening roller 12 and the powder 20 may be too small. In this state, the ability to convey the powder 20b situated downstream of the roller in the direction of movement (Y2 direction in FIG. 34) of the flattening roller 12 during the pre-powder layer weakens and becomes insufficient. As a consequence, the amount of the powder 20 supplied from the supply tank 21 to the fabrication tank 22 decreases, which causes shortage of the powder 20 present downstream in the direction of movement (downstream in the Y2 direction in FIG. 34) of the flattening roller 12 in the fabrication tank 22 during the pre-powder layer forming. This makes it difficult to uniformly place the powder 20 all over the fabrication tank 22.

In addition, if the friction force described above is too weak, the ability of the flattening roller 12 to convey the powder 20b situated downstream of the roller is weak. This increases the amount of the powder 20 passing under the flattening roller 12 moving in the Y2 direction in FIG. 34. Therefore, in the early stage of the pre-powder layer forming, a significant amount of the powder 20 upstream in the Y2 direction of the fabrication tank 22 passes under the flattening roller 12. This causes shortage of the amount of the powder 20 downstream in the Y2 direction of the fabrication tank 22, which makes it difficult to uniformly place the powder 20 all over the fabrication tank 22.

In Embodiment 2-2, as illustrated in FIG. 34A, the pre-powder layer is formed at a low moving speed at which static friction force tends to occur between the periphery of the flattening roller 12 and the powder 20. Due to this, friction force occurring between the periphery of the flattening roller 12 and the powder 20 can be increased enough to secure the ability to uniformly convey the powder 20 all over the fabrication tank 22. Therefore, it is possible to reduce non-uniformity in powder density of the powder layer 31.

FIG. 35 is a diagram illustrating the relation between the moving speed of the flattening roller 12 in the horizontal direction and the behavior of the powder 20 during the powder removing.

Figure 35A:
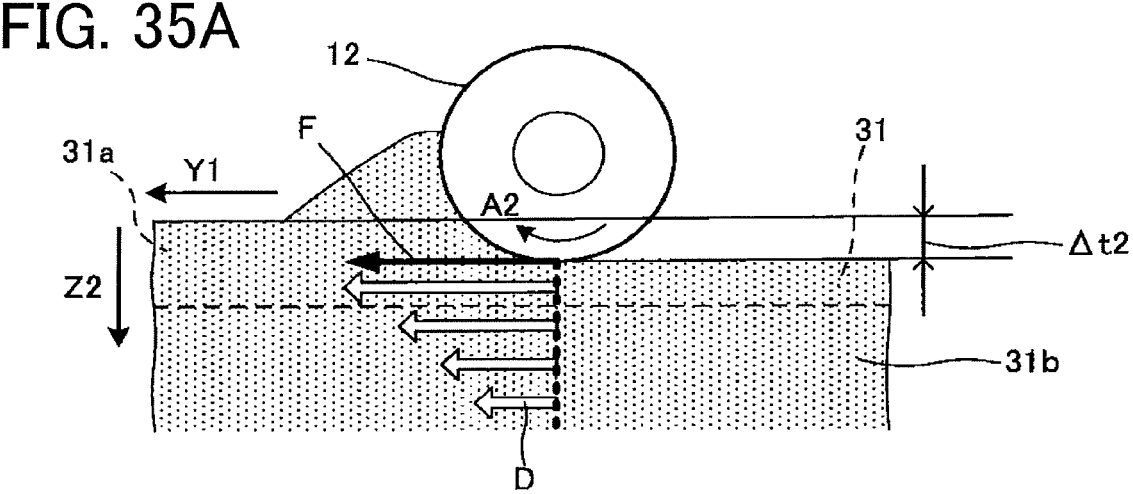
FIGS. 35A and 35B are diagrams illustrating relation between moving speed of a flattening roller and behavior of powder in removal of pre-powder layer.
Figure 35B:
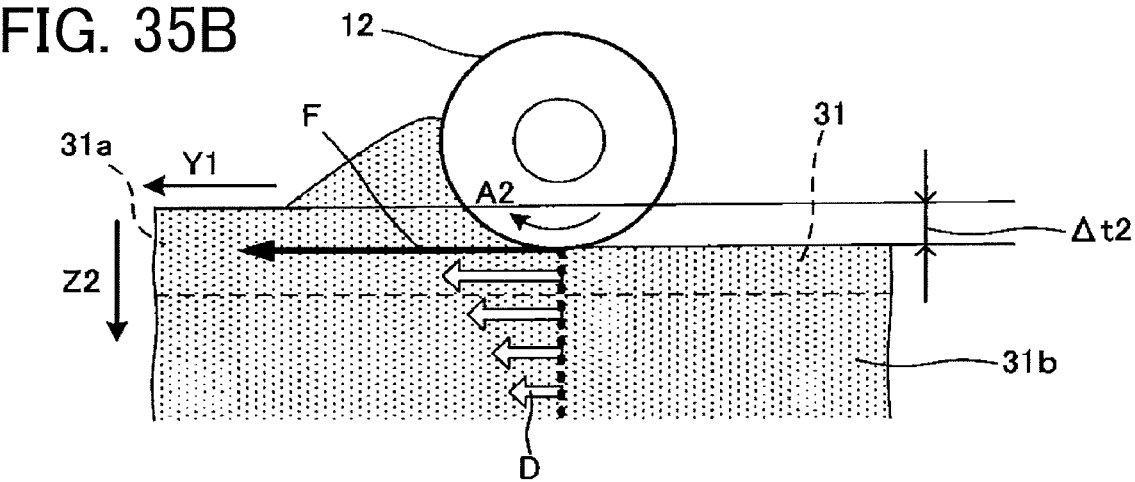

FIG. 35A is a diagram illustrating the case in which the moving speed of the flattening roller 12 moving in the horizontal direction while rotating in the direction indicated by the arrow A2 is low (less than 50 mm/s). FIG. 35B is a diagram illustrating the case in which the moving speed of the flattening roller 12 moving in the horizontal direction while rotating in the direction indicated by the arrow A2 is high (50 mm/s or greater).

The arrow F in FIG. 35 represents the moving speed of the flattening roller 12 in the horizontal direction and the four outline arrows D inside the powder layer 31 and the already-formed powder layer 31b represent the distribution of force acting on inside the powder layer 31 and the already-formed powder layer 31b in the horizontal direction.

As illustrated in FIG. 35A, at the low moving speed of the flattening roller 12, static friction force tends to occur between the flattening roller 12 and the powder 20 in contact therewith. Due to the action of static friction force, which is greater than kinetic friction force, a large force of the flattening roller 12 is applied to the powder 20 in the direction of moving (horizontal direction), so that the powder 20 traces the surface of the flattening roller 12 and is displaced in the horizontal direction. Due to this displacement of the powder 20, a force acts on the powder 20 situated therebelow in the horizontal direction due to the static friction force occurring between the powder 20 displaced and the powder 20 situated therebelow so that the powder 20 situated therebelow is displaced in the horizontal direction tracing the powder 20 situated above. This chain of displacement of the powder 20 is finally conveyed to the powder 20 in contact with the already-formed powder layer 31b situated below the powder layer 31, which causes dragging and swelling of the laminar fabrication structure 30 formed inside the already-formed powder layer 31b. Such dragging and swelling of the laminar fabrication structure 30 degrades the fabrication accuracy of a three-dimensional fabrication object.

In addition, the flattening roller 12 pushes the powder 20 in the range of Δt2 on the top surface of the pre-powder layer 31a to be removed during the powder removing along the Y1 direction. At this point, when the flattening roller 12 moves at low moving speed, the powder 20 situated in the range of Δt2 does not easily move and a friction force acts on between this powder 20 and the powder 20 to remain after the powder removing. Therefore, the force of displacing the powder 20 to remain after the powder removing in the horizontal direction is easily conveyed. This force may also cause dragging and swelling of the laminar fabrication structure 30 formed in the already-formed powder layer 31b.

As illustrated in FIG. 35B, at the high moving speed of the flattening roller 12, the powder 20 in contact with the periphery of the flattening roller 12 does not easily trace the movement of the flattening roller 12. Therefore, not static friction force but kinetic friction force tends to occur between the flattening roller 12 and the other powder 20. In addition, even if there is the powder 20 in contact with the surface of the flattening roller 12 and tracing the movement thereof, not static friction force but kinetic friction force tends to occur between this powder 20 tracing the movement and the other powder 20 in contact with this powder 20.

In a state in which kinetic friction force, which is smaller than static friction force, acts on, the force of the flattening roller 12 acting on the powder 20 in the direction of movement (horizontal direction) of the flattening roller 12 decreases, so that sliding occurs between the periphery of the flattening roller 12 during moving and the powder in contact therewith. Therefore, the chain of the displacement of the powder 20, which easily occurs at the low moving speed described above, does not easily occur. Therefore, it is possible to reduce the force to displace the powder 20 of the already-formed powder layer 31b, thereby reducing the dragging and the swelling of the laminar fabrication structure 30 in the already-formed powder layer 31b.

Moreover, at the high moving speed of the flattening roller 12, the powder 20 situated in the range of Δt2 described above is easily displaced. Accordingly, a friction force does not easily act on between the powder 20 and the powder 20 to remain after the powder removing. Therefore, the force to displace the powder 20 to remain after the powder removing in the horizontal direction is not easily conveyed. Therefore, it is possible to reduce the dragging and the swelling of the laminar fabrication structure 30 in the already-formed powder layer 31*b* ascribable to the movement of the powder 20 pushed by the flattening roller 12.

Therefore, in Embodiment 2-2, the powder 20 is removed not at the low rotation speed at which a static friction force tends to occur between the periphery of the flattening roller 12 and the powder 20 but at the high moving speed at which kinetic friction force tends to occur between the periphery of the flattening roller 12 and the powder 20 This makes it possible to prevent the force of the flattening roller 12 in the direction of the movement thereof from acting on the powder 20 of the already-formed powder layer 31*b* and the force to displace the laminar fabrication structure 30 in the horizontal direction from acting thereon. Therefore, degradation of the fabrication accuracy of a three-dimensional fabrication object can be reduced.

Therefore, it is possible to maintain increasing powder density of the powder layer 31 by the force of the flattening roller 12 pressing down the powder 20 (Z2 direction) for the change in the moving speed like Embodiment 2-1, in which the rotation speed is changed.

In Embodiment 2-2, the moving speed of the flattening roller 12 during the pre-powder layer forming is low. Therefore, the ability of the flattening roller 12 to convey the powder 20 can be secured so that the powder 20 can be uniformly placed all over the fabrication tank 22. Therefore, non-uniform density of a three-dimensional object can be prevented. Moreover, at the high moving speed of the flattening roller 12 during the powder removing, it is possible to reduce the force of the flattening roller 12 acting on the powder 20 in the horizontal direction and degradation of the fabrication accuracy of a three-dimensional object. In addition, the powder density of the powder layer 31 can be increased because the force of the flattening roller 12 pressing the powder 20 downward can be maintained at the high moving speed of the flattening roller 12 during the powder removing.

Whether the moving speed of the flattening roller 12 during the pre-powder layer forming and the powder removing is high or low depends on the diameter of the flattening roller 12. In this embodiment, the diameter of the flattening roller 12 is 10 mm and the moving speed being low during the pre-powder layer forming and during the powder removing means that the moving speed is less than 50 mm/s. In addition, the moving speed being high during the pre-powder layer forming and during the powder removing means that moving speed is 50 mm/s or greater.

The moving speed described above is when the diameter of the flattening roller 12 is 10 mm and the rotation speed is 5 rps. However, the moving speed is not limited thereto and changes as the diameter of the flattening roller 12 or the rotation speed changes. Specifically, at the same moving speed, the relative speed of the periphery of the flattening roller 12 against the fabrication stage 24 increases as the diameter of the flattening roller 12 and the rotation speed increases. Therefore, to obtain the effect described above during the pre-powder layer forming and during the powder removing, the moving speed shifts to the lower range.

In embodiments, to rotate or move the flattening roller 12 at low speed during the pre-powder layer forming, the densely-packed pre-powder layer 31*a* free of the powder 20 during the conveyance can be formed. In addition, at the time of the powder removing, the flattening roller 12 is rotated or moved at high speed. Therefore, if there is the powder 20 tracing the surface of the flattening roller 12, the connection between this powder 20 and the other powder 20 is broken and the moving of the powder 20 forming the powder layer 31 in the horizontal direction can be reduced. For this reason, while reducing displacement of the powder 20 forming the powder layer 31 in the direction of movement of the flattening roller 12, the powder 20 positioned above the powder 20 forming the powder layer 31 can be scraped.

In embodiments, the flattening roller 12 is moved to relatively move against the fabrication tank 22. However, it is possible to move the fabrication tank 22 to relatively move the flattening roller 12 against the fabrication tank 22.

In embodiments, the rotation direction (hereinafter referred to as forward direction) of the flattening roller 12 is such that the surface moving direction of the flattening roller 12 at the part thereof facing the fabrication tank 22 is the same as the moving direction of the flattening roller 12 against the fabrication tank 22. The rotation direction (hereinafter referred to as backward direction) of the flattening roller 12 can also be such that the surface moving direction of the flattening roller 12 at the part thereof facing the fabrication tank 22 is reverse to the moving direction of the flattening roller 12 against the fabrication tank 22.

However, powder density and layer thickness of the powder layer 31 can be uniformed for the forward direction of the rotation direction of the flattening roller 12. The mechanism is as follows:

In the vicinity of the lowermost part of the flattening roller 12, a space having a wedge-like form is formed between the periphery of the flattening roller 12 situated downstream of this lowermost part in the direction of movement of the flattening roller 12 against the fabrication tank 22 and a virtual horizontal plane crossing the lowermost part of the flattening roller 12.

At the backward direction of the rotation direction of the flattening roller 12, the powder 20 in contact with the flattening roller 12 in the space having a wedge-like form moves towards the apex of the wedge-like form at which the lowermost part of the flattening roller 12 is positioned due to the surface moving of the flattening roller 12. The powder 20 that has reached the apex of the wedge-like form due to the surface moving of the flattening roller 12 tries to enter into the powder 20 forming the pre-powder layer 31*a* or the powder layer 31 since there is no way out for the powder 20 due to the flattening roller 12 situated above and the pre-powder layer 31*a* or the powder layer 31 situated below. For this reason, the amount of the powder 20 below the flattening roller 12 partially increases. Therefore, the powder layer 31 formed at the part where the amount of the powder 20 is increased may partially have high powder density in comparison with the other parts. Moreover, when the excessive powder 20 reaches below the flattening roller 12, the powder 20 overflows out of the range of a predetermined thickness of the powder layer 31, thereby temporarily pushing up the flattening roller 12. Therefore, the surface of the powder layer 31 partially heightens, which may lead to an increase of the layer thickness.

Conversely, at the forward direction of the rotation direction of the flattening roller 12, the powder 20 in contact with the flattening roller 12 in the space having a wedge-like form moves away from the apex of the wedge-like form due to the surface moving of the flattening roller 12. Therefore, it is possible to reduce the partial increase of the amount of the powder 20 under the flattening roller 12 and the partial increase of the powder density, so that powder density of the powder layer 31 can be uniformed. Moreover, the excessive powder 20 is prevented from reaching under the flattening roller 12, so that the surface of the powder layer 31 does not partially heighten. As a consequence, the layer thickness of the powder layer 31 can be uniformed.

In the embodiments, for a single operation of the powder layer forming to form a single layer laminar fabrication structure, the powder layer is formed once and the powder are removed once. However, it is also possible to conduct at least one of the powder layer forming and the powder removing multiple times for the single operation of the powder layer forming.

For example, due to the pre-powder layer forming multiple times, the powder 20 required for the fabrication tank 22 can be supplied separately in multiple occasions, which makes it possible to prevent an excessive supply of the powder 20 to a particular site and easily place the powder 20 all over the fabrication tank 22 in the horizontal direction.

In addition, due to this multiple-time powder removing, the amount of the powder 20 to be moved in the horizontal direction by a single powder removing can be lessened. Therefore, the mass of the powder 20 to be moved in the horizontal direction decreases so that the force acting on the powder 20 to remain as the powder layer 31 can be lessened due to the moving of the powder 20. As a consequence, the displacement of the powder 20 forming the powder layer 31 can be prevented. This prevents the dragging and swelling of the laminar fabrication structure 30 and degradation of the fabrication accuracy of a three-dimensional fabrication object.

In embodiments, during the pre-powder layer forming, the flattening roller 12 pushes the powder 20 from the supply tank 21 adjacent to the fabrication tank 22 to supply the powder 20 to the fabrication tank 22 and flattens the powder 20, thereby forming the pre-powder layer 31a.

The configuration of supplying the powder 20 to the fabrication tank 22 during the pre-powder layer forming is not limited thereto. For example, it is possible to employ a configuration in which a powder supply unit is disposed above the fabrication tank 22, to which the powder 20 is supplied, and the flattening roller 12 flattens the supplied powder 20 and places it all over the fabrication tank 22 to form the pre-powder layer 31a.

In embodiments, the layer thickness of the pre-powder layer 31a formed during the single operation of the pre-powder layer forming is thicker than the predetermined thickness of the powder layer 31 formed during the single operation of the pre-powder layer forming. However, it is also possible to set the layer thickness of the pre-powder layer 31a formed in the single operation of the pre-powder layer forming thicker than the layer thickness of the powder layer 31 if the pre-powder layer forming is repeated multiple times in the single operation of the powder layer forming.

For example, if the pre-powder layer forming and the powder removing are separately repeated twice and the pre-powder layer 31a having the same thickness as with the powder layer 31 is formed during the pre-powder layer forming for the first time, a half of the powder 20 of the formed pre-powder layer 31a is removed during the powder removing for the first time. Next, the pre-powder layer 31a is formed to add the layer thickness corresponding to the predetermined thickness of the powder layer 31 during the pre-powder layer forming for the second time and a half of the powder 20 corresponding to the added layer thickness is removed. The powder layer 31 having a predetermined thickness can be formed by such powder layer forming operations.

The device 100 of embodiments employs a binder jet method. The fabrication method to which the configuration of the present disclosure can be applied is not limited to binder jet. Laser sintering (LS), electron beam sintering (EBM), etc. can be employed. In embodiments, a binding device binds powder using liquid discharged from the liquid discharging head. Also, it is possible to use a laser irradiator to sinter and bind powder, etc. The present disclosure can be applied to a solid freeform fabrication method of binding powder in a powder layer.

For binder jet, in general, an inkjet head discharges binder ink to plaster as the powder 20 to agglomerate the plaster powder to form the laminar fabrication structure 30. It is also possible to discharge a binder resin through an inkjet head using sand as the powder 20 to fabricate a three-dimensional fabrication object that can be used as a casting mold. In addition, in the binder jetting, metal, ceramic, glass, etc. can be used as the powder 20. Moreover, in the binder jetting, using the powder 20 coated with a material soluble in a liquid for binding, it is also possible to discharge the liquid through an inkjet head and bind powder via the material to form the laminar fabrication structure 30.

The above-described is just an example and other aspects of the present disclosure are, for example, as follows.

Aspect 2-A

A device for fabricating a three-dimensional object such as the device 100 for fabricating a three-dimensional fabrication object includes a fabrication part such as the fabrication tank 22, a flattening member such as the flattening roller 12 to place powder such as the powder 20 in the fabrication tank to form a pre-powder layer such as the pre-powder layer 31a and remove the powder on the top surface side of the pre-powder layer to form a powder layer such as the powder layer 31 while being rotationally driven around a rotation axis orthogonal to a direction of movement of the flattening member against the fabrication tank; and a fabrication unit to bind the powder to form a laminar fabrication object such as the laminar fabrication object 31 in a predetermined form, wherein the rotation speed of the flattening member is faster during removing the powder on the top surface side of the pre-powder layer than during forming the pre-powder layer, and the laminar fabrication object is formed repeatedly to fabricate the three-dimensional fabrication object.

In this aspect, the rotation speed of the flattening member is slower during the pre-powder layer forming than during the powder removing. The powder in contact with the surface of the flattening member tends to trace the surface of the flattening member so that static friction force easily occurs between the flattening member and the powder. For this reason, the friction force between the flattening member and the powder is relatively large in comparison with the powder removing during which kinetic friction force easily acts on the powder. Therefore, in comparison with the configuration in which the rotation speed during the powder removing is the same as that during the pre-powder layer forming, the configuration of this aspect is capable of conveying the powder more along the flattening direction in accordance with the movement of the flattening member. Due to this conveying capability, it is possible to prevent occurrence of shortage of the powder during conveyance, uniformly place the powder all over the pre-powder layer to be formed, and uniform powder density in the powder layer formed by partially removing the powder of the pre-powder layer.

In addition, in this aspect, the friction force occurring between the flattening member and the powder during the powder removing is relatively small in comparison with during the pre-powder layer forming. Therefore, it is possible to further reduce dragging and swelling of the laminar fabrication structure in the powder layer such as the already-formed powder layer 31*b* situated below, which may occur during the powder removing, in comparison with the configuration in which the rotation speed and the moving speed are the same during the powder removing and during the pre-powder layer forming. As a result, the dragging and the swelling of the laminar fabrication structure occurring during the powder layer forming are reduced and degradation of the fabrication accuracy of a three-dimensional object is prevented.

In this aspect, it is possible to prevent degradation of fabrication accuracy of a three-dimensional object while uniforming powder density of the powder layer.

Aspect 2-B

Aspect 2-B has the same configuration as Aspect 2-A except that the moving speed of the flattening member such as the flattening roller 12 against the fabrication part such as the fabrication tank 22 is faster during the powder removing than during the pre-powder layer forming.

According to this, as described in Embodiment 2-2, during the pre-powder layer forming, it is possible to uniformly place the powder all over the total area in the direction of movement of the flattening member in the fabrication part such as the fabrication tank 22 so that powder density of the powder layer to be formed can be uniformed. Moreover, during the powder removing, it is possible to reduce the force of the flattening member in the direction of movement thereof acting on the powder to remain as the powder layer and also prevent the displacement of the laminar fabrication structure formed on the powder layer situated below the powder layer to be formed. Therefore, degradation of a fabricated three-dimensional fabrication object can be reduced.

Aspect 2-C

Aspect 2-C has the same configuration as Aspect 2-A or 2-B except that the rotation direction of the flattening member such as the flattening roller 12 is that the direction of surface moving of the flattening member at the portion facing the fabrication part such as the fabrication tank 22 is the same as the direction of movement of the flattening member against the fabrication part, i.e., the rotation direction is forward direction.

According to this, as described in the above embodiments, powder density and layer thickness of the powder layer can be uniformed.

Aspect 2-D

A device for fabricating a three-dimensional object such as the device 100 for fabricating a three-dimensional fabrication object includes a fabrication part such as the fabrication tank 22, a flattening member such as the flattening roller 12 to place powder such as the powder 20 in the fabrication tank to form a pre-powder layer such as the pre-powder layer 31*a* and remove the powder on the top surface side of the pre-powder layer to form a powder layer such as the powder layer 31 while being rotationally driven around a rotation axis orthogonal to a direction of movement of the flattening member against the fabrication tank; and a fabrication unit to bind the powder to form a laminar fabrication object such as the laminar fabrication object 31 in a predetermined form, wherein the moving speed of the flattening member against the fabrication part is faster during the powder removing than the pre-powder layer forming and the laminar fabrication object is formed repeatedly to fabricate the three-dimensional fabrication object.

According to this, as described in Embodiment 2-2, during the pre-powder layer forming, it is possible to uniformly place the powder all over the total area in the direction of movement of the flattening member in the fabrication part such as the fabrication tank 22 so that powder density of the powder layer to be formed can be uniformed. Moreover, during the powder removing, it is possible to reduce the force of the flattening member in the direction of movement thereof acting on the powder to remain as the powder layer and also prevent the displacement of the laminar fabrication structure formed in the powder layer situated below the powder layer to be formed, thereby preventing degradation of fabrication accuracy of a fabricated three-dimensional fabrication object.

Aspect 2-E

Aspect E has the same configuration as any one of the aspect A to the aspect D except that the pre-powder layer is formed multiple times to form a single powder layer.

According to this, as described in the embodiments, the powder such as the powder 20 required for the fabrication part such as the fabrication tank 22 can be supplied in multiple occasions. According to this, it is possible to prevent an excessive supply of the powder at a particular site, which makes it easier to uniformly place the powder all over the fabrication part along the direction of movement (e.g., horizontal direction) of the flattening member such as the flattening roller 12 over the fabrication part. Therefore, it is possible to uniform powder density of the formed powder layer.

Aspect 2-F

Aspect F has the same configuration as any one of the aspect A to the aspect E except that the powder is removed multiple times to form a single powder layer.

According to this, as described in the embodiments, the amount of the powder such as the powder 20 moving in the horizontal direction can be reduced in a single operation of the powder removing. According to this, the mass of the powder moving in the direction of movement (e.g., horizontal direction) of the flattening member such as the flattening roller 12 is reduced so that the force of the flattening member acting on the powder remaining as the powder layer such as the powder layer 31 due to this movement of the powder can be reduced. Therefore, the displacement of the powder forming the powder layer in the horizontal direction can be prevented and the dragging and the swelling of the laminar fabrication structure such as the laminar fabrication structure 30 can be also prevented. Therefore, degradation of fabrication accuracy of a three-dimensional fabrication object can be prevented. In addition, the flattening member can press the powder in the fabrication part such as the fabrication tank 22 multiple times, thereby increasing density of the powder layer.

Aspect 2-G

A method of manufacturing a three-dimensional fabrication object includes placing powder such as the powder 20 all over the fabrication part such as the fabrication tank 22 by a flattening member such as the flattening roller 12 to form a pre-powder layer such as the pre-powder layer 31*a*, removing the powder on the top surface side of the pre-powder layer with the flattening member which is a rotary member that rotates around a rotation axis orthogonal to the direction of movement of the flattening member against the fabrication part to form a powder layer such as the powder layer 31, binding the powder of the powder layer in a predetermined form to form a laminar fabrication structure such as the laminar fabrication structure 30, and repeating the placing, the removing, and the binding, wherein the rotation speed of the flattening member is faster during the powder removing than the pre-powder layer forming.

According to this, as described in the embodiments, it is possible to prevent degradation of fabrication accuracy of a three-dimensional object while uniforming powder density of the powder layer.

Aspect 2-H

Aspect 2-H is that a method of manufacturing a three-dimensional fabrication object includes placing powder such as the powder 20 all over the fabrication part such as the fabrication tank 22 by a flattening member such as the flattening roller 12 to form a pre-powder layer such as the pre-powder layer 31a, removing the powder on the top surface side of the pre-powder layer with the flattening member which is a rotary member that rotates around a rotation axis orthogonal to the direction of movement of the flattening member against the fabrication part to form a powder layer such as the powder layer 31, binding the powder of the powder layer in a predetermined form to form a laminar fabrication structure such as the laminar fabrication structure 30, and repeating the placing, the removing, and the binding, wherein the moving speed of the flattening member is faster during the powder removing than the pre-powder layer forming.

According to this, as described in the embodiments, it is possible to prevent degradation of fabrication accuracy of a three-dimensional object while uniforming powder density of the powder layer.

Aspect 2-I

Aspect 2-I is that a non-transitory computer readable storage medium storing one or more instructions that, when executed by one or more processors, cause the one or more processors in a device for fabricating a three-dimensional fabrication object such as the device 100 for fabricating a three-dimensional fabrication object to execute a method of processing setting information, the method of manufacturing a three-dimensional fabrication object includes placing powder such as the powder 20 all over the fabrication part such as the fabrication tank 22 by a flattening member such as the flattening roller 12 to form a pre-powder layer such as the pre-powder layer 31a, removing the powder on the top surface side of the pre-powder layer with the flattening member which is a rotary member that rotates around a rotation axis orthogonal to the direction of movement of the flattening member against the fabrication part to form a powder layer such as the powder layer 31, binding the powder of the powder layer in a predetermined form to form a laminar fabrication structure such as the laminar fabrication structure 30, and repeating the placing, the removing, and the binding, wherein the rotation speed of the flattening member is faster during the powder removing than the pre-powder layer forming.

According to this, as described in the embodiments, it is possible to prevent degradation of fabrication accuracy of a three-dimensional object while uniforming powder density of the powder layer.

Aspect 2-J

Aspect 2-J is that a non-transitory computer readable storage medium storing one or more instructions that, when executed by one or more processors, cause the one or more processors in a device for fabricating a three-dimensional fabrication object such as the device 100 for fabricating a three-dimensional fabrication object to execute a method of processing setting information, the method of manufacturing a three-dimensional fabrication object includes placing powder such as the powder 20 all over the fabrication part such as the fabrication tank 22 by a flattening member such as the flattening roller 12 to form a pre-powder layer such as the pre-powder layer 31a, removing the powder on the top surface side of the pre-powder layer with the flattening member which is a rotary member that rotates around a rotation axis orthogonal to the direction of movement of the flattening member against the fabrication part to form a powder layer such as the powder layer 31, binding the powder of the powder layer in a predetermined form to form a laminar fabrication structure such as the laminar fabrication structure 30, and repeating the placing, the removing, and the binding, wherein the moving speed of the flattening member against the fabrication part is faster during the powder removing than the pre-powder layer forming.

According to this, as described in the embodiments, it is possible to prevent degradation of fabrication accuracy of a three-dimensional object while uniforming powder density of the powder layer.

According to the present disclosure, it is possible to reduce deterioration of fabrication accuracy of a three-dimensional fabrication object while maintaining powder density of a powder layer high when binding powder to obtain a desired form during fabrication.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. A device for fabricating a three-dimensional fabrication object, the device comprising:
 a fabrication tank;
 control circuitry configured to
  control a flattening member to move in a direction orthogonal to a lamination direction in a first pass so as to push powder into the fabrication tank to form a powder layer in a region of the fabrication tank in which a next layer of the fabrication object will be formed, wherein the powder layer, after the first pass, has a thickness greater than a predetermined thickness to form the next layer of the fabrication object,
  control the flattening member to move in multiple passes, after the first pass in the direction orthogonal to the lamination direction, over a top surface side of the powder layer so that the powder layer has the predetermined thickness, and
  control the flattening member so that a rotation speed of the flattening roller increases with each pass of the multiple passes; and
 a liquid discharging head to discharge a liquid to bind the powder in the powder layer to form a laminar fabrication object, wherein
 an amount of the powder removed for a last pass of the multiple passes is less than that for any other pass of the multiple passes, and
 the control circuitry is further configured to control the liquid discharging head to wait until after the multiple passes before discharging the liquid to bind the powder in the powder layer.

2. The device according to claim 1, wherein the control circuitry is further configured to control the flattening member so that the amount of the powder removed by the flattening member decreases as a number of the passes increases.

3. The device according to claim 1, wherein the flattening member is a flattening roller.

4. The device according to claim 1, wherein the flattening member has a cylindrical form.

5. The device of claim 1, further comprising a supply stage, wherein the control circuitry is further configured to move the supply stage and the fabrication tank in opposite directions prior to the first pass.

6. The device according to claim 5, wherein the control circuitry is further configured to lower the supply stage after the first pass and maintain the supply stage lowered during the second pass.

7. A device for fabricating a three-dimensional object, the device comprising:
 a fabrication tank;
 a supply stage containing powder;
 control circuitry configured to
  control the supply stage to raise the supply stage,
  control a flattening member to move a portion of the powder contained in the raised supply stage all over the fabrication tank in a first pass to form a pre-powder layer, and
  control the flattening member to remove powder in a second pass on a top surface side of the pre-powder layer to form a powder layer while being rotationally driven around a rotation axis orthogonal to a direction of movement of the flattening member against the fabrication tank; and
 a liquid discharging head to discharge a liquid to bind the powder in the powder layer to form a laminar fabrication object, wherein
 the control circuitry is further configured to
  lower the supply stage after the first pass,
  control a rotation speed or a moving speed of the single flattening member to be faster during the removing of the powder on the top surface side of the pre-powder layer in the second pass when the supply stage is lowered than during the forming of the pre-powder layer in the first pass,
  control the flattening member to remove powder in a third pass, on the top surface side of the pre-powder layer, having a higher rotation speed than a rotation speed of the second pass, and
  control the liquid discharging head to wait until after the removal of the powder on the top surface side of the pre-powder layer before discharging the liquid to bind the powder in the powder layer.

8. The device according to claim 7, wherein the control circuitry is further configured to control the flattening member so that the moving speed of the flattening member against the fabrication tank is faster during the removing of the powder than during the forming of the pre-powder layer.

9. The device according to claim 7, wherein the control circuitry is further configured to control the flattening member so that a direction of surface moving of the flattening member at a portion where the flattening member faces the fabrication tank is coincident with a direction of movement of the flattening member against the fabrication tank.

10. The device according to claim 7, wherein the control circuitry is further configured to control the flattening member so that the flattening member forms the pre-powder layer multiple times to form the powder layer.

11. The device according to claim 7, wherein the control circuitry is further configured to control the flattening member so that the flattening member removes the powder multiple times to form the powder layer.

* * * * *